US007685204B2

(12) United States Patent
Rogers

(10) Patent No.: US 7,685,204 B2
(45) Date of Patent: Mar. 23, 2010

(54) SYSTEM AND METHOD FOR ENHANCED MEDIA DISTRIBUTION

(75) Inventor: Ian Rogers, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 231 days.

(21) Appl. No.: 11/361,165

(22) Filed: Feb. 24, 2006

(65) Prior Publication Data
US 2006/0195462 A1    Aug. 31, 2006

Related U.S. Application Data

(60) Provisional application No. 60/657,222, filed on Feb. 28, 2005, provisional application No. 60/678,718, filed on May 5, 2005.

(51) Int. Cl.
G06F 7/00       (2006.01)
G06F 17/30      (2006.01)
(52) U.S. Cl. .................. 707/770; 707/758; 709/203
(58) Field of Classification Search .................... 707/5, 707/100, 102, 104.1; 709/3, 203
See application file for complete search history.

(56) References Cited

U.S. PATENT DOCUMENTS

| 5,566,353 | A | 10/1996 | Cho et al. |
| 5,616,876 | A | 4/1997 | Cluts |
| 5,729,741 | A | 3/1998 | Liaguno et al. |
| 5,748,956 | A | 5/1998 | Lafer et al. |
| 5,864,870 | A | 1/1999 | Guck |
| 5,886,698 | A | 3/1999 | Sciammarella et al. |
| 5,890,152 | A | 3/1999 | Rapaport et al. |
| 5,903,892 | A | 5/1999 | Hoffert et al. |
| 5,928,330 | A * | 7/1999 | Goetz et al. ................. 709/231 |
| 5,950,173 | A | 9/1999 | Perkowski |
| 5,982,369 | A | 11/1999 | Sciammarella et al. |

(Continued)

FOREIGN PATENT DOCUMENTS

EP        1 176 840        1/2002

(Continued)

OTHER PUBLICATIONS

Qian, Yuechen, et al., "Exploring the Potentials of Combining Photo Annotating Tasks with Instant Messaging Fun", MUM 2004, College Park, MD, Oct. 27-29, 2004, pp. 11-17.*

(Continued)

*Primary Examiner*—Robert Stevens
(74) *Attorney, Agent, or Firm*—James J. DeCarlo; Greenberg Traurig, LLP

(57) ABSTRACT

A method and a computer readable medium for searching for media items from a network of users using a media management application and an instant messenger platform and a system for handling searches such searches. In one aspect, the method comprises receiving from a user having a group of messenger friends, a search request for a media item, identifying other users of the instant messaging service to form a list of candidate users, searching media items associated with each candidate user to develop a search result that fulfills the search request, and returning to the searching user the search result comprising information identifying which candidate user is associated with a media item source that can act as a source of a media item identified in the search result.

88 Claims, 50 Drawing Sheets

U.S. PATENT DOCUMENTS

| | | | |
|---|---|---|---|
| 5,996,015 | A | 11/1999 | Day et al. |
| 6,064,380 | A | 5/2000 | Swenson et al. |
| 6,118,450 | A | 9/2000 | Proehl et al. |
| 6,157,377 | A * | 12/2000 | Shah-Nazaroff et al. .... 715/719 |
| 6,192,340 | B1 | 2/2001 | Abecassis |
| 6,226,672 | B1 | 5/2001 | DeMartin et al. |
| 6,232,539 | B1 | 5/2001 | Looney et al. |
| 6,248,946 | B1 | 6/2001 | Dwek |
| 6,256,623 | B1 * | 7/2001 | Jones ............................ 707/3 |
| 6,356,971 | B1 | 3/2002 | Katz et al. |
| 6,389,467 | B1 | 5/2002 | Eyal |
| 6,393,430 | B1 | 5/2002 | Van Ryzin |
| 6,466,918 | B1 | 10/2002 | Spiegel et al. |
| 6,477,704 | B1 | 11/2002 | Cremia |
| 6,484,199 | B2 | 11/2002 | Eyal |
| 6,526,411 | B1 | 2/2003 | Ward |
| 6,538,665 | B2 | 3/2003 | Crow et al. |
| 6,587,127 | B1 * | 7/2003 | Leeke et al. ................ 715/765 |
| 6,605,770 | B2 | 8/2003 | Yamane et al. |
| 6,609,096 | B1 | 8/2003 | De Bonet et al. |
| 6,662,231 | B1 | 12/2003 | Drosset et al. |
| 6,691,162 | B1 * | 2/2004 | Wick .......................... 709/224 |
| 6,721,489 | B1 | 4/2004 | Benyamin et al. |
| 6,728,729 | B1 | 4/2004 | Jawa et al. |
| 6,731,312 | B2 * | 5/2004 | Robbin ....................... 715/792 |
| 6,735,628 | B2 | 5/2004 | Eyal |
| 6,738,766 | B2 * | 5/2004 | Peng .............................. 707/6 |
| 6,816,944 | B2 * | 11/2004 | Peng .......................... 711/133 |
| 6,820,238 | B1 | 11/2004 | Auflick et al. |
| 6,829,033 | B2 | 12/2004 | Hose et al. |
| 6,850,256 | B2 | 2/2005 | Crow et al. |
| 6,928,433 | B2 | 8/2005 | Goodman et al. |
| 6,941,324 | B2 | 9/2005 | Plastina et al. |
| 6,968,179 | B1 * | 11/2005 | De Vries .................. 455/414.1 |
| 6,987,221 | B2 | 1/2006 | Platt |
| 7,013,290 | B2 * | 3/2006 | Ananian ....................... 705/27 |
| 7,020,704 | B1 | 3/2006 | Lipscomb et al. |
| 7,024,424 | B1 | 4/2006 | Platt et al. |
| 7,043,477 | B2 | 5/2006 | Mercer et al. |
| 7,096,234 | B2 | 8/2006 | Plastina et al. |
| 7,111,009 | B1 | 9/2006 | Gupta et al. |
| 7,113,767 | B2 | 9/2006 | Vaananen |
| 7,127,454 | B2 | 10/2006 | Deguchi |
| 7,136,874 | B2 | 11/2006 | Mercer et al. |
| 7,146,404 | B2 * | 12/2006 | Kay et al. ................... 709/206 |
| 7,159,000 | B2 | 1/2007 | Plastina et al. |
| 7,219,308 | B2 | 5/2007 | Novak et al. |
| 7,275,063 | B2 * | 9/2007 | Horn .......................... 707/102 |
| 7,277,852 | B2 | 10/2007 | Iyoku et al. |
| 7,281,034 | B1 | 10/2007 | Eyal |
| 7,310,350 | B1 | 12/2007 | Shao et al. |
| 2001/0018858 | A1 | 9/2001 | Dwek |
| 2001/0033296 | A1 | 10/2001 | Fullerton et al. |
| 2001/0042107 | A1 | 11/2001 | Palm |
| 2002/0002498 | A1 | 1/2002 | Hatakeyama |
| 2002/0010652 | A1 | 1/2002 | Deguchi |
| 2002/0040326 | A1 | 4/2002 | Spratt |
| 2002/0042834 | A1 | 4/2002 | Kremens et al. |
| 2002/0045960 | A1 | 4/2002 | Phillips et al. |
| 2002/0049037 | A1 | 4/2002 | Christensen et al. |
| 2002/0052933 | A1 | 5/2002 | Leonhard et al. |
| 2002/0054134 | A1 | 5/2002 | Kelts |
| 2002/0087887 | A1 | 7/2002 | Busam et al. |
| 2002/0089529 | A1 | 7/2002 | Robbin |
| 2002/0099731 | A1 | 7/2002 | Abajian |
| 2002/0126135 | A1 | 9/2002 | Ball et al. |
| 2002/0138619 | A1 | 9/2002 | Ramaley et al. |
| 2002/0151327 | A1 | 10/2002 | Levitt |
| 2002/0152267 | A1 * | 10/2002 | Lennon ....................... 709/203 |
| 2002/0156546 | A1 | 10/2002 | Ramaswamy |
| 2002/0188363 | A1 | 12/2002 | Ashy |
| 2003/0023427 | A1 | 1/2003 | Cassin et al. |
| 2003/0028539 | A1 | 2/2003 | Nunome et al. |
| 2003/0031176 | A1 | 2/2003 | Sim |
| 2003/0037035 | A1 | 2/2003 | Deguchi |
| 2003/0041108 | A1 | 2/2003 | Henrick et al. |
| 2003/0046273 | A1 * | 3/2003 | Deshpande ..................... 707/3 |
| 2003/0046399 | A1 | 3/2003 | Boulter et al. |
| 2003/0065639 | A1 | 4/2003 | Fiennes et al. |
| 2003/0071851 | A1 | 4/2003 | Unger et al. |
| 2003/0088571 | A1 | 5/2003 | Ekkel |
| 2003/0110228 | A1 * | 6/2003 | Xu et al. ..................... 709/207 |
| 2003/0110502 | A1 | 6/2003 | Creed |
| 2003/0151618 | A1 | 8/2003 | Johnson et al. |
| 2003/0172090 | A1 | 9/2003 | Asunmaa et al. |
| 2003/0182254 | A1 | 9/2003 | Plastina et al. |
| 2003/0182315 | A1 | 9/2003 | Plastina et al. |
| 2003/0182428 | A1 * | 9/2003 | Li et al. ..................... 709/227 |
| 2003/0191753 | A1 | 10/2003 | Hoch |
| 2003/0200452 | A1 | 10/2003 | Tagawa et al. |
| 2003/0212710 | A1 | 11/2003 | Guy |
| 2003/0222907 | A1 | 12/2003 | Heikes et al. |
| 2003/0223411 | A1 | 12/2003 | de la Fuente |
| 2003/0225834 | A1 | 12/2003 | Lee et al. |
| 2003/0225848 | A1 | 12/2003 | Heikes et al. |
| 2003/0228134 | A1 | 12/2003 | Kim et al. |
| 2003/0236582 | A1 | 12/2003 | Zamir et al. |
| 2003/0236711 | A1 | 12/2003 | Deguchi |
| 2003/0236832 | A1 | 12/2003 | McIntyre et al. |
| 2003/0237043 | A1 | 12/2003 | Novak |
| 2004/0002938 | A1 | 1/2004 | Deguchi |
| 2004/0003090 | A1 * | 1/2004 | Deeds ........................ 709/227 |
| 2004/0003706 | A1 | 1/2004 | Tagawa et al. |
| 2004/0019497 | A1 | 1/2004 | Volk et al. |
| 2004/0031058 | A1 * | 2/2004 | Reisman ..................... 725/112 |
| 2004/0055445 | A1 | 3/2004 | Iyoku et al. |
| 2004/0056901 | A1 * | 3/2004 | March et al. ................ 345/811 |
| 2004/0057348 | A1 | 3/2004 | Shteyn et al. |
| 2004/0057449 | A1 | 3/2004 | Black |
| 2004/0064476 | A1 | 4/2004 | Rounds |
| 2004/0064512 | A1 * | 4/2004 | Arora et al. ................. 709/206 |
| 2004/0068606 | A1 | 4/2004 | Kim et al. |
| 2004/0070678 | A1 * | 4/2004 | Toyama et al. ........... 348/231.3 |
| 2004/0078383 | A1 | 4/2004 | Mercer et al. |
| 2004/0083273 | A1 | 4/2004 | Madison et al. |
| 2004/0088348 | A1 | 5/2004 | Yeager et al. |
| 2004/0103153 | A1 * | 5/2004 | Chang et al. ................ 709/206 |
| 2004/0117442 | A1 | 6/2004 | Thielen |
| 2004/0117843 | A1 | 6/2004 | Karaoguz et al. |
| 2004/0128308 | A1 | 7/2004 | Obrador |
| 2004/0128353 | A1 * | 7/2004 | Goodman et al. ........... 709/204 |
| 2004/0137882 | A1 | 7/2004 | Forsyth |
| 2004/0148353 | A1 | 7/2004 | Karaoguz et al. |
| 2004/0162871 | A1 | 8/2004 | Pabla et al. |
| 2004/0162878 | A1 | 8/2004 | Lewis et al. |
| 2004/0172456 | A1 * | 9/2004 | Green et al. ................ 709/207 |
| 2004/0174905 | A1 | 9/2004 | Caspi et al. |
| 2004/0177116 | A1 | 9/2004 | McConn |
| 2004/0177319 | A1 * | 9/2004 | Horn ........................ 715/501.1 |
| 2004/0184778 | A1 | 9/2004 | Jung et al. |
| 2004/0196315 | A1 * | 10/2004 | Swearingen et al. ........ 345/804 |
| 2004/0199514 | A1 * | 10/2004 | Rosenblatt et al. ............ 707/10 |
| 2004/0199667 | A1 * | 10/2004 | Dobbins ..................... 709/240 |
| 2004/0201609 | A1 | 10/2004 | Obrador |
| 2004/0205028 | A1 | 10/2004 | Verosub et al. |
| 2004/0215731 | A1 * | 10/2004 | Tzann-en Szeto ........... 709/207 |
| 2004/0220791 | A1 | 11/2004 | Lamkin et al. |
| 2004/0220926 | A1 | 11/2004 | Lamkin et al. |
| 2004/0221299 | A1 | 11/2004 | Gibbs et al. |
| 2004/0223606 | A1 * | 11/2004 | Enete et al. ................. 379/900 |
| 2004/0226039 | A1 | 11/2004 | Jung et al. |
| 2004/0236568 | A1 | 11/2004 | Guillen et al. |
| 2004/0252604 | A1 | 12/2004 | Johnson et al. |
| 2004/0260753 | A1 * | 12/2004 | Regan ........................ 709/200 |

| | | | |
|---|---|---|---|
| 2004/0260761 A1* | 12/2004 | Leaute et al. | 709/201 |
| 2004/0267812 A1 | 12/2004 | Harris et al. | |
| 2005/0004985 A1* | 1/2005 | Stochosky | 709/205 |
| 2005/0004995 A1* | 1/2005 | Stochosky | 709/219 |
| 2005/0021398 A1 | 1/2005 | McCleskey et al. | |
| 2005/0021470 A1 | 1/2005 | Martin et al. | |
| 2005/0021750 A1 | 1/2005 | Abrams et al. | |
| 2005/0027539 A1 | 2/2005 | Weber et al. | |
| 2005/0030937 A1* | 2/2005 | Wick et al. | 370/352 |
| 2005/0038707 A1 | 2/2005 | Roever et al. | |
| 2005/0038724 A1 | 2/2005 | Roever et al. | |
| 2005/0038814 A1 | 2/2005 | Iyengar et al. | |
| 2005/0038819 A1 | 2/2005 | Hicken et al. | |
| 2005/0038877 A1 | 2/2005 | Gupta et al. | |
| 2005/0044229 A1 | 2/2005 | Brown | |
| 2005/0055472 A1 | 3/2005 | Krzyzanowski et al. | |
| 2005/0060264 A1 | 3/2005 | Schrock et al. | |
| 2005/0065935 A1 | 3/2005 | Chebolu et al. | |
| 2005/0071780 A1* | 3/2005 | Muller et al. | 715/825 |
| 2005/0086309 A1* | 4/2005 | Galli et al. | 709/206 |
| 2005/0086606 A1 | 4/2005 | Blennerhassett et al. | |
| 2005/0091069 A1 | 4/2005 | Chuang | |
| 2005/0102191 A1 | 5/2005 | Heller | |
| 2005/0108176 A1 | 5/2005 | Jarol et al. | |
| 2005/0108320 A1* | 5/2005 | Lord et al. | 709/201 |
| 2005/0114324 A1 | 5/2005 | Mayer | |
| 2005/0132288 A1* | 6/2005 | Kirn et al. | 715/700 |
| 2005/0138543 A1 | 6/2005 | Liu | |
| 2005/0146996 A1 | 7/2005 | Roman | |
| 2005/0160111 A1 | 7/2005 | Plastina et al. | |
| 2005/0172001 A1 | 8/2005 | Zaner et al. | |
| 2005/0197906 A1 | 9/2005 | Kindig et al. | |
| 2005/0198317 A1 | 9/2005 | Byers | |
| 2005/0210396 A1* | 9/2005 | Galli | 715/758 |
| 2005/0210507 A1 | 9/2005 | Hawkins et al. | |
| 2005/0216443 A1 | 9/2005 | Morton et al. | |
| 2005/0216855 A1 | 9/2005 | Kopra et al. | |
| 2005/0227676 A1* | 10/2005 | De Vries | 455/414.1 |
| 2005/0234875 A1 | 10/2005 | Auerbach et al. | |
| 2005/0234995 A1 | 10/2005 | Plastina et al. | |
| 2005/0240494 A1 | 10/2005 | Cue et al. | |
| 2005/0246651 A1 | 11/2005 | Krzanowski | |
| 2005/0251565 A1 | 11/2005 | Weel | |
| 2005/0251566 A1 | 11/2005 | Weel | |
| 2005/0251576 A1 | 11/2005 | Weel | |
| 2005/0251807 A1 | 11/2005 | Weel | |
| 2005/0262186 A1 | 11/2005 | Szeto | |
| 2006/0008256 A1* | 1/2006 | Khedouri et al. | 386/124 |
| 2006/0010240 A1 | 1/2006 | Chuah | |
| 2006/0020662 A1* | 1/2006 | Robinson | 709/203 |
| 2006/0031770 A1 | 2/2006 | McMenamin | |
| 2006/0041627 A1* | 2/2006 | Tu | 709/206 |
| 2006/0041844 A1* | 2/2006 | Homiller | 715/734 |
| 2006/0056324 A1* | 3/2006 | Hyyppa et al. | 370/310 |
| 2006/0080103 A1 | 4/2006 | Van Breemen | |
| 2006/0095502 A1 | 5/2006 | Lewis et al. | |
| 2006/0107297 A1* | 5/2006 | Toyama et al. | 725/105 |
| 2006/0123058 A1 | 6/2006 | Mercer et al. | |
| 2006/0123113 A1 | 6/2006 | Friedman | |
| 2006/0133768 A1 | 6/2006 | Ellis | |
| 2006/0143236 A1 | 6/2006 | Wu | |
| 2006/0167985 A1* | 7/2006 | Albanese et al. | 709/203 |
| 2006/0167991 A1* | 7/2006 | Heikes et al. | 709/204 |
| 2006/0173838 A1 | 8/2006 | Garg et al. | |
| 2006/0190410 A1 | 8/2006 | Harper | |
| 2006/0195462 A1 | 8/2006 | Rogers | |
| 2006/0218195 A1 | 9/2006 | LaChapelle et al. | |
| 2007/0011206 A1 | 1/2007 | Gupta et al. | |
| 2007/0016865 A1 | 1/2007 | Johnson et al. | |
| 2007/0050413 A1 | 3/2007 | Kominek et al. | |
| 2007/0143740 A1 | 6/2007 | Hoerentrup et al. | |
| 2007/0159934 A1 | 7/2007 | Weon | |
| 2007/0191108 A1 | 8/2007 | Brunet De Courssou et al. | |
| 2007/0203984 A2* | 8/2007 | AlHusseini et al. | 709/205 |
| 2008/0027909 A1* | 1/2008 | Gang et al. | 707/3 |
| 2008/0215882 A1 | 9/2008 | Coldicott et al. | |

FOREIGN PATENT DOCUMENTS

| | | |
|---|---|---|
| EP | 1-176-840 A1 * | 1/2002 |
| EP | 1 489 800 | 12/2004 |
| WO | WO 02/33579 | 4/2002 |
| WO | WO 2004/046874 | 6/2004 |
| WO | WO 2004/046874 A2 * | 6/2004 |

OTHER PUBLICATIONS

Regan, Tim, et al., "Media Center Buddies: Instant Messaging Around a Media Center", NordiCHI '04, Tampere, Finland, Oct. 23-27, 2004, pp. 141-144.*
Gottesman, Ben Z., "IM Your Photos", PCMag.com, Dec. 11, 2003, pp. 1-2 (downloaded from www.pcmag.com/print_article2/0,1217,a=114405,00.asp).*
Bassoli, Arianna, et al., "TunA: A Mobile Music Experience to Foster Local Interactions", UbiComp 2003, Seattle, WA, Oct. 12-15, 2003, pp. 1-2.*
Grinter, Rebecca E., et al., "Instant Messaging in Teen Life", CSCW '02, New Orleans, LA, Nov. 16-20, 2002, pp. 21-30.*
Qian, Yuechen, et al., "Turning Photo Annotating Tasks into Instant Messaging Fun: Prototyping, User Trials and Roadmapping", ICEC 2004, LCNS 3166, vol. 3166/2004, Springer, Berlin, Aug. 4, 2004, pp. 610-613.*
Coursey, David, "My Favorite Ways to Share Digital Photos", ZDNet, Nov. 7, 2003, pp. 1-3 (downloaded from review.zdnet.com/AnchorDesk/4520-7298_16-5103567.html).*
Bolcer, Gregory Alan., "Magi: An Architecture for Mobile and Disconnected Workflow", IEEE Internet Computing, vol. 4 Issue 3, May/Jun. 2000, pp. 46-54.*
Rajani, Rakhi E., et al., "Viewing and Annotating Media with MemoryNet", CHI 2004, Vienna, Austria, Apr. 24-29, 2004, pp. 1517-1520.*
Mei, Hsing, et al., "PP-COSE: A P2P Community Search Scheme", CIT '04, Sep. 14-16, 2004, pp. 1-8.*
Isaacs, Ellen, et al., "Mobile Instant Messaging Through Hubbub", Communications of the ACM, vol. 45, Issue 9, Sep. 2002, pp. 68-72.*
Bach, Erik, et al., "Bubbles: Navigating Multimedia Content in Mobile Ad-hoc Networks", ACM 1-58113-826-1/03/12, © 2003, pp. 73-80.*
Milojicic, Dejan S., et al., "Peer-to-Peer Computing", HPL-2002-57, © 2002, pp. I and 1-51.*
Moore, Julian, "tuna: Shared Audio Experience", Masters Thesis, University of Limerick, Sep. 2004, pp. i-xv and 1-100.0000.*
Lundgren, Henrik, et al., "A Distributed Instant Messaging Architecture Based on the Pastry Peer-to-Peer Routing Substrate", SNCNW 2003, © 2003, pp. 1-3.*
Aberer, Karl, "P-Grid: A Self-Organizing Access Structure for P2P Information Systems", CoopIS 2001, LNCS 2172, Springer-Verlag, Berlin, Germany, © 2001, pp. 179-194.*
International Search Report (PCT/US06/06440), Sep. 18, 2007.
Notification Concerning Transmittal of International Preliminary Report on Patentability dated Oct. 4, 2007 PCT/US06/006440.
Notification Concerning Transmittal of International Preliminary Report on Patentability dated Sep. 20, 2007 PCT/US06/006934.
Notification of Transmittal of the International Search Report and the Written Opinion of the International Searching Authority, or the declaration dated Oct. 19, 2007 PCT/US06/06683.
Notification Concerning Transmittal of International Preliminary Report on Patentability (PCT/US2006/006687), Jan. 11, 2008.
Notification of Transmittal of the International Search Report and the Written Opinion of the International Searching Authority, or the Declaration (PCT/US06/07124), Jan. 11, 2008.
Notification of Transmittal of the International Search Report and the Written Opinion of the International Searching Authority, of the Declaration (PCT/US06/06685), 8 pages, Dec. 2008.
International Preliminary Report on Patentability (PCT/US2006/006932); Mar. 17, 2009; 7 pages.

Brown, Janelle; "MP3 free-for-all"; [Online] XP002219000; Retrieved from the Internet http://groups.google.com/groups?selm=Pine.GSU.4.10.10002050020300.16171-100000%40adore.lightlink.com&output=gplain; retrieved on Oct. 30, 2002; 6 pages.

Epema D. H. J. ,et al."Music2Share-Copyright-Compliant Music Sharing in P2P Systems" Proceedings of the IEEE, col. 92, No. 6; Jun. 1, 2004; pp. 961-970.

Supplementary Search Report EP 06 73 6092.5 dated Aug. 20, 2009; 3 pages.

Guterman, Jimmy: "Will AOL Tame Aimster?-file sharing system piggyback's on AOL instant messaging-Company Business and Marketing"; [Online] XP002532806; Dec. 18, 2000; Retrieved from the Internet http://findarticles.com/p/articles/mi_mOHWW/is_51_3/ai_68156286/ retrieved on Jun. 18, 2009; 3 pages.

Yang B. et al; "Comparing Hybrid peer-to-peer systems" Proceedings of the 27th VLDB Conference, Roma, Italy; Sep. 11, 2001; pp. 561-570.

Supplementary Search Report EP 06 73 6090.9 dated Jun. 18, 2009; 3 pages.

Bassoli, Andrea, et al., "tunA: Local Music Sharing with Handheld Wi-Fi Devices", Proc. of the 5th Wireless World Conf. 2004, pp. 1-23.

Pachet, Francois, et al., "Content Management for Electronic Music Distribution", Communications of the ACM, vol. 46, Issue 4, Apr. 2003, pp. 71-75.

Swain, Michael J. "Searching for Multimedia on the World Wide Web", IEEE Conf. on Multimedia Computing and Systems, vol. 1, Jun. 7-11, 1999, pp. 32-37.

Lienhart, Rainer, et al., "Improving Media Services on P2P Networks", IEEE Internet Computing, vol. 6, Issue 1, Jan.-Feb. 2002, pp. 73-77.

Davies, Nigel, et al. "Supporting Adaptive Video Applications in Mobile Environments", IEEE Communications Magazine, vol. 36, issue 6, Jun. 1998, pp. 138-143.

Macedonia, Michael, "Distributed File Sharing: Barbarians at the Gates?", Computer, vol. 33, Issue 8, Aug. 2000, pp. 99-101.

Swierk, et al. "The Roma Personal Metadata Service", Mobile Networks and Applications, vol. 7, No. 5, Oct. 2002, pp. 407-418.

Qian, Yuechen, et al. "Exploring the Potentials of Combining Photo Annotating Tasks with Instant Messaging Fun", MUM 2004, College Park, MD, Oct. 27-29, 2004, pp. 11-17.

Regan, Tim, et al. "Media Center Buddies: Instant Messaging Around a Media Center", NordiCHI '04, Tampere, Finlad, Oct. 23-27, 2004, pp. 141-144.

Bassoli, Arianna et al., "TunA: A Mobile Music Experience to Foster Local Interactions", UbiComp 2003, Seattle, WA, Oct. 12-15, 2003, pp. 1-2.

Grinter, Rebecca E., et al. "Instant Messaging in Teen Life", CSCW '02, New Orleans, LA, Nov. 16-20, 2002, pp. 21-30.

Qian, Yuechen, et al. "Turning Photo Annotating Tasks into Instant Messaging Fun: Prototyping, User Trials and Road Mapping, "ICEC 2004, LCNS 3166, vol. 3166/2004, Springer, Berlin, Aug. 4, 2004, pp. 610-613.

Coursey, David, "My Favorite Ways to Share Digital Photos", ZDNet, Nov. 7, 2003, pp. 1-3 (downloaded from reviewzdnet.com/AnchorDesk/4520-7298_16-5103567.html).

Bolcer, Gregory Alan., "Magi:An Architecture for Mobile and Disconnected Workflow", IEEE Internet Computing, vol. 4 Issue 3, May/Jun. 2000, pp. 46-54.

Rajani, Rakhi E., et al., "viewing and Annotating Media with MemoryNet", CHI 2004, Vienna, Austria, Apr. 24-29, 2004, pp. 1517-1520.

Microsoft Computer Dictionary, 4th Edition, Microsoft Press, Redmond, WA, 1999, p. 348.

Bayardo, Roberto J., et al. "Peer-to-Peer Sharing of Web Applications", WWW 2003, Budapest, Hungary, May 20-24, 2003, pp. 1-2.

Gradman, Eric, "Distributed Social Software", Dec. 12, 2003, pp. 1-10.

Pachet, Francois, et al. "Popular Music Access: The Sony Music Browser", Journal of the American Society for Information Science and Technology, vol. 55, Issue 12, May 13, 2004, pp. 1037-1044.

Wolz, Ursula, et al., "r-Music, A Collaborative Music DJ for Ad Hoc Networks,", WEDELMUSIC '04, Sep. 13-14, 2004, pp. 144-150.

Crossen, Andrew, et al., "Flytrap: Intelligent Group Music Recommendation", RIDE-VE '99, Sydney, Australia, Mar. 23-24, 1999, pp. 148-155.

Hauver, David B., et al., "Flycasting: USing Collaborative Filtering to Generate a Playlist for Online Radio", WEDELMUSIC '01 Nov. 23-24, 2001, pp. 123-130.

Ku, William, et al., "Survey on the Technological Aspects of Digital Rights Management", ISC 2004, LNCS 3225, Springer, Berlin, Sep. 21, 2004, pp. 391-403.

Liang, Qianhui, et al. "A United Approach to Discover Multimedia Web Services", ISMSE '03, De. 10-12, 2003, pp. 62-69.

Microsoft Computer Dictionary, 4th Edition, Microsoft Press, Redmond, WA, 1999, p. 348 and 461.

Imad M. Abbadi, Chris J. Mitchell, "Digital Rights Management Using a Mobile Phone", Aug. 2007, ICEC '07: proceedings of the ninth international conference on Electronic commerce, Publisher: ACM, pp. 185-194.

Hayes, Conor, et al. "Context Boosting Collaborative Recommendation", Knowledge-Based Systems, vol. 17, issues 2-4, May 2004, pp. 131-138.

Tzanetakis, George, "Musescape: A Tool for Changing Music Collections into Libraries", ECDL 2003, LNCS 2769, Springer-Verlag, berlin, Feb. 26, 2004, pp. 412-421.

Cano, Pedro, et al. "MTG-DB: A Repository for Music Audio Processing", WEDELMUSIC '04, Sep. 13-14, 2004, pp. 2-9.

Vinet, Hughes, et al. "The CUIDADO Project", IRCAM, 2002, pp. 1-7.

Microsoft Computer Dictionary, 5th Edition, Microsoft Press, Redmond, WA, 2002, pp. 19, 410, 539 and 542.

Stauffer, "How to do everything with iTunes for Macintosh and Windows." published Feb. 27, 2004, 11 pages.

Lee, Kyung Hee, et al., "Requirements and Referential Software Architecture for home Server based Inter-Home Multimedia Collaboration Services", IEEE transactions on Consumer Electronics, Vlume 50, Issue 1, Feb. 2004, pp. 145-150.

Haneef, Anwar M., et al., "ANMoLe-An Adaptive Multimedia Content Delivery Middleware Architecture for Heterogenous Mobile Multi-Device Neighborhoods", Multimedia Tools and Applications, vol. 22, No. 2, Feb. 2004, pp. 171-186.

* cited by examiner

5500

Smart Playlist Builder

SELECT A PLAYLIST: Songs added to my collection in the past week

Hide criteria

CREATE A PLAYLIST WITH UP TO [50] [SONGS] — 7305
7304
MATCHING [ANY] OF THE FOLLOWING CRITERIA: — 7303

| Criteria | is | Value | - |
| Criteria | is | Value | + |

— 7301  — 7302

— 7312

7310 — [GERERATE PLAYLIST] [SAVE CRITERIA AS...]

| MY SONG RATING | SONG | ARTIST | STATUS |
|---|---|---|---|
| ★★★★★ | Can I Sit Next To You Girl | AC/DC | LAUNCH |
| ★★★★★ | Baby | Ashanti | LAUNCH |
| ★★★★★ | Satisfy My Soul | Bob Marley & The | LAUNCH |
| ★★★★★ | Hey Ma (Radio Version) | Cam'Ron | LAUNCH |
| ★★★★★ | Piimp Like Me | D12 | LAUNCH |
| ★★★★★ | Heaven (Radio Version) | DJ Sammy & Yanou | LAUNCH |
| ★★★★ | Cleanin Out My Closet | Eminem | My Library |
| ★★★★ | Don't Turn Off The Lights | Enrique Iglesias | LAUNCH |
| ★★★★ | Lay Down Sally | Eric Clapton | LAUNCH |
| ★★★★ | Gangsta Lovin' (Radio Edit) | Eve | LAUNCH |
| ★★★★ | What Do You Need? | Goo Goo Dolls | LAUNCH |
| ★★★★ | Down 4 U (Radio Edit) | Ja Rule | LAUNCH |
| ★★★★ | Sweetness | Jimmy Eat World | LAUNCH |
| ★★★★ | Move B***h | Ludacris | LAUNCH |
| ★★★★ | 3:00 AM | Matchbox Twenty | My Library |
| ★★★★ | Goodby To You (Radio | Michelle Branch | LAUNCH |
| ★★★★ | Can I Sit Next To You Girl | AC/DC | LAUNCH |
| ★★★★ | Baby | Ashanti | LAUNCH |
| ★★★★ | Satisfy My Soul | Bob Marley & The | LAUNCH |
| ★★★★ | Hey Ma (Radio Version) | Cam'Ron | LAUNCH |
| ★★★★ | Pimp Like Me | D12 | LAUNCH |
| ★★★★ | Heaven (Radio Version) | DJ Sammy & Yanou | LAUNCH |
| ★★★★ | Cleanin Out My Closet | Eminem | LAUNCH |
| ★★★ | Don't Turn Off The Lights | Enrique Iglesias | LAUNCH |
| ★★★ | Lay Down Sally | Eric Clapton | LAUNCH |
| ★★★ | Gangsta Lovin' (Radio Edit) | Eve | LAUNCH |
| ★★★ | What Do You Need? | Goo Goo Dolls | LAUNCH |
| ★★★ | Down 4 U (Radio Edit) | Ja Rule | LAUNCH |
| ★★★ | Sweetness | Jimmy Eat World | LAUNCH |
| ★★★ | Move B***h | Ludacris | LAUNCH |

7315

[PLAY] [ADD TO...] [DOWNLOAD] [INFO...]          [SAVE LIST AS...]

SYSTEM AND METHOD FOR ENHANCED MEDIA DISTRIBUTION

CROSS-REFERENCE TO RELATED APPLICATION

This application claims the benefit of U.S. Provisional Application Ser. No. 60/657,222, filed Feb. 28, 2005, entitled A SYSTEM AND METHOD FOR DELIVERING MEDIA OVER A NETWORK, and U.S. Provisional Application Ser. No. 60/678,718, filed May 5, 2005, entitled A SYSTEM AND METHOD FOR DELIVERING MEDIA OVER A NETWORK, both of which are hereby incorporated herein by reference.

BACKGROUND OF THE INVENTION

1. Field of the Invention

The present invention relates generally to a method and a computer readable medium for searching for media items from a network of users using a media management application and an instant messenger platform and a system for handling searches such searches.

2. Background of the Invention

The expansion of the Internet and the World Wide Web ("web") has given computer users the enhanced ability to listen to and to watch various different forms of media through their computers. This media can be in the form of audio music, music videos, television programs, sporting events or any other form of audio or video media that a user wishes to watch or listen to.

In the past, users were able to purchase some form of removable media (e.g., compact disc), place the media into their computer's drive and listen to the song that was on their removable media. As time evolved, users were able to take the music that was on that compact disc store it on their computers and listen to it locally. More recently, web systems were developed which allowed a user log on to a network such as the Internet and, using a media player, either listen to specific media chosen from a group of media that a particular service has to offer or listen to an array of media offerings such as a radio station wherein different songs or other forms of media are combined to allow a user to listen to a group of songs in sequence, whether chosen by the user or by the operators of the network service. For example such a service is Yahoo!™ Music. Many media players, services and other software tools enable media to be organized by a user or a service into playlists, which, as the name connotes, are groups or lists of media files or file identifiers that can be used to effect playback by a user in a sequence or other selected or random order.

Newer technology has also allowed computer users to purchase portable devices that are able to store a user's media, making the user's media portable in the sense that a user can take his or her music with them wherever they may be going. These devices permit the storage and transport of the actual media files that are downloaded from a user's computer or a network onto the portable device. These portable devices are able to store individual media files and/or playlists that a user wishes to make portable. Thus, if a user has a certain media file on their computer the user can transfer that media file onto the portable device and transport it to locations different from the location where the user's computer system is located. Although these devices are popular today, they do have numerous drawbacks in that a user is severely limited in the range of what type of media they can store on their portable device and the ease of storing such media. This is because these devices only allow a user the capability of transporting media that is available locally on their computer as well as media that is available from a network service that offers such media. It is a shortcoming in the art that there is no system by which the user could broaden the range of media that can be made portable so as not to be constrained by the bounds and limits of certain Internet services' range of media or offerings. It would also be advantageous if a system or service was able to create a playlist and/or suggest different media for a user based on the user's previous experience and then make that media available at multiple media enabled devices as well as made portable, so that the user need not individually download each specific song and/or other media that the user likes but rather, in addition to the user's own selections the system would be able to grant the user more variety as well as spontaneity in the media available to the user no matter where the user might be located.

Another by-product of the expansion of the web is the interaction between different users by various different means such as email and/or instant messaging. This interaction has resulted in the ability for computer users to share many different types of information. For example, one user may send another user the Universal Resource Locator (URL) which points to a specific website that one user wishes the other user to experience. In another situation one user may wish to send another user a media file that they wish the other user to experience. This can be accomplished by sending the other user the actual media file attached to an email or instant message. On the other hand one user may send another user an URL, which links to a particular media file and is stored on a particular network. All of these systems however utilize an email, instant messaging or similar service to transfer information regarding the particular media that the user wishes to share and/or recommend. What is lacking in each of the currently available systems is a system in which a user may utilize their own media player to communicate their likes or dislikes for a particular media item to another user. It is a shortcoming in the art that there is no media system or service available wherein a user can, from within the media system and/or an enhanced media player, communicate with another user and share media with that other user and/or express a like or dislike for particular media. It would also be beneficial over known systems for a user to not have to rely on utilizing multiple programs to share or recommend music or other media to other users. It would be similarly advantageous over known systems to have one media player or to be more precise, a media engine which is able to play media as well as address a multiplicity of other user's media related needs and thus enable the user to have a more enhanced media experience.

An additional by-product of the expansion of computer related technology is that a single user in various circumstances may have more than one computer or media capable device located in numerous different locations through which a user may wish to experience their media. In the past, the users who wished to transfer or transport media files between different locations would have to go through the cumbersome steps of either transferring the media files by hand (e.g., on a compact disc), emailing or instant messaging the media file to themselves and then opening the file at a second location, or attempting to locate the media file on a particular media network service and then once again loading that particular media at a second computer location.

SUMMARY OF THE INVENTION

In one embodiment, the present invention includes a method of searching for media items from a network of users using a media management application and an instant messenger platform, comprising: receiving via the application and the instant messaging platform, from a first user having a group of messenger friends that the first user communicates with, a search request for a media item; identifying a plurality of other users of the instant messaging platform to form a list of candidate users that comprises at least one user from the group of messenger friends, each user in the candidate list utilizing another instance of the application and the messaging platform at the time the identification takes place; searching media items associated with each candidate user to develop a search result that fulfills the search request; and returning to the first user the search result comprising information identifying which candidate user is associated with a media item source that can act as a source of a media item identified in the search result.

In one embodiment, the present invention includes a computer readable medium comprising software code for a media management application and an instant messenger platform, the code configured to implement functions comprising: receiving, via the application and the instant messaging platform from a first user having a group of messenger friends that the first user communicates with, a search request for a media item; identifying a plurality of other users of the instant messaging platform to form a list of candidate users that comprises at least one user from the group of messenger friends, each user in the candidate list utilizing another instance of the application and the messaging platform at the time the identification takes place; searching media items associated with each candidate user to develop a search result that fulfills the search request; and returning to the first user the search result comprising information identifying which candidate user is associated with a media item source that can act as a source of a media item identified in the search result.

In one embodiment, the present invention includes a system for handling searches for media items from a network of users comprising: a media management application and an instant messaging platform for performing functions comprising: receiving a search request for a media item from a first user having a group of messenger friends that the first user communicates with; identifying a plurality of other users of the instant messaging platform to form a list of candidate users that comprises at least one user from the group of messenger friends, each user in the candidate list utilizing another instance of the application and the messaging platform at the time the identification takes place; searching media items associated with each candidate user to develop a search result that fulfills the search request; and returning to the first user the search result comprising information identifying which candidate user is associated with a media item source that can act as a source of a media item identified in the search result.

In one embodiment, the present invention includes a method of searching for media items from a network of users using a media management application and an instant messenger platform, comprising: sending from a first user utilizing the application and the instant messaging platform, a search request for a media item to a server; and receiving a search result comprising information identifying at least one candidate user associated with a media item source that can act as a source of a media item identified in the search result wherein the candidate user is selected from a list of candidate users that comprises at least one user from a group of messenger friends that the first user communicates with, each user in the candidate list utilizing another instance of the application and the instant messaging platform at the time the at least one candidate user is identified.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIG. 73 is an exemplary user interface used in creating a playlist with an exemplary media engine according to one embodiment of the present invention;

DETAILED DESCRIPTION OF PREFERRED EMBODIMENTS

In general, the present invention relates to a system and method for delivering media over a network and for enhancing a user's experience in experiencing the media that is transferred over the network. In view of the aforementioned shortcomings in the art, it would be advantageous if a system was available wherein a user had complete and unfettered access to all media files that he or she has purchased, acquired and/or has access to at any location that they wish. Moreover, as was discussed above, current systems grant the user the ability to transport a media file on a portable device. These portable devices are limited in space and it becomes cumbersome to have to upload and download from the devices to and from each specific location that a user wishes to access files from. Therefore it would be advantageous if a system existed where a user was able to access these files through a click of a mouse on their local system with a minimum of cumbersome intermediary steps.

Figure 1:
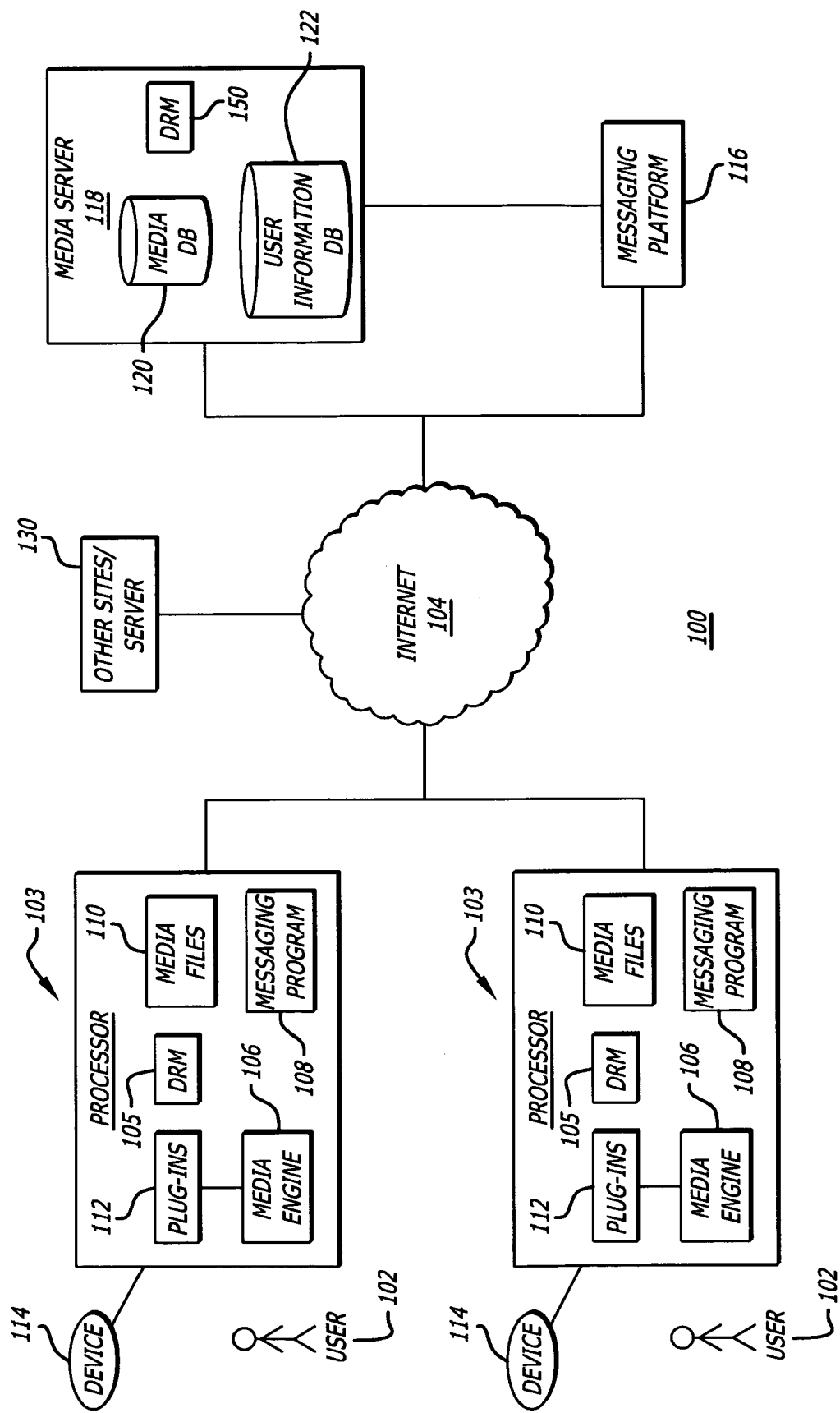
FIG. 1 is a schematic illustrating an exemplary system architecture of one embodiment of the present invention.

A certain embodiment of the present invention will now be discussed with reference to the aforementioned figures, wherein like reference numerals refer to like components. Referring now to FIG. 1, the architecture of one embodiment of the present invention is shown in schematic form. As can be seen in FIG. 1, a system 100 according to one embodiment of the present invention is shown. In general the system 100 allows users 102 to experience, share, and otherwise utilize different media. Although numerous exemplary embodiments will be discussed in terms of music and/or audio files, this invention can also be utilized with any form of audio, video, digital or analog media content, as well as any other media file type now known or to become known.

Each user 102 utilizes a processor 103, such as personal computer (PC), web enabled cellular telephone, personal digital assistant (PDA) or the like, coupled to the Internet 104 by any one of a number of known manners. Furthermore, each processor 103 preferably includes an Internet browser (not shown), such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users. Each processor also includes a media engine 106 that, among other functions to be further described, provides the ability to convert information or data into a perceptible form and manage media related information or data so that user 102 may personalize their experience with various media. Media engine 106 may be incorporated into processor 103 by a vendor of processor 103, or obtained as a separate component from a media engine provider or in some other art recognized manner. As will be further described below, it is contemplated that media engine 106 may be a software application, or a software/firmware combination, or a software/firmware/hardware combination, as a matter of design choice, that serves as a central media manager for a user and facilitates the management of all manner of media files and services that the user might wish to access either through a computer or a personal portable device or through network devices available at various locations via a network. As used herein, the term media file is used generically to refer to an item of media, as well as associated metadata and/or network location information for that item.

The media engine 106 to be described herein is interacted with through a graphical user interface and related functionality so that a user, through a central and common entry point, and through a readily understood graphical user interface, can manage and access media files available through disparate sources as well as personally collected and organized sources. Thus, with initial reference to FIG. 2, an exemplary preferred graphical user interface for media engine 106 is depicted. As can be seen from a review in FIG. 2, the user interface from media engine 106 facilitates the management and organization of, in the depicted example music files, available as part of a user's own stored library of media files, media files available through outside service providers, music available on compact disc or an associated player device, as well as other sources of music or media related information. Thus the media engine, through its user interface, acts as a gateway to all of the user's media wherever it may be found. Thus the media engine contemplated by the present invention extends beyond the capability of presently known media player software by greatly expanding functionality, organization capabilities and integration functions heretofore not found in known media players.

Additionally, in the described embodiment, the processor 103 also runs an instant messaging software program 108 that is used to communicate with an instant messaging platform 116 and to facilitate the exchange of messages and other information between users. One such example of an instant messaging program is Yahoo! Instant Messenger, or any other instant messaging program now known or hereafter to become known. Although this embodiment is preferably described in terms of an instant messaging program it can also utilize other forms of communication over the network heretofore or hereafter known. Processor 103 also may include storage of local media files 110 and/or other plug-in programs that are run through or interact with the media engine 106. Processor 103 also preferably is connectable to device 114 such as a compact disc player and/or other external media file player, commonly referred to as an MP3 player, such as the type sold under the trade name iPod by Apple Computer, Inc., that is used to portably store and play media files.

Additionally, processor 103 may contain Digital Rights Management software (DRM) 105 that protects the copyrights and other intellectual property rights of the user's 102 media files by enabling secure distribution and/or preventing or hampering illegal distribution of the media files. In one embodiment, DRM 105 encrypts or decrypts the media files for controlled access by authorized users, or alternatively for marking the content with a digital watermark or similar method so that the content can not be freely distributed. Media engine 106 preferably uses the DRM information to ensure that the media files being experienced through media engine 106 are not copied to or shared with users that are unauthorized to listen to or view the content.

As will be discussed in greater detail below, in addition to the messaging platform 116, the system 100 also includes media server 118. In addition to serving media over the Internet 104 to the user 102, media server 118 also preferably includes a media database 120, which in addition to storing the actual media also stores or communicates with storage of various metadata attributes of each particular piece of media. Database 120 may be distributed over multiple servers or locations. Other servers 130 make other content and services available and may provide administrative services such as managing user logon, service access permission, digital rights management, and other services made available through a service provider. Although some of the embodiments of the invention are described in terms of music, embodiments can also encompass any form of streaming or non-streaming media including but not limited to news, entertainment, sports events, web page or perceptible audio or video content. It should be also understood that although the present invention is described in terms of media content and specifically audio content, the scope of the present invention encompasses any content or media format heretofore or hereafter known.

In one embodiment of the present invention, similar to the DRM software 105 located on the user's 102 processor 103, the media server maintains its own DRM software 150 which tracks the digital rights of media files located either in the media database 120 or stored on a user's 102 processor. Thus, for example, before the media server 118 streams or serves up or transfers any media files to a user 102, it validates the rights designation of that particular piece of media and only serves streams or transfers the file if the user has the appropriate rights.

As illustrated in FIG. 1, the users 102, the media server 118 and messaging platform 116 as well as the other servers 130 are communicatively connected via the Internet 104. In alternate embodiments, different components of the system may be communicatively coupled differently, for example each may be coupled directly to each other wirelessly or by a local or wide area network (WAN) or the like. Additionally, functional components can be distributed so that certain functions of media engine may be performed at media server 118, or vice versa, or distributed in modular fashion for operation at various locations throughout the system 100. Thus, the description herein of a function or component being associated with a particular device or component or location is merely exemplary.

A further architecture of a network 300 according to another embodiment of the present invention will now be discussed with reference to FIG. 3. This embodiment maintains a broader network, which includes a plurality of users 102 such as, for example, user A, user B, and user C. Each user maintains at least one processor 103 that contains media engine 106 as well as a messaging program 108, local media files 110 and a variety of software plug-ins 112 as was discussed with reference to FIG. 1. Additionally, each of the processors 103 may also contain local devices 114 and these processors also preferably contain digital rights management software or functionality 105, as was discussed above in FIG. 1. The processors 103 may be connected to each other directly or via the Internet 104 or some other communication network. Additionally, these processors are connected via Internet 104 to media server 118. As was discussed above with reference to FIG. 1, media server 118 contains media database 120, user information database 122 as well as a digital rights management 150. Additional databases are also connected to the media server to manage or service the overall network 300. For example, ratings database 320 contains information about the ratings that particular users can apply to a particular media file in numerous different formats that will be discussed later in reference to FIG. 2. Additional databases connected to the media server are playlist database 340, which stores playlists that are created by a user that combines various media files which may be located either on processor 103 or media database 120 or elsewhere. These playlists stored in the playlist database can also be made available to various different users 102 of network 300, as will be discussed later. As was discussed with reference to FIG. 1, media server 118 is also connected to messaging platform 116 which helps interconnect the various users and also stores additional information about particular users. For example, messaging platform 116 can also be connected to an additional user information database 360 which contains specific information about users' connectivity to the messaging platform and connectivity to each other. For example, this user information database may contain information regarding each particular user 102 as well as the user's processor 103 as well as the connections that user processor 103 maintains with other processor 103's. The use of this information and how it improves the interconnection between different users utilizing the messaging platform will be discussed later in reference to FIG. 71. In another embodiment, media server 118 also includes an affinities engine 4050 that is used to help generate affinity playlists as will be discussed below in reference to FIG. 47, FIGS. 48 and 45.

Figure 3:
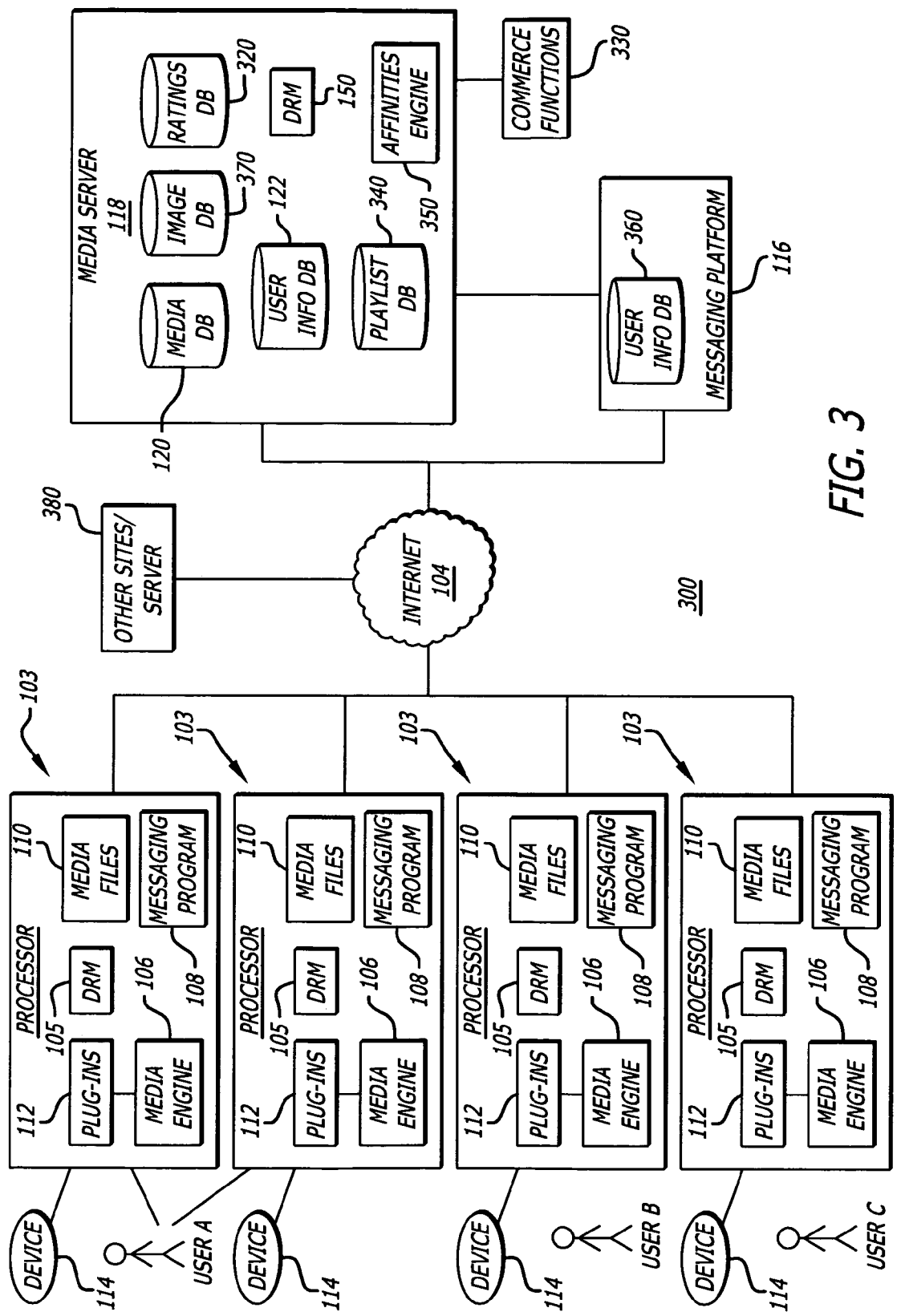
FIG. 3 is a schematic illustrating an exemplary network architecture according to one embodiment of the present invention.

Additionally as can be seen in FIG. 3, the media server and the messaging platform are also directly connected to other sites or servers 380 that are available throughout the Internet. These sites may be sites that are publicly accessible to user 102 such as a commerce website or the sites may be internal sites that are only available to the media server and/or the messaging platform. Within network 300, each particular user preferably has a distinct identifier or "user Name" which is used to track the particular user as well as manage all activity that the user is involved in both via the media server as well as many other servers connected through that network 300. This user Name is stored within the user information database 122 and is a distinct identifier for each particular user. Additional information stored about the user preferably includes the user's personal information such as home address, email address and/or telephone number. This database may also include user's personal preferences for using the network, for example, if a user A uses media engine 106 for accessing media and indicates a preference for a particular media or indicates a preference to be alerted when a particular media item becomes available, such preferences would be stored together with the user Name in user database 122. Alternatively, these preferences can be stored anywhere on network 300 including user's 102 processor. Thus, if media server 118 was to make those particular songs available to users of the network 300, it would search through the preferences, for example, in user information database 122 to find which users that might want that song and, as in the above example, user A's preferences would alert media server 118 to send or otherwise make available that particular song to user A's media engine 106.

Moreover, in this embodiment, the overall network 300 is connected in such a way that the media server 118, as well as the other servers, are able to interconnect with each other to optimize the experience for a particular user 102. As will be discussed further below, while a particular user may be locally associated with a particular processor 103, when connected to network 300, that user will have the ability to access all of the resources available throughout network 300 whether those resources reside on a particular server or whether those resources reside on another processor. The network 300 is able to collect and retain user specific information to enhance the user's experience through the resources available as part of the network. Thus, throughout the network, different users 102 will be accessing the same media server 118 via their individual media engine 106, however, their individual listening experience will be tailored to their particular needs and will utilize the capabilities of the entire network.

Figure 4:
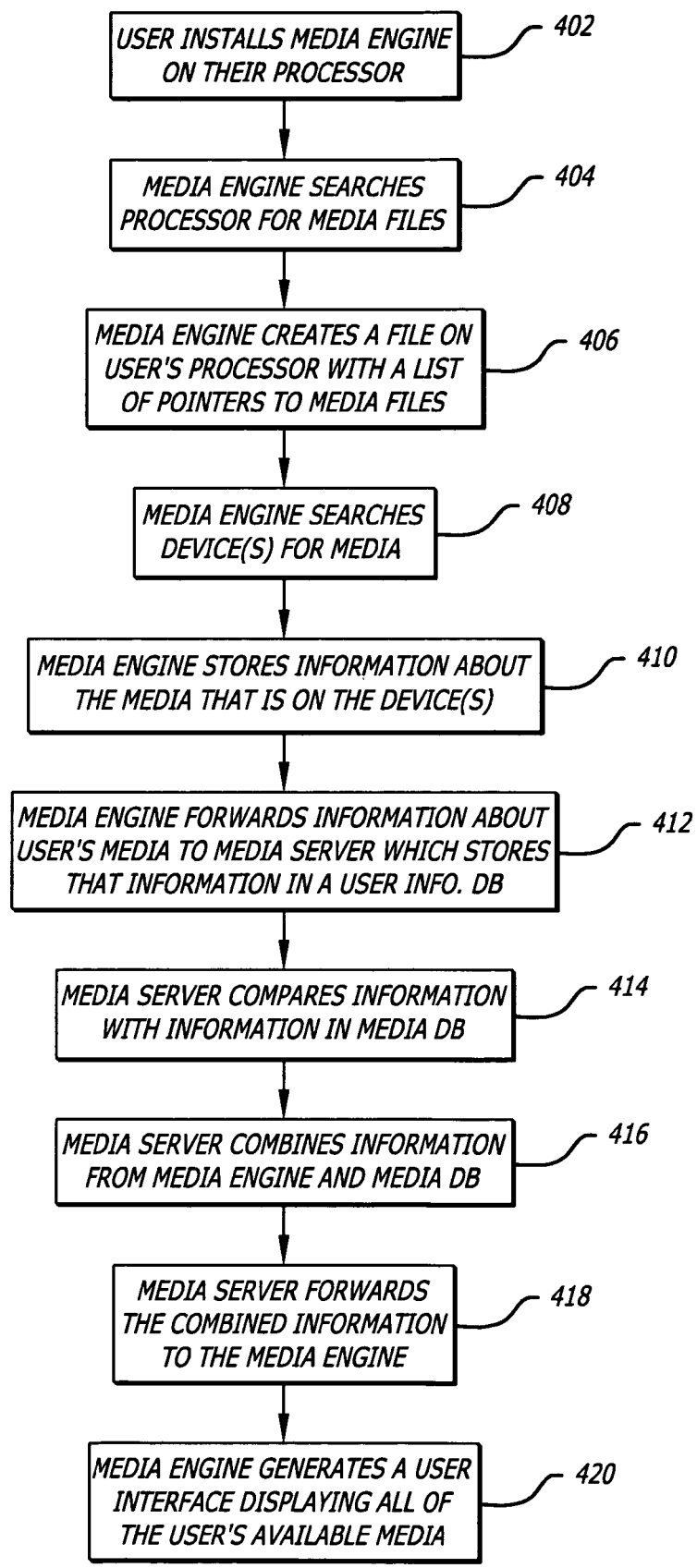
FIG. 4 is a flowchart depicting the organization and classification of a user's media files according to one embodiment of the present invention.

In one embodiment of the present invention, the system 100 is able to manage users 102 media files in such a manner that facilitates the easy playback of different media files located in different locations throughout the network 300 as well as the creation of playlists or other combinations of media that can easily be accessed by each individual user 102 from any processor where the user 102 is located. In another embodiment of the present invention, two or more different users 102 are able to share and/or recommend media files amongst each other (if properly authorized) utilizing media engine 106. This is carried out by the interaction of media engine 106 and media server 118 which both share and store data that pertains to both users 102 as well as the media that is stored on media server 118 and the user's 102 respective processor 103. When the user 102 installs or utilizes media engine 106 on processor 103, the media engine 106 goes through various different steps to both acquaint itself with user's 102 media as well as to interact with media server 118. FIG. 4 depicts steps associated with this process.

Referring to FIG. 4, first, user 102 installs or otherwise instantiates media engine 106 on their processor 103. Step 402. Once the user has installed the media engine 106 on their processor 103, the media engine searches processor 103 for any media files that it is able to locate on processor 103. Step 404. If the media engine 106 is able to locate any media files on processor 103, the media engine 106 creates a file that is stored within the media engine 106 that contains information on the media files that have been found. Step 406. This file contains information about each media file including the location of the media file as well as metadata stored with the media file such as song name, artist name, or album name. If no such information is available with the media file, media engine 106 merely stores a pointer and/or location reference for the media file with an indicator indicating that there is no metadata available for this particular media file. In other embodiments, the media engine 106 and/or the media server on the network can undertake steps to search the network for information about a particular media file in order to obtain useful metadata for the user.

Media engine 106 also searches for any devices 114 (MP3 player, CD drive, flash memory etc.) that may be located on or connected to user's 102 processor 103 that may contain media. If such a peripheral device is found, the media engine determines whether there is any media located within that peripheral device. Step 408. If there is, media engine 106 stores information about that media including any associated metadata, in a file so as to enable the media engine 106 to access that data at a later point in time. Step 410. Once media engine 106 has acquired all information about the location of and the content of media files located on user's 102 processor 103 or its peripheral device(s) 114, the media engine 106 is able to communicate with media server 118 to pass along the information that media engine 106 has acquired about the media files from processor 103. Media server 118 receives this information through the file or files created by media engine 106 containing the location and metadata information about the media files located on processor 103 and stores that information along with the other user information in user information database 122. Step 412. The media server 118 then compares the information received from the media engine 106 with the media files and associated metadata located in media database 120. Step 414. If the media files that are located on processor 103 match media files that are located on media database 120, media server 118 notes the location of those media files within media database 120 and appends that information to the file containing the information acquired by media engine 106 from processor 103. Step 416. Media server 118, then sends a file which contains an updated list of media files that combines both the media files that are located on processor 103 as well as information about the media files that media server 118 wishes to make available to user 102 from media database 120. Step 418. Once the media engine 106 acquires this file, it generates an interface which enables the user to manage all of the media available to the user in an efficient and coherent manner as will be discussed in reference to FIG. 2. Step 420. Thus, once the media engine 106 has acquired all of the information relating to the media files located both locally on processor 103 as well as those files available to user 102 from the media server 118, the media engine 106 allows the user the ability to both locate and access that media from one central location through the media engine 106. In other words, when a user 102 uses the media engine 106, he or she is able, from one central location, to access or manipulate media and information that is available locally on processor 103, from media server 118, or from elsewhere on the network.

Moreover, through the use of the media engine, the user is able to bookmark media that is located locally that the user 102 wants to make available from different processors 103 located in different locations. In other words, if user 102 has both a processor 103 located at home as well as a processor 103 located at work, the user can designate or the system can designate (in accordance with user preference criteria) some or all media files that are located at his or her home processor 103 that he or she wishes to be able to experience at processor 103 located at work or elsewhere. This once again is managed via the media engine 106 that both tracks, processes and shares information about the media file with the media server 118. Thus, if a user 102 wishes to experience media files that are located on processor 103 at a different location, the user would seamlessly be able to access and experience those media files from any processor that is running media engine 106 and has access to media server 118. This is because media engine 106 has previously stored all the metadata information as well as all the location information about each and every media file on processor 103, and forwarded this information to media server 118. Thus, for example, if a user 102 wishes to experience a media file that is located on a different one of their processors, media engine 106 located on the processor where the user is located would request a media file from media server 118 which is able to look up and access all of the user's media files from information available to the media server 118. Once media server 118 locates the particular media file being requested, media server 118 is able to retrieve that media file and stream it, forward it, or otherwise make it available to media engine 106 that is installed on processor where user 102 is currently located. Conversely if another user logs on using the same processor he or she will not be able to access the first user's bookmarked media files unless he or she bookmarks them independently of the first user. As can be seen, the interaction between the media engine 106 and media server 118 creates a robust media collection and management tool for the collection and management of media files that a specific user 102 is able to access from various locations. Media engine 106 is also able to utilize this functionality to exchange music between different users 102 as will be discussed below. The user interface according to one embodiment of the present invention, which carries out the functionality discussed above, will now be discussed in reference to FIG. 2.

Individual users 102 can maintain different processors and/or devices on which they can obtain and/or listen to media files. For example, a user may maintain a processor at his or her home, a processor at his or her place of work, a portable device in his or her car and/or a media player at another location each of which is capable of accessing the network 300 and/or playing media files. In one embodiment of the present invention, when a user utilizes media engine 106 to access media files, the media engine is able to maintain information regarding the user and/or media files being played. This enables the user to enhance their listening experience by being able to transfer the listening experience from one location to another. For example, if a user is listening to a particular song on their home processor, and has to leave the home and go to their car, the user can maintain the status of where they were listening to the song from the media engine on their home processor and pick up from that point on their local media device in their car or media device in other location. Thus when the user leaves the processor at home, the media engine 106 saves information about what song the user was listening to and passes that information along to media server 118. When the user reconnects to the network from the second location (e.g. their car) the media engine 106 located at the second location where they currently are will query the server for the location of the music that was being listened to and will then locate that music and stream it or otherwise make it available to the second location. If for some reason, the media engine at the second location is unable to access the song from the same location because, for example, the second location does not have a connection to the location where the media file is located or the location where the media file is being streamed is currently offline, the media engine will attempt to locate that song from a different authorized location and stream it to the user at a new location. Thus it should be appreciated that this enhances a user's experience in that a user is able to enjoy an all encompassing experience wherein the experience can be extended to various different locations at various different times on the various different devices. The user interface according to one embodiment of the present invention, which carries out the functionality discussed above, will now be discussed in reference to FIG. 2.

It should be noted that different components of the functionality described above can take place within different components of network 300 with information residing in different or the same components. For example, either the media engine 106 or the media server 118 can maintain any or all of the data regarding the media files as well as any location information about the media files. If the data about the media files is maintained completely on media engine 106, for example, different media engines 106 may communicate amongst themselves without any necessity to access the media server 118. Similarly, additional servers can be utilized by the network 300 to distribute the information more widely.

Figure 2:
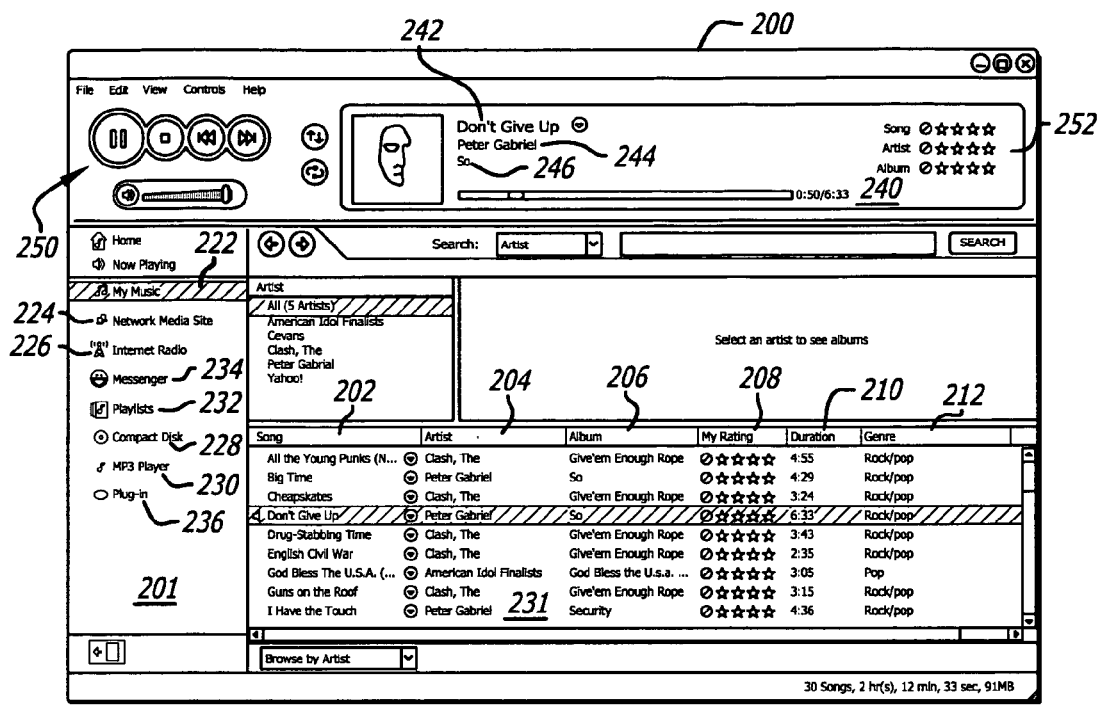
FIG. 2 is an exemplary user interface of an exemplary media engine according to one embodiment of the present invention.

As can be seen in FIG. 2 and described further below, when a user 102 utilizes media engine 106, all of the media files available to the user are organized in a logical fashion for display to the user in user interface 200. User interface 200 is preferably presented with a plurality of panes within which media information is displayed. Referring now to pane 201, a list of the various media resources or sources where a user's media is located is displayed. As was discussed above, media engine 106 acquires and stores information concerning the user's media located on processor 103 and available via media server 118. With reference to FIGS. 2 and 3, for example, in this embodiment, a user is able to view all of the media files arranged by particular source or location, or a complete list of all of the available media files. For example, by clicking on the "my music" tab 222 a user can view all of the music available to that user stored locally or in the media database 120 or from other sites or servers 380. Preferably, once a user has chosen to access the "my music" tab 222, a list of all of the media that is available to the user either via the user media files 110, local device 114, through the media database 120, or other sites or servers 380 is listed in the right-most pane 231. The list is sorted into columns representing information about each respective media file including, for example, Song Title 202, Artist 204, Album 206, Duration 210 and Genre 212 and can be arranged in any other order that the user wishes, (e.g., alphabetically by Artist). The media engine 106 is able to locate this information from the metadata relating to each particular item of media that it has previously acquired and stored as was discussed above. Pane 231 provides the user the ability to view all available media in one location and sort that media in a user-friendly format by sorting by column in a manner known in the art.

Via pane 201, the user is also able to separately view the media stored in media database 120 by clicking the network media site tab 224. This information once again is available to media engine 106 based on the information received from media server 118 as was discussed above with reference to FIG. 4. If the user clicks on tab 224 a display will appear in pane 231 that will display the media available from media database 120 as will be discussed below in reference to FIG. 33. In order to compile this list, the media engine 106 queries media server 118 for all the available user-related media information and for media files located in media database 120 and populates pane 231 with the appropriate metadata in the same manner as was discussed above. Search functionality is also preferably provided to permit a user to search media database 120 for desired items of media, for example, by searching for artists, song titles, genres or other media criteria.

In one embodiment, media database may contain media files available for lease or purchase, in which case the media server 118 would include a commerce component that gives the user an option to search for and purchase, lease, rent or otherwise obtain authorized versions of media located through media database 120. For example, if the site or server 380 accessed through tab 224 is a music seller, user can click tab 224 to be taken to a commerce site to purchase music or media to be added to user's collection, which could then be managed by the media engine. Additionally, user preference information gained through the user's interaction with the media engine may be made available to the commerce site to present recommended purchases.

It should be appreciated that although various embodiments are discussed in terms of a "my music" collection or "my music" tab, the title of this tab or collection can be anything and the "my music" nomenclature is used herein for ease of explanation.

In this exemplary embodiment, the user is also able to access an Internet Radio provider site 380 that may be available via a button or links displayed in pane 201. For example, if a user clicks upon Internet Radio Tab 226, an Internet Radio available from media server 118 or other site 380 will open allowing the user to experience various radio stations via the media engine 106. Similar to the commerce feature, user preference information gained through the user's interaction with the media engine may be made available to the radio station to influence music selections presented by the radio station. One such radio station is Launchcast, available from Yahoo! Inc. of Sunnyvale, Calif.

Alternatively, in a similar manner, the user may also be able to view a comprehensive list of the songs available on a local device 114 which can be accessed for example via compact disc tab 228 or MP3 player tab 230. This information is once again utilized by media engine 106 from the information earlier acquired by the media engine at the time of initiation, installation, or thereafter as discussed above in reference to FIG. 4. Moreover, the user is also able to list songs in a particular playlist list 232, which will be discussed in more detail below. The updating of information available through media engine 106 can occur at a user selected time, or automatically upon certain events occurring, e.g., a CD is placed in a drive or MP3 device plugged into processor 103, can be initiated at program start or install, or can be programmed to occur at intervals, or under instruction from media server 118, other network site 380, or other program or processor 103 or on network 300.

An embodiment also preferably allows the user the added ability to use a rating tool shown in column 208 to rate a particular song from within pane 231. For example, a user may rate a particular song that he or she really likes with four stars while giving zero stars to a song that the user does not particularly care for. Once rated, the user would be able to view his or her list of songs ordered by a particular rating. Thus a song a user particularly enjoys may be listed at the top of the list while a song that the user does not particularly care of may be moved further down.

In another embodiment, the ratings applied by a user are associated with a user identification. The user id and associated rating is stored in the user information database located on the media server. Thus, the user is able to view and access this rating from multiple processors and locations.

In further embodiments, other items may be associated with a user's identification and similarly stored in the user information database or other database residing on the media server wherein the item is accessible by the user at any location where they have a media engine and can connect to the system.

The user information database 122 is preferably made available to any application with proper access to the system, to leverage the user information and to enhance the user's experience with all aspects of the system 100/300.

By organizing and storing user information and making it available to multiple applications on system 100/300, a user need only rate a song or artist or album once, and that rating will be made available to any application or feature or function of system 100/300 that can utilize user rating data. Thus, for example, if a user "rips" a song from a CD using client side music engine 106, and rates it using the user interface, e.g., pane 231, that rating will be passed to user database 122 on media server 118. When the user subsequently selects their radio station to listen to from pane 201, the radio station application (not shown) would access user database 122 and obtain that song rating and incorporate it into any programming algorithms used to program radio content for that user. The same process would apply in reverse if the user rated the song while listening to the radio. Thus, a user's preferences can be stored by and/or incorporated into various features and functions and applications available on system 100/300 without the need for the user to rate the song more than once.

Figure 84:
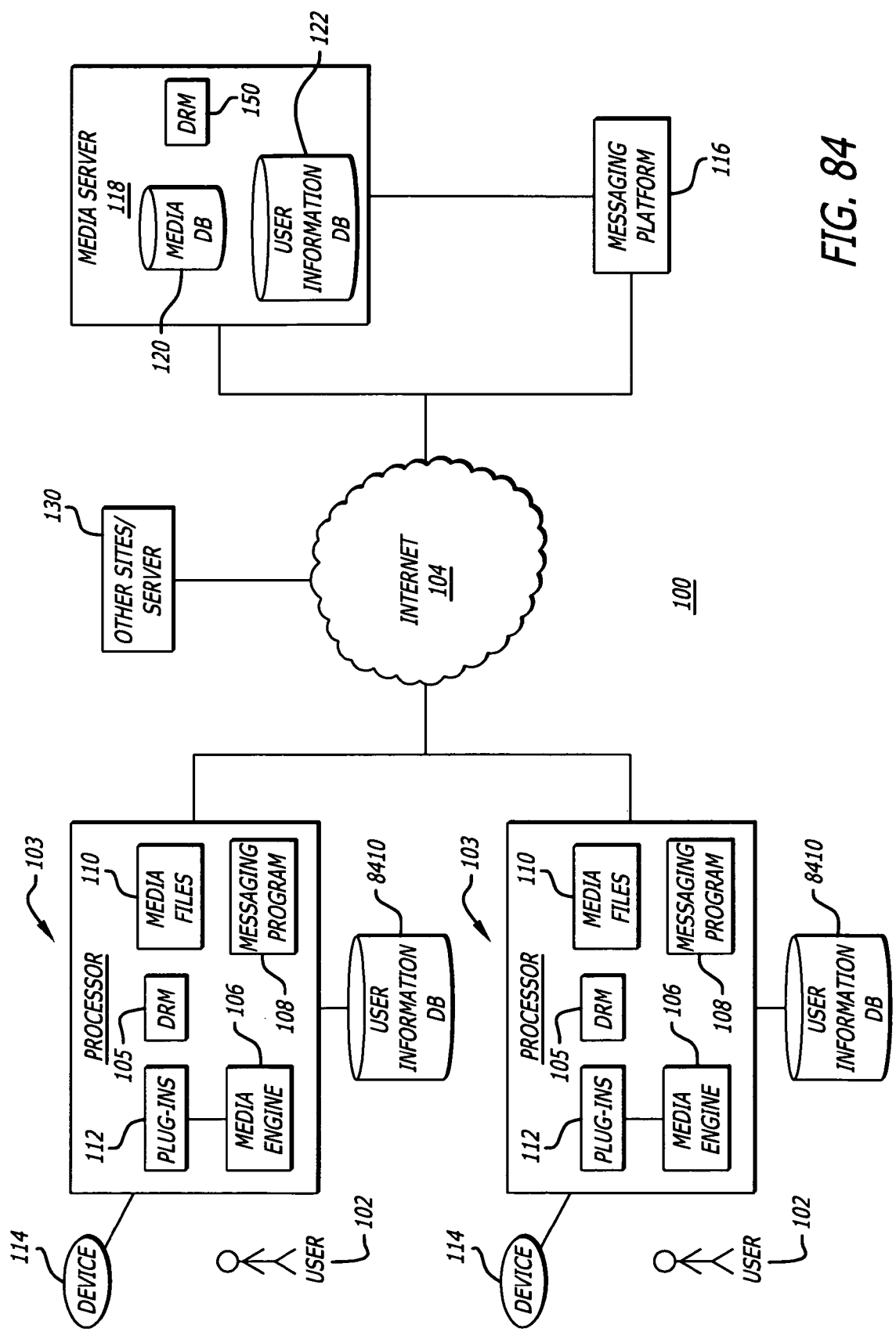
FIG. 84 is a schematic illustrating an exemplary system architecture of one embodiment of the present invention.

Additionally, the user information may be centrally maintained or distributed, such as by maintaining all or a portion of the user information on user information database 8410 (FIG. 84) on processor 103, in addition to or as an alternative to user database 122.

As will be discussed further herein, the ratings chosen by a user will allow the system to better classify music in terms of a user's particular likes or dislikes and greatly enhance a user's experience. As will also be discussed later, a user may also view or listen to other users' music by clicking on tab 234, or another user may adopt a user's ratings or preferences.

Once the user chooses a particular item of media to experience, e.g., a song, a window containing a media player 240 opens within user interface 200 (or it may be always present), to grant the user control of playing the media. The title for the particular song being played 242, as well as the artist 244, the album 246, are preferably displayed. From within this media player 240, the user has the ability to control the media by rewinding, fast forwarding or pausing a particular song by using controls 250 that are common to known media players. Moreover, as the song is playing, the user has the ability to rate the song, artist and/or album by clicking on the rating tool sequence 252 and that rating will preferably be incorporated as part of the user's preferences in the user information database 122 as was discussed above.

A user 102 may also incorporate a plug-in program into the media engine 106. Access to this plug-in program may be available via a newly created tab 236 from Pane 201. These plug-ins may be programmed using known programming techniques for the purpose of making the media engine more robust in the actions that can be performed from within the media engine. Plug-ins may be provided by the provider of the media engine or a third party. In other words, the user interface and functionality according to one embodiment of the present invention can be based on different plug-ins, designed in various locations, designed by different people including users or operators of the Network 300 to enhance the user interface, the functionality it provides and the interaction with the media engine.

Figure 5:
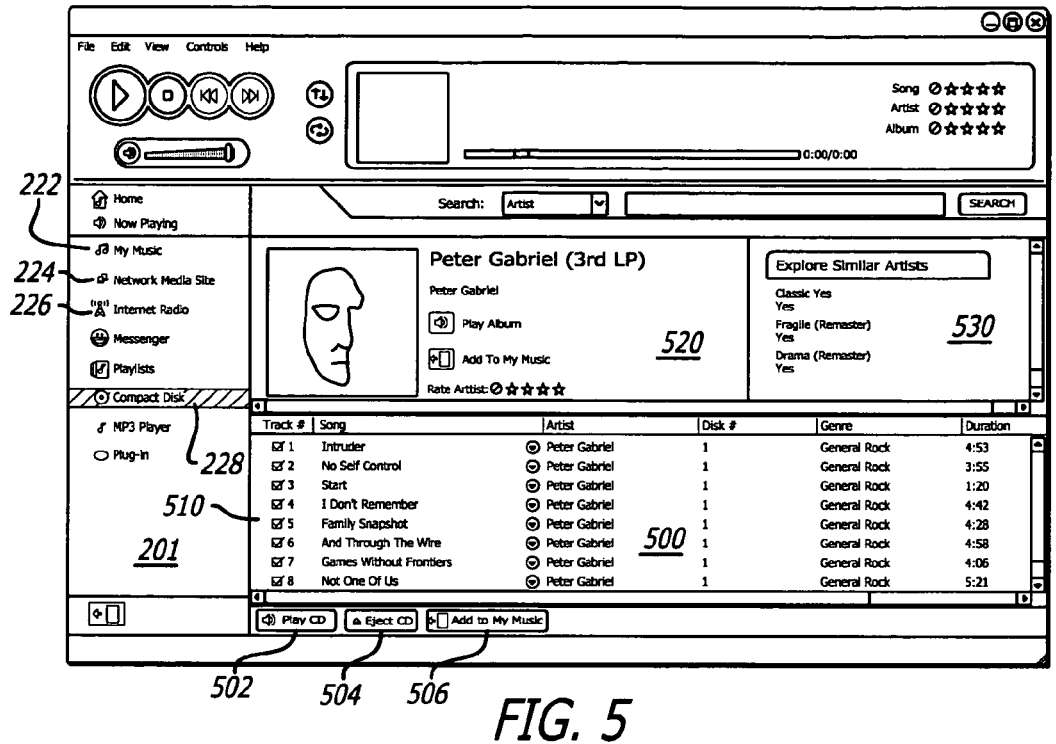
FIG. 5 is an additional exemplary user interface of an exemplary media engine according to another embodiment of the present invention.

When the user has a compact disc or any other form of removable media located in device 114, the system has the ability, as can be seen in FIG. 5, to identify and list the songs located on the removable media by, for example, clicking on tab 228 and the user can choose to import those songs into their "my music" collection. For example, by clicking on the compact disc tab 228, user 102 may be given a list of all songs and/or other media available on the removable media in pane 500. This list may contain the title of the track, the duration of the song, the artist, as well as the genre. From this list, the user may be able to either play the CD by clicking on the play CD icon 502, eject the CD from the CD player by clicking on the eject CD icon 504 or of adding any or all of the songs from the CD into his or her "my music" collection by clicking box 510 next to the particular song that the user wishes to include in the "my music" collection and then clicking on the add to "my music" icon 506. Alternatively, the media engine 106 may prompt the user when the CD is inserted into the CD drive, whether the user wishes to import the songs into their "my music" collection. As can be seen in FIG. 5, once the system recognizes a CD or other removable media that is located in device 114, the title of the removable media will populate compact disk tab 228 in pane 201. Additionally, the name of the album and in one embodiment the cover of the album will be shown in pane 520. In general, in order to obtain this information about the CD, the media engine is able to identify any digitized content that resides on a compact disc or MP3, determine what the digitized content is, and confirm the identify of the CD, i.e., the actual title, artist, content, etc. In one embodiment, a verification database is created from a set of master CDs. It should be noted that although this example is discussed in terms of CDs, a similar method would apply to different mediums as well. The verification database contains records of CDs and a corresponding table-of-contents as well as corresponding selected audio data from the CD. Once the verification database is created, verification of a CD to the master CD may be performed. First the CD is identified by matching the table-of-contents from the CD against the verification database. Using the table-of-contents data, the media engine identifies one or more master CDs with a similar table-of-contents. The identified CD is then authenticated by matching selected audio data from the CD against the verification database created from a set of master CDs. In other embodiments, the identity of the CD or other media is captured through known techniques including looking at the waveform of the specific media content, as well as associated metadata or bit size to help identify the content. Once identified, the identity is passed along to media server 118 along with the location where the media could be found.

In another embodiment the user will be given the ability to create a playlist with the album or add the album to an existing playlist. In this embodiment, the media engine 106 will also access information it might have about the album to offer the user similar albums in pane 530. Once the user has chosen to import the particular songs to his or her "my music" collection, the song(s) from the compact disc or other removable media will be copied or "ripped" by the media engine 106 to local storage or processor 103 or portable device 114, in a user selected format, or format automatically chosen, or the media file may be made available to media server 118 so that the files and/or metadata information about the media may be stored with the files relating to the user's other media. Thus these song(s) along with any other media that is in the user's "my music" collection can be accessed from any location that the user can access the media server 118 with a media engine 106. Once media server 118 has a list of all the user's "my music" collection as well as some or all of the metadata connected with the media and the location of that media, media server 118 is able to locate and provide access to those media files wherever they may reside on the network to that user at any location where the user is located. Thus, a user can easily add any media file to their "my music" collection and, assuming that proper authorization, adherence to DRM practices and other ownership or custodial issues are considered, make the media file accessible at any other location that has a media engine 106.

An alternative way, according to another embodiment, to import music from removable media device such as a compact disc into the user's "my music" collection is to click upon the displayed song title of the actual song that the user wishes to include in their "my music" collection from pane 500.

Thus, with described embodiments, a user need not continuously transport his or her media files and/or removable media to different locations since that media will be available via media engine 106, media server 118, network 300, and components and functions described herein. Additionally a user need not re-familiarize themselves with the media they liked that was available from media database 120 and to select media that they have previously listened to and wish to listen to again. Rather all of the media the user has chosen will reside on or be available via their media engine 106 and be available to a particular user as part of his or her media collection any time or anywhere that the user wishes.

Figure 6:
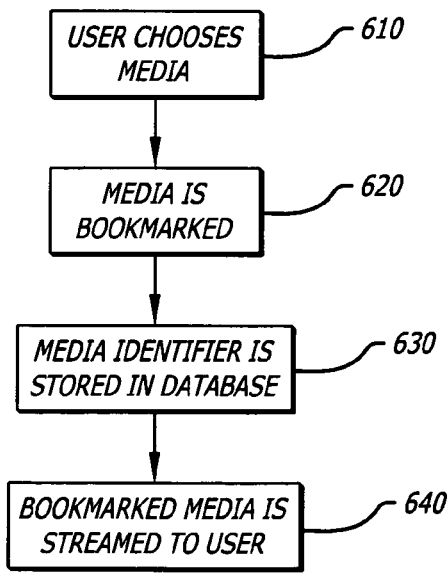
FIG. 6 is a flowchart depicting a process of bookmarking media according to one embodiment of the present invention.

In practice according to one embodiment of the present invention, a virtual collection of media is created for each user 102. As can be seen with reference to FIG. 6, and as was discussed above with reference to FIG. 4 above, the media engine 106 searches each user's processor 103 and/or device 114 and identifies media files. After all the media is identified, a user can choose which media he or she wishes to add to their "my music" collection. Step 610. When a user wishes to add a particular media file to their "my music" collection a virtual collection is created of one or more media files by which each particular piece of media is "bookmarked" for future use by the user. Step 620. In one embodiment, the book marking of particular media file is accomplished by storing an identifier for each user's bookmarked media in user information database 122. Step 630. In addition to the other information about a user stored in information database 122, the media server 118 also stores information about a particular user's bookmark for later retrieval. Thus, when a user identifies a particular piece of media to be bookmarked for later use, an identifier for that particular piece of media is stored together with the user's 102 other identifying information stored in user information database 122, and a virtual collection of all the media in a user's "my music" collection is created. Thus, user information database 122 will contain for each user a listing of identifiers that refer to particular media that has been flagged by a particular user. So for example even though two users may access the system utilizing the same processor, each user will be able to obtain easy access to his or her "bookmarked" media, to the exception of the other user who will have access to their own "bookmarked" media.

When a user wishes to retrieve a particular piece of media that has been bookmarked, the media server would access the media identifier from user information database 122 and then use that identifier to stream or otherwise make available the particular media file to the user. Step 640. Thus, it should be appreciated that a user can easily identify particular media that he or she wishes to make available at various locations and the media server can easily retrieve that media based on the information stored about the particular user in user information database 122. There is, therefore, no need for the media server to begin searching for the particular media file but rather once the identifier for the media file is stored and attached to a particular user's information, media server 118 can easily make available the bookmarked media as if it was locally stored. Information database 122 may also contain several alternate locations on the network where a media file may be located, thus providing alternate sources if one particular source is unavailable for some reason.

Figure 7:
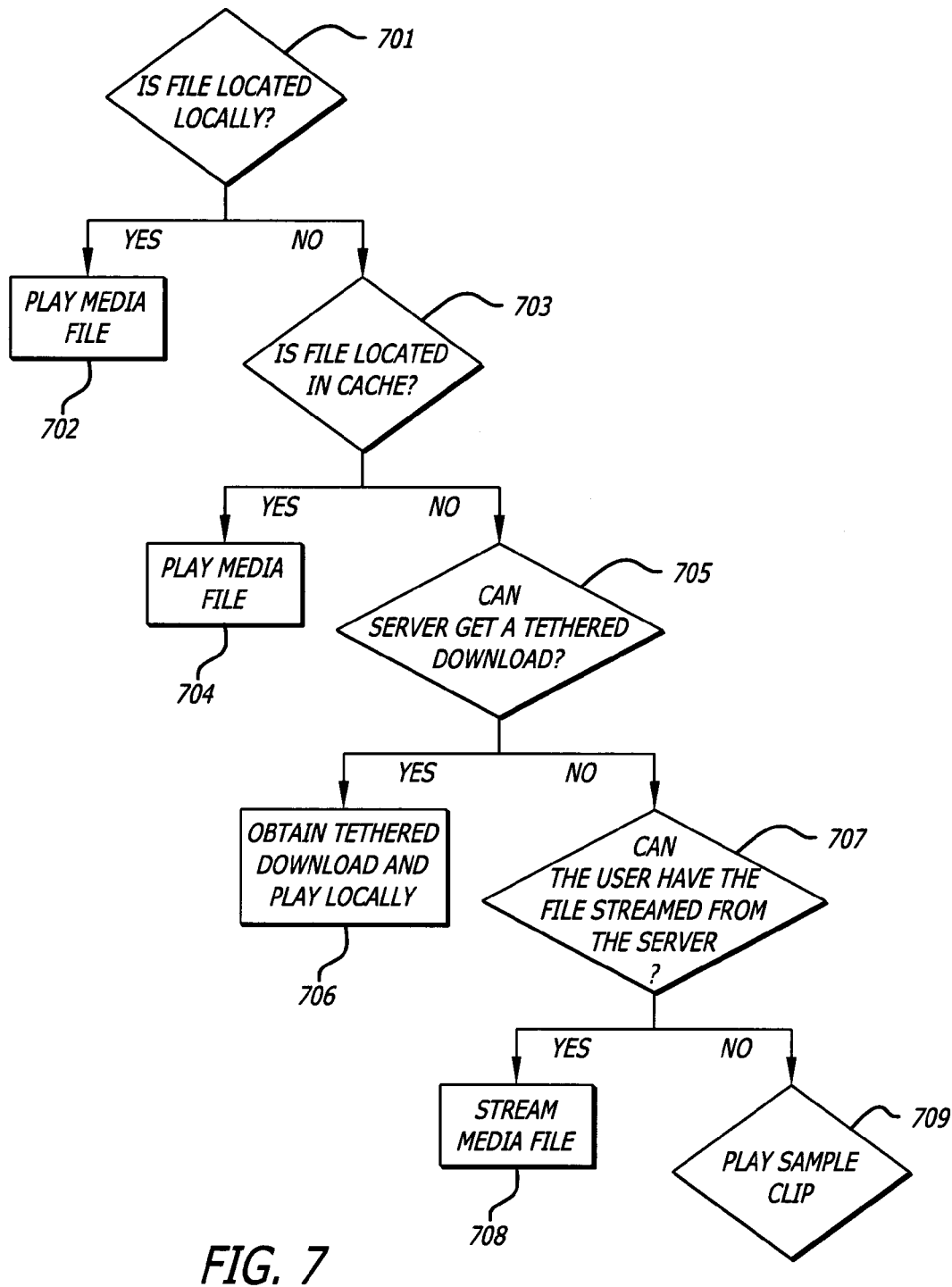
FIG. 7 is a flowchart depicting a process of locating files according to one embodiment of the present invention.

As can be seen in FIG. 7, according to one embodiment of the present invention, when a request is made to media engine 106 to play back a certain piece of media, the media engine 106 goes through a process to assure that the media is being played back and/or streamed to the user in the most efficient way possible. When a request for a particular media to be played back is made, the media engine 106 first searches to see if that particular media file is located locally on the user's processor 103. Step 701. If located locally the media engine will play that file from the local location. Step 702. If the media file is not located locally, the media engine will then search user's 102 processor 103's cache to see if the media file is located there. Step 703. If the media file is located in the processor's cache, then the media engine will play the media file from the cache location. Step 704. If however the media file is not located within the cache, media engine 106 will then query media server 118 to see if media server 118 is capable of retrieving the file from an alternate authorized source on the network. One example of a primary or alternate source of a file is for the media server 118 or other server 130 to provide a tethered download for the user. Step 705. A tethered download is a portable file that contains a time-based DRM that expires after a certain amount of time. In other words, for example, if a user is part of a subscription service and has the rights to obtain the rights to a certain media file for a certain length of time, a tethered download of that media file is loaded onto the user's processor and the user will be able to play that file for a certain length of time (e.g., 30 days). At the end of the predetermined length of time, the file becomes unusable and can no longer be played by the user. Media server 118 can therefore search throughout the network 300 to see if the tethered download is available for the particular media file that is requested. A tethered download would be the next preferable option for media engine 106 since a tethered download downloads a local copy to the user's processor and allows the user to play the media file without needing to access media server 118.

If media server 118 is able to locate a tethered download for the particular media file, media server 118 retrieves the tethered download and downloads it to the user's processor 103 cache or local storage. Once the tethered download is acquired, media engine 106 plays the media file for the user. Step 706. If no tethered download is available, media engine 106 queries media server 118 to see if the particular media file is available to the particular user from the media database 120. Step 707. Preferably, access to media in the media database 120 can be based on a tiered membership or based on different subscription fees. Therefore, media available in the media database may not be available to each particular user based on the subscription that the user had within the network 300. If the media file is available within media database 120 and the particular user requesting the file has a subscription or authorization level that permits access to the media file, the file is streamed by media server 118 from media database 120 to the user's processor 103 and is played with the media engine 106. Step 708. If however the media file requested is not available to the particular user, the media server could optionally stream to the user's processor 103 a sample of the media file. Step 709. In one embodiment a message may be displayed to the user indicating that this media file is unavailable because of the user's subscription or membership and information can be given to the user with instructions explaining how to enhance their subscription or membership.

Figure 8:
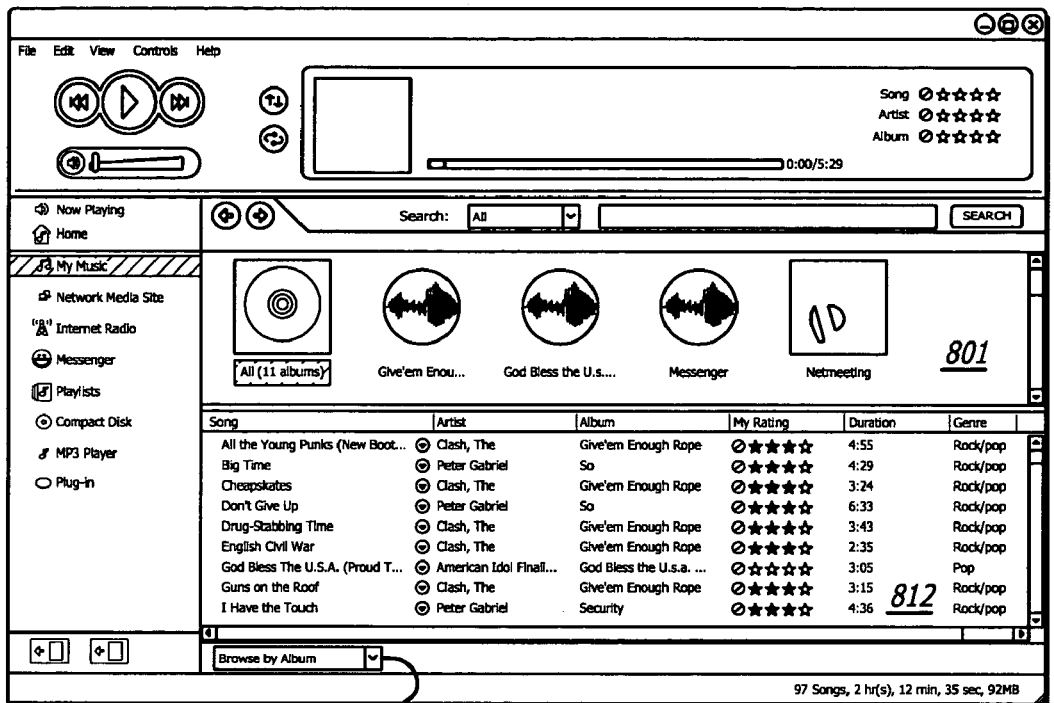
FIG. 8 is an additional exemplary user interface of an exemplary media engine according to another embodiment of the present invention.

Additional features of the user interface 200 will now be discussed with reference to FIG. 8. From within the user interface 200, a user has the ability to browse and view different albums that have songs from the user's "my music" collection. As can be seen in FIG. 8, in order to view a song by album, a user may choose browse by album from drop-down menu 802. After choosing browse by album, the user is given a collection of albums 801 that are available for the user to listen to. In addition to the names of the listed albums, the album covers for each individual album are displayed for the user to view. The album covers are preferably stored as a .gif image together with the media and metadata stored on media engine 106 and/or media server 118, although the structure and organization of the storage and retrieval of media and associated metadata can be implemented in multiple ways, in distributed or centralized fashion across one or many servers or locations. If an album cover is not stored with a particular media file, the system can be configured to search the network to try and find the cover image. Although discussed in terms of a .gif image any file format that displays images such as .jpg, .tif or any other image file format heretofore and hereinafter known can be used to display the album cover.

In one embodiment of the present invention, one or more images are stored in an image database 370. These images can be stored in any image format heretofore and hereinafter known. These images can for example be images of album covers, artists, or other images related to a piece of media. Along with the media stored in media database 120, a URL or other pointer is stored that links or points to an image in the image database 370. Therefore in this embodiment, when a user chooses a particular piece of media, the media engine 106 is able to retrieve any associated images (e.g., album cover, artist picture) and display those images for the user.

Figure 9:
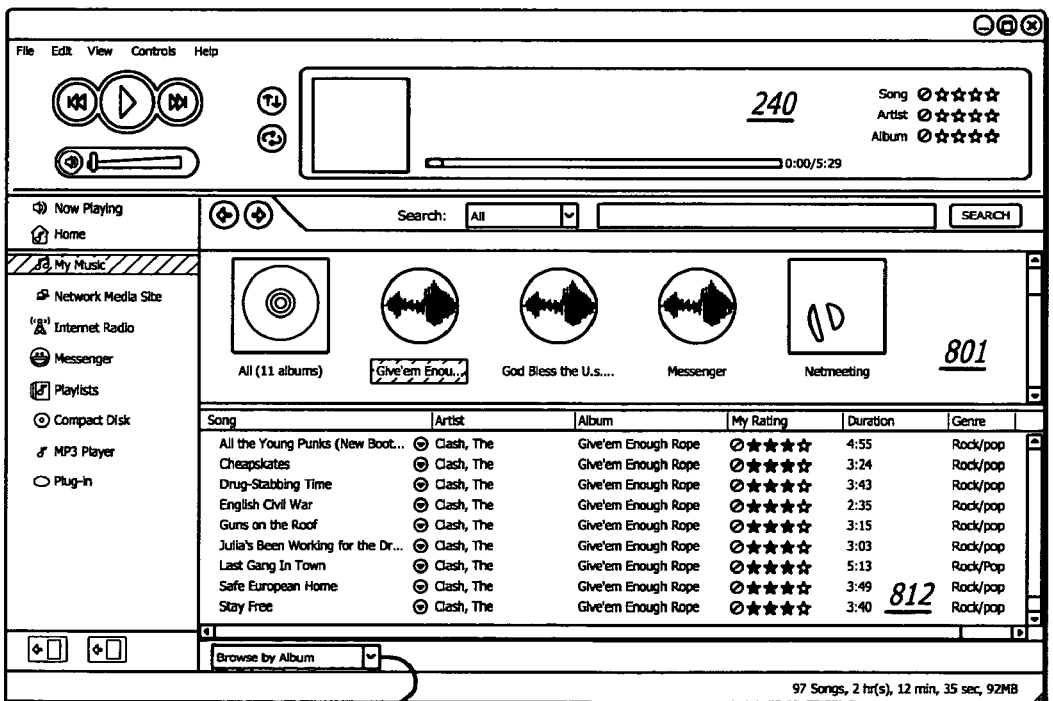
FIG. 9 is an additional exemplary user interface of an exemplary media engine according to another embodiment of the present invention.

It should also be appreciated that the display of the album covers for the user offers an enhanced experience wherein the user is both able to listen to the music as well as view the album cover as if the user actually was holding the compact disc or other media in their hands. Once the user chooses an album from the interface 801, all of the songs on that album may be displayed as can be seen in FIG. 9 with all of the details relating to that song in pane 812. As with previous embodiments, in this embodiment the user has the ability to play the song in media player 240 by clicking on a song name in pane 812. In this embodiment, the user has the added ability to browse through music in a more efficient way (e.g., via album), which leads to an enhanced experience for the user.

Figure 10:
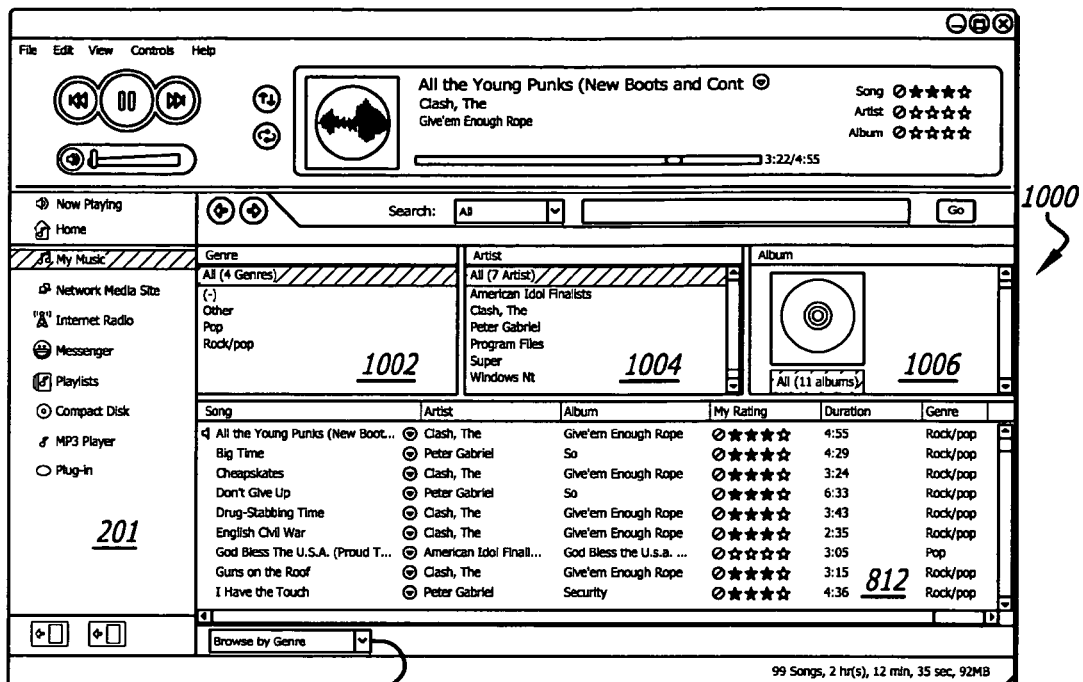
FIG. 10 is an additional exemplary user interface of an exemplary media engine according to another embodiment of the present invention.
Figure 11:
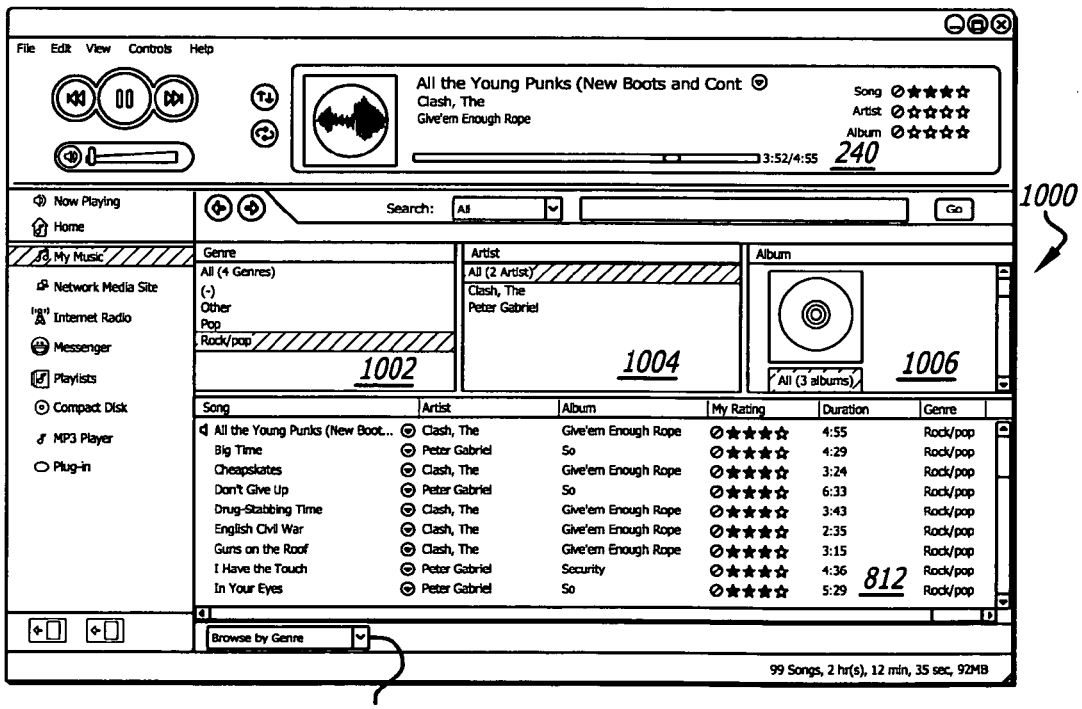
FIG. 11 is an additional exemplary user interface of an exemplary media engine according to another embodiment of the present invention.

In another embodiment the user is able to browse through the songs in his or her "my music" collection by genre. For example, as can be seen in FIG. 10, the user has the ability to explore different genres (e.g., blues, folk, jazz, rock) via interface 1000 by, for example, choosing "browse by genre" from drop-down menu 802. This is once again made possible by the metadata information acquired and stored by media engine 106. Genre information may be obtained and utilized by the system through human operators adding genre information, or the genre information may be supplied as metadata by the original source of the media file, e.g., a record label. Similar to the way a user browses their "my music" collection via album covers, the user is able to choose a particular genre and display all of the songs available in his or her "my music" collection that fits that particular genre. Once again as seen in FIG. 11, if a user picks for example the "Rock/Pop genre" from pane 1002, all those songs that meet the "Rock/Pop" genre criteria that are located in the user's "my music" collection will be displayed in pane 812.

Figure 12:
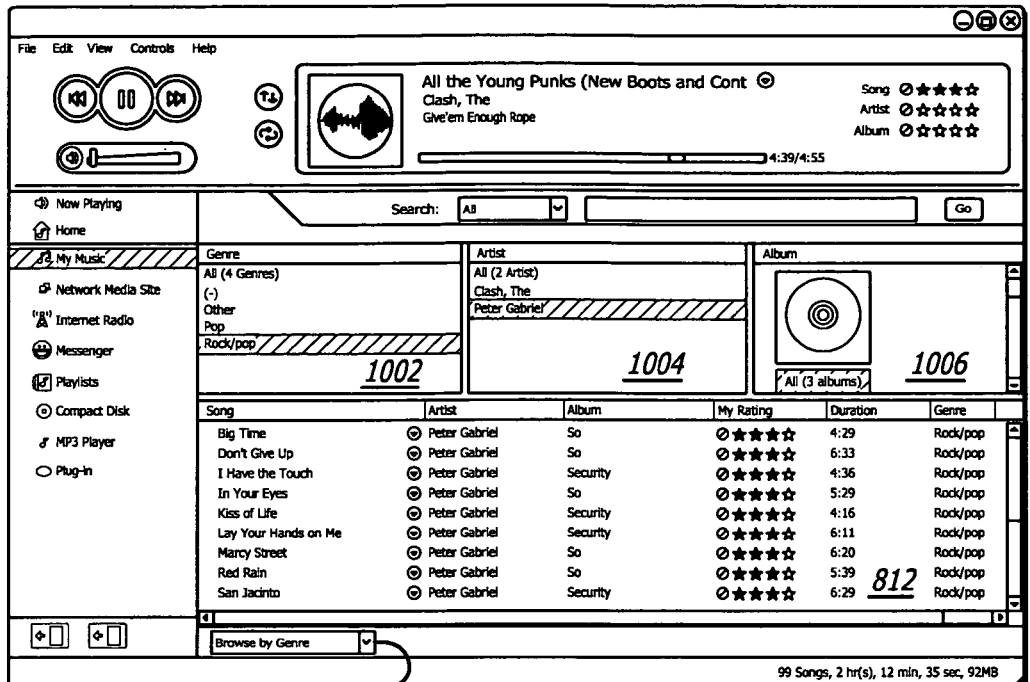
FIG. 12 is an additional exemplary user interface of an exemplary media engine according to another embodiment of the present invention.
Figure 13:
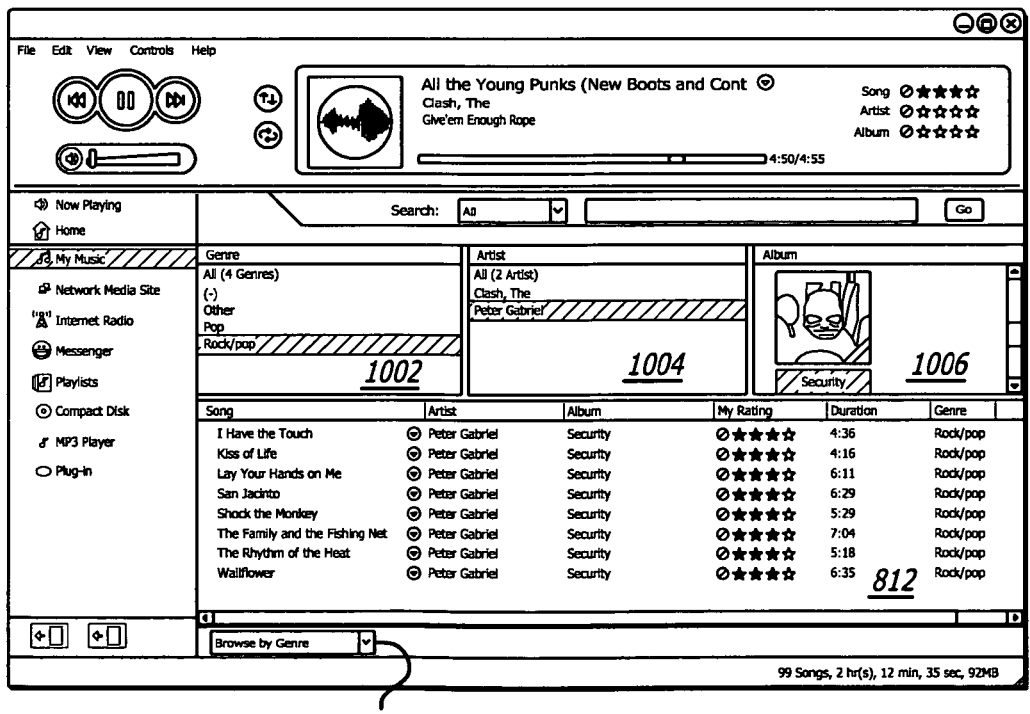
FIG. 13 is an additional exemplary user interface of an exemplary media engine according to another embodiment of the present invention.
Figure 14:
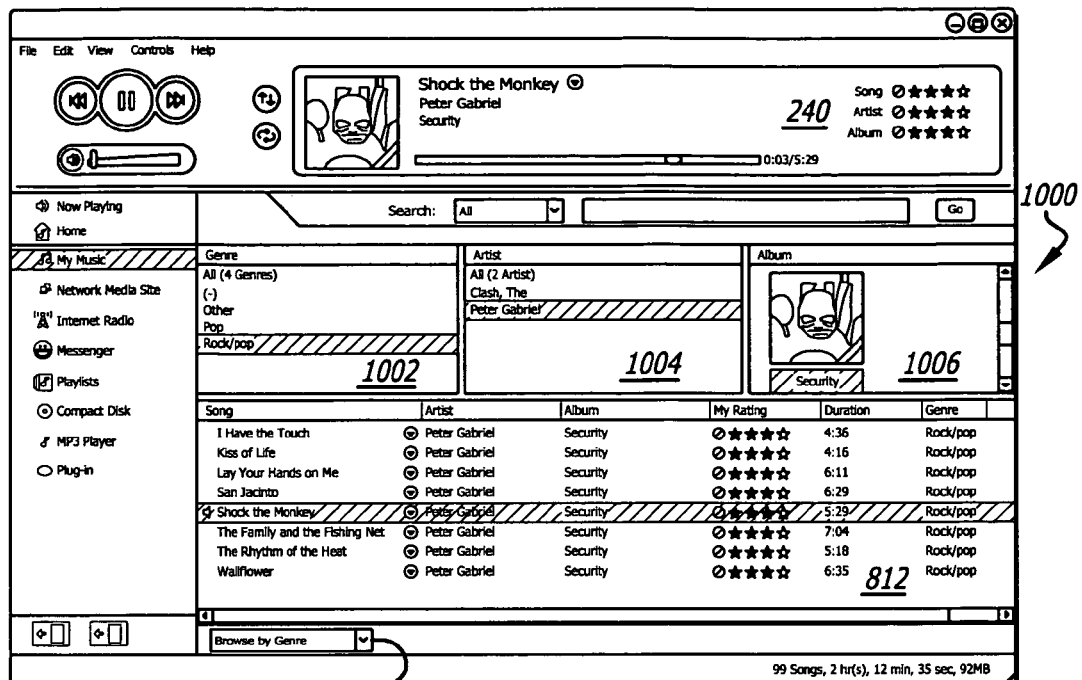
FIG. 14 is an additional exemplary user interface of an exemplary media engine according to another embodiment of the present invention.

To further enhance a user's experience, a user may pick a particular artist in the selected genre from pane 1004 to view songs from the particular artist. For example, as can be seen in FIG. 12, if a user clicks on "Peter Gabriel" from the artist pane 1004, only songs by "Peter Gabriel" will be displaced in pane 812. A user may then further narrow the songs by clicking on a particular album from album list pane 1006. For instance, as is shown in FIG. 13, if a user clicks on the album "Security" by Peter Gabriel, only songs on that album will be displayed in pane 812. If the user then clicks on a particular song such as "Shock the Monkey", the chosen song is then played in media player 240. It should be noted that the above-discussed browsing by a particular criteria is discussed in terms of browsing for music in the user's "my music" collection. In one embodiment, this browsing can be performed on all media located anywhere throughout the network 300. Additionally, in another embodiment a user can also search through another user's "my music" collection as will be discussed later in reference to FIG. 50.

Figure 15:
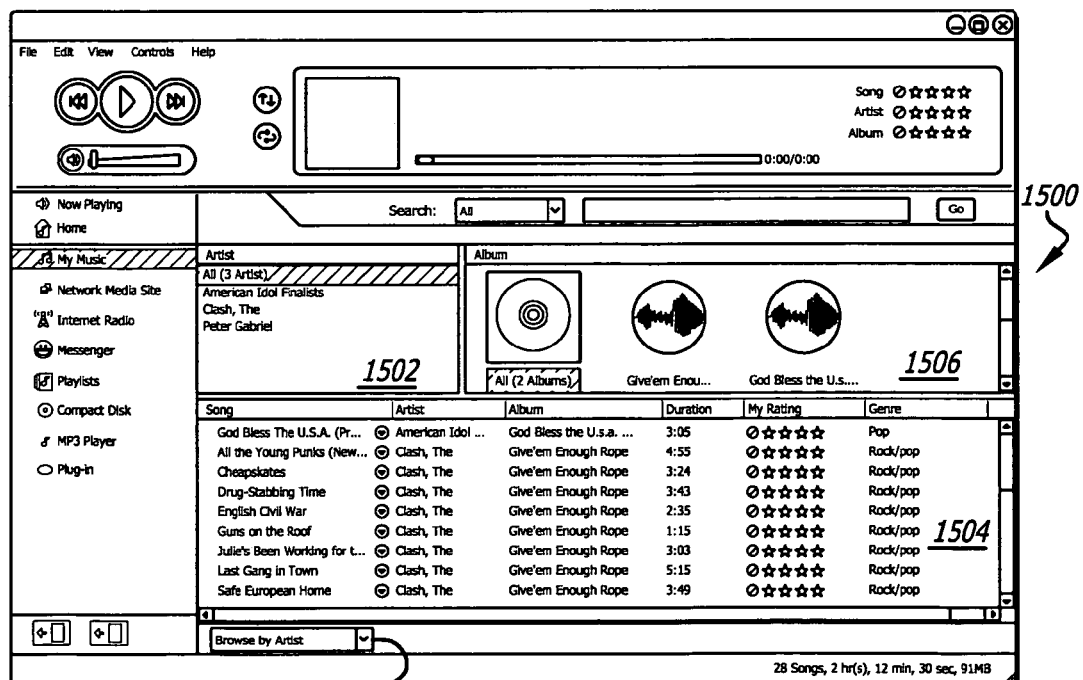
FIG. 15 is an additional exemplary user interface of an exemplary media engine according to another embodiment of the present invention.
Figure 16:
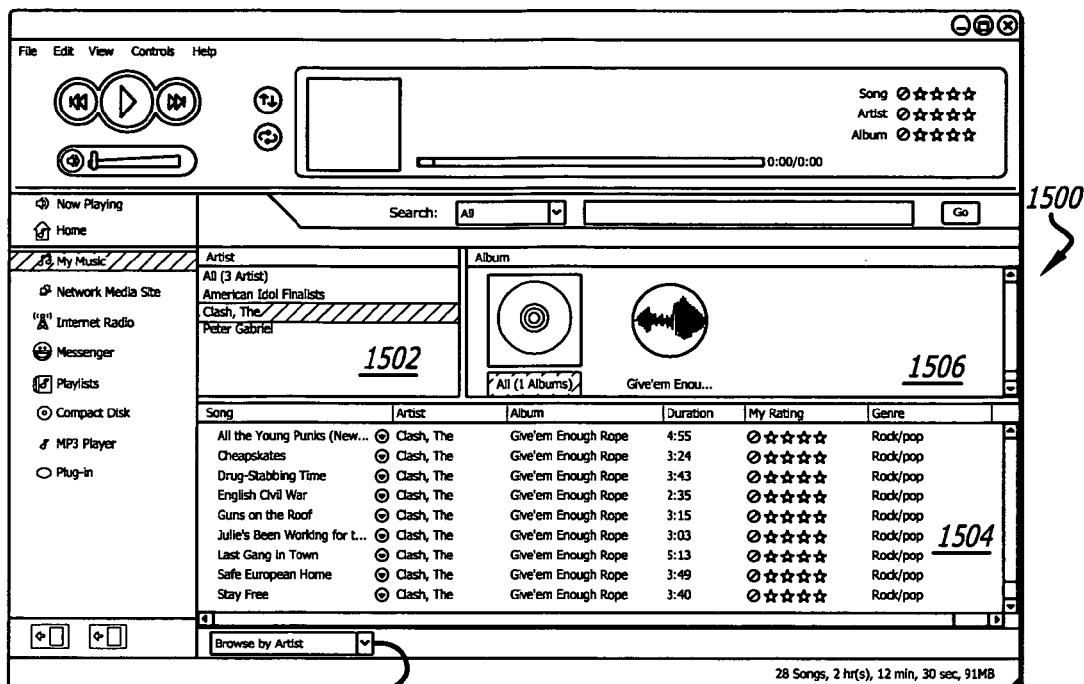
FIG. 16 is an additional exemplary user interface of an exemplary media engine according to another embodiment of the present invention.
Figure 17:
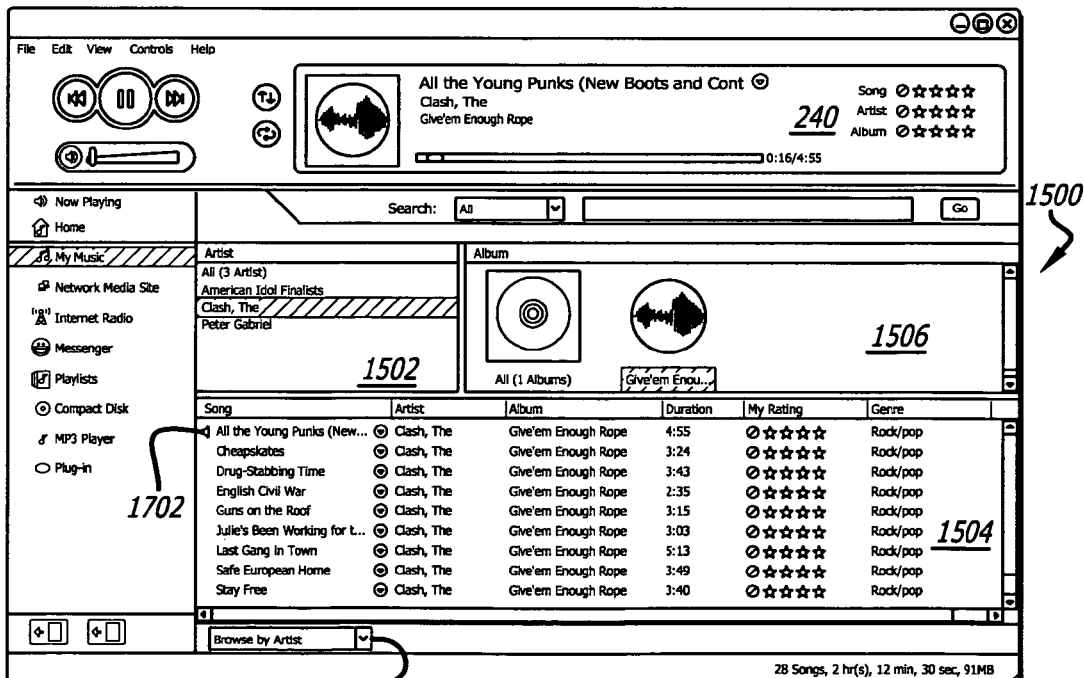
FIG. 17 is an additional exemplary user interface of an exemplary media engine according to another embodiment of the present invention.

In another embodiment, the user may browse the media available in his or her "my music" collection by searching for a song and/or album via the song and/or album's artist as is shown in FIG. 15. In this embodiment, a user can access interface 1500 to explore all the artists of the media that are in the user's "my music" collection by choosing to "browse by Artist" from drop-down menu 802. Once again, similar to previous embodiments, a user may pick a particular artist from the list of artists in pane 1502 to view songs from that particular artist. For example, as can be seen in FIG. 16, if a user clicks on "The Clash" from the artist pane 1502, only songs from "The Clash" will be displayed in pane 1504, and only albums from "The Clash" will be displayed in pane 1506. The user then can further narrow the songs by selecting a particular album from album list pane 1506. For example, if a user chooses the album "Give 'em Enough Rope" from the album list pane 1506, only songs from the album "Give 'em Enough Rope" will be displayed in pane 1504 as can be seen in FIG. 17. As in previous embodiments and as can also be seen in FIG. 17, if the user wishes to listen to any of the songs in pane 1504, the user need only highlight that song in pane 1504 and the song will be played for the user by interface 240. In one embodiment, an icon 1702 may appear next to the song being played to indicate that it is being played.

As was discussed earlier in reference to FIG. 2, through media engine 106, a user has the ability to rate a particular song, artist and/or album depending on whether or not the user likes or dislikes that particular song artist or album. This ability to rate the song is preferably available to the user for any stage of the "my music" interface discussed heretofore or hereafter. Additionally, user 102 may choose a new song that is available from media database 120 and apply ratings to that song by indicating their likes or dislikes for a particular song, artist and/or album. In an embodiment of the present invention the system may automatically assign a predetermined rating to songs that are located on a user's processor 103 or on a peripheral device 114. It should be understood that rating songs, albums and artists allow the media engine the ability to organize and group songs by a particular like and/or dislike. The more songs that have been rated, the more the system will be able to choose which particular song, album and/or artist the particular user enjoys. For example, when creating playlists or streaming music via an internet radio station, the media engine, using the information obtained through user ratings, can filter or play songs in accordance with what a particular user is more likely to enjoy. Preference information from the radio station can be utilized by the media engine alone or acting together with the media server or other servers to personalize commerce offerings, influence playlist creation or system recommendations. In like manner, the media engine and/or servers can utilize and pass to other servers/applications user preference information to enhance the user experience in all respects, regardless of which particular component or functionality is being utilized by the user.

In one embodiment, the system may automatically rate songs that are located locally with a predetermined rating initially when the details of the particular songs are acquired and stored by media engine 106. For example, if a piece of media is located on a user's processor 103, the system may automatically rate that song with, for example, a rating of 3 on a scale of 1 to 4. It should be understood that this will give the media that is located locally on a user's processor an automatic high rating even before the user themselves rates the song album and/or artist manually. This is because it is fairly safe to assume that, in most situations, if a particular piece of media is located locally on a user's processor, the user tends to like that particular media. Automated rating can also be based on other factors such as the user's frequency of play, rating of the genre or artist, how often the media is skipped or repeated, or other factors. The user will preferably have the ability to re-rate the media at other times, to give the media a higher or lower rating if they wish to better reflect their preferences. Additionally, in one embodiment if a user has already rated a particular song artist and/or album manually, that rating will not be overwritten by any automatic rating. Moreover, each user preferably also has the ability to decide not to incorporate any automatic ratings and rather only utilize their manual ratings. Thus, as can be seen from the previously discussed embodiments, the media engine enables the loading of user's media as well as classifying that media with a more personalized classification every time the user accesses the media engine. Also, the user is able to combine both his or her manual ratings and indications of likes or dislikes in media available through the media server with the local media located on the user's processor without having to manually key in the ratings for that local media, subject to later fine tuning by the user.

In one exemplary embodiment of an automatic rating scheme, the following factors are used to create an automated rating for a user when a user adds music to his or her "my music" collection. When a user adds music to their "my music" collection from for example the media database 120, a peripheral device 114, a hard drive located on Processor 103, and/or another user's "my music" collection, the album and/or artist associated with that song or group of songs is given a set rating based on the number of songs from that album or artist that are already in the user's "my music" collection. For instance, any album that has three or more tracks in the user's "my music" collection will be given a rating of 70 on a scale from 1-100. Similarly, any artist with greater than 10 and less than 20 songs in the user's "my music" collection will be given a rating of 70 on a scale from 1-100. Lastly, any artist with greater than 20 songs in the user's "my music" collection will be will be given a rating of 80 on a scale from 1-100. This rating scheme assures that artists and/or albums that are most popular in the use's "my music" collection will be rated higher than those that are less popular. It should be noted that in different embodiments, different automatic rating scales can be applied to songs albums and/or artists when they are stored in a user's "my music" collection. Additionally automatic ratings may be stored separately or flagged differently in the ratings database 320 so as to distinguish between the automatically and manually created ratings.

Figure 18:
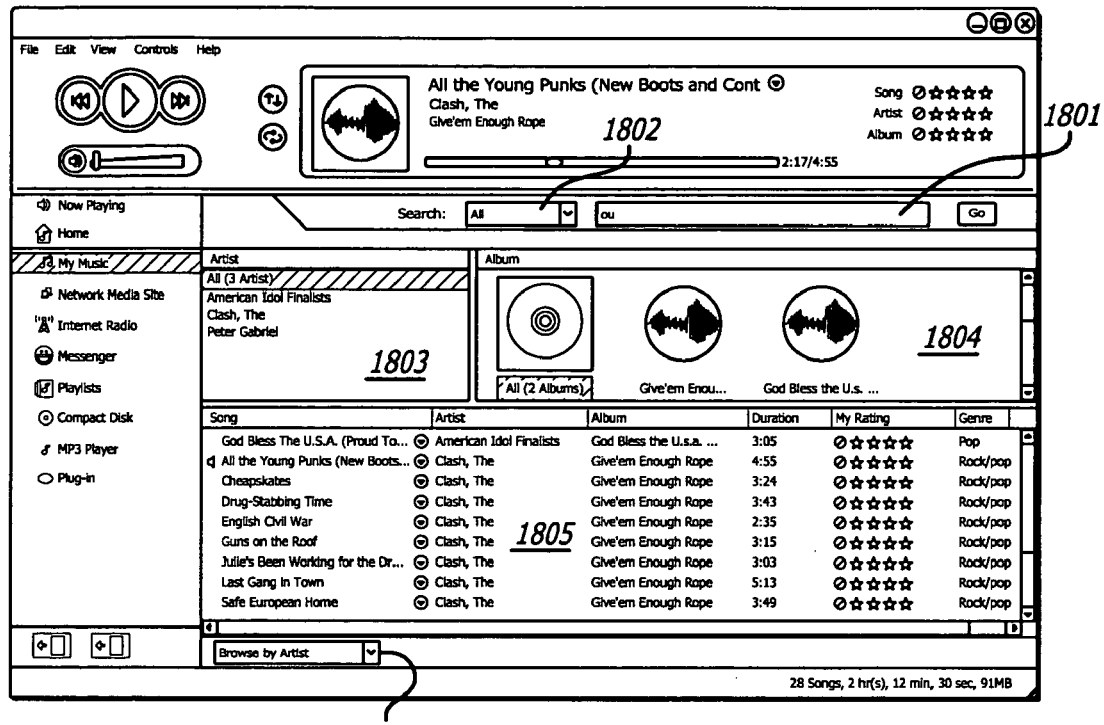
FIG. 18 is an additional exemplary user interface utilizing a search engine in connection with an exemplary media engine according to one embodiment of the present invention.

Another feature according to one embodiment of the present invention will now be discussed with reference to FIG. 18. With reference to FIG. 18, user 102 has the ability to perform a search function within interface 200 of all media that is available either through the user's "my music" collection or that is available on media server 118 via the media database 120 or elsewhere on network 300 or the Internet at large. As can be seen from FIG. 18, user interface 200 contains a field 1801 wherein a search term may be entered. For example, in FIG. 18, a display is shown where a user has selected to search for the term "ou" throughout all of the identifying characteristics of the media available in the user's "my music" collection, or anywhere on the network, including song name, artist, album, and genre, by choosing "All" from drop-down menu 1802 and inserting the phrase "ou" in field 1801. Once the user has entered the search term (e.g., ou), a list of artists for those songs that match the criteria is shown in pane 1803 and all of the songs that match the terms are displayed in pane 1805. Thus, any song in the user's "my music" collection that has the term "ou" in either its song name, artist, album or genre will all be displayed in pane 1805. While the following examples describe focused searches on specific criteria or media sources or media categories, the searches conducted may be performed on multiple sources at once, based on one search term, so that results are returned from multiple sources, and preferably identified as such in the search result. Thus, one search term would yield results from local sources such as attached devices and/or local processor, as well as server 118, media database 120, other servers 130, other users 102, or any other source on network 300. The search may be limited to only some of these sources to limit the size of the result, or a matter of user choice or system design.

Figure 19:
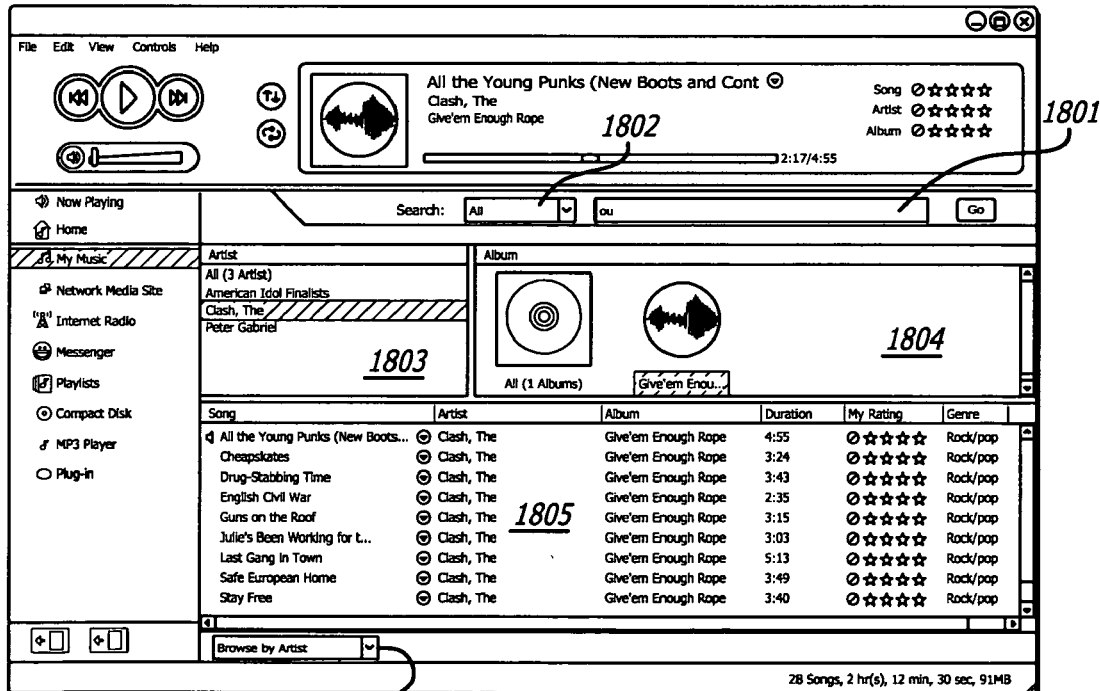
FIG. 19 is an additional exemplary user interface utilizing a search engine in connection with an exemplary media engine according to another embodiment of the present invention.
Figure 20:
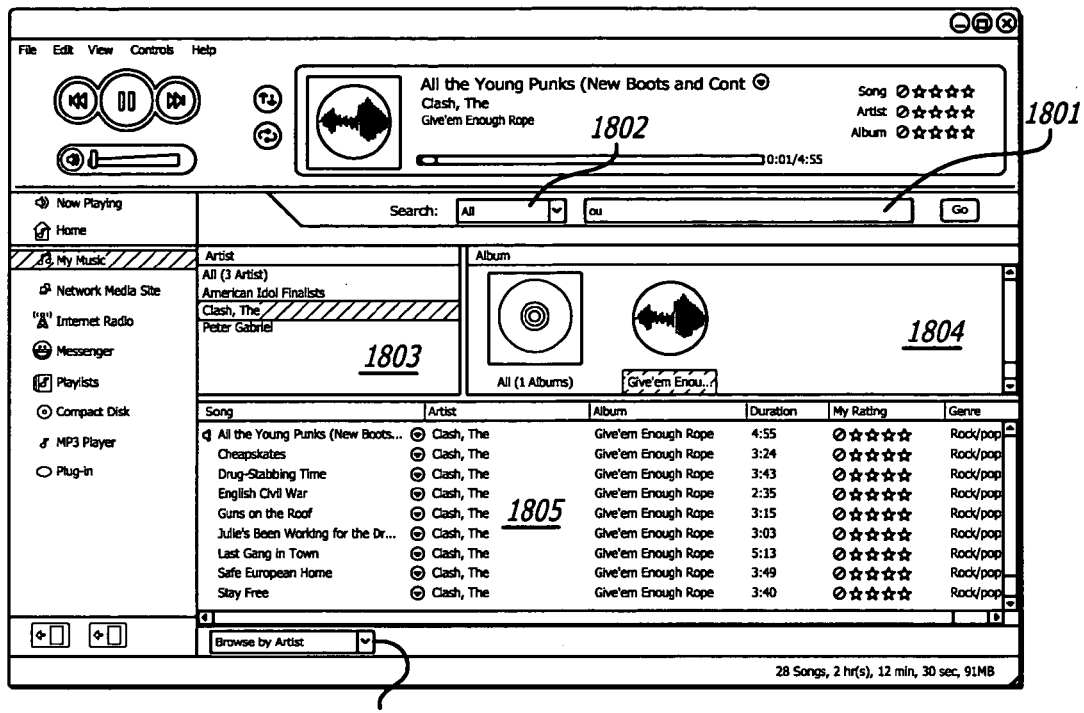
FIG. 20 is an additional exemplary user interface utilizing a search engine in connection with an exemplary media engine according to another embodiment of the present invention.

A user can further narrow the search results by clicking on an artist in pane 1803. For example, if a user clicks on the artist "The Clash" from pane 1803 as can be seen in FIG. 19 pane 1805 will only show those songs that both match the criteria (i.e., contain the ou string) and are from the artist "The Clash." The user can further search results from a particular album by choosing that album from pane 1804 as can be seen in FIG. 20. As can be seen in FIG. 20, the user chose a particular album in pane 1804 ("Give 'em Enough Rope") and only songs for that particular album are displayed in pane 1805.

Figure 21:
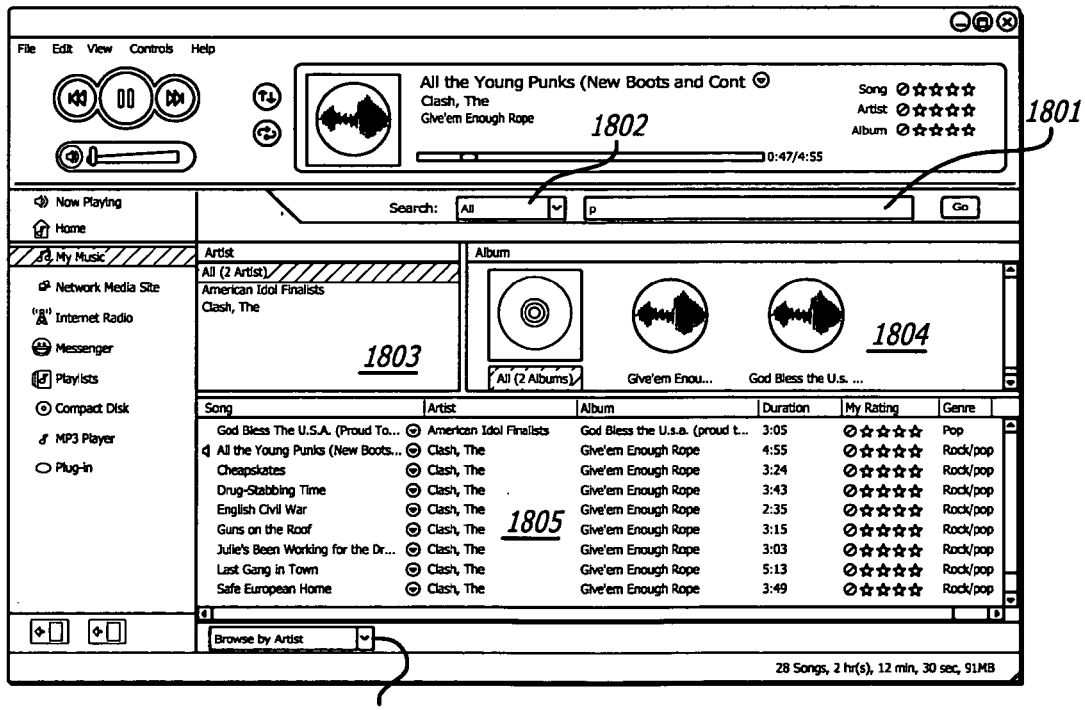
FIG. 21 is an additional exemplary user interface utilizing a search engine in connection with an exemplary media engine according to another embodiment of the present invention.
Figure 22:
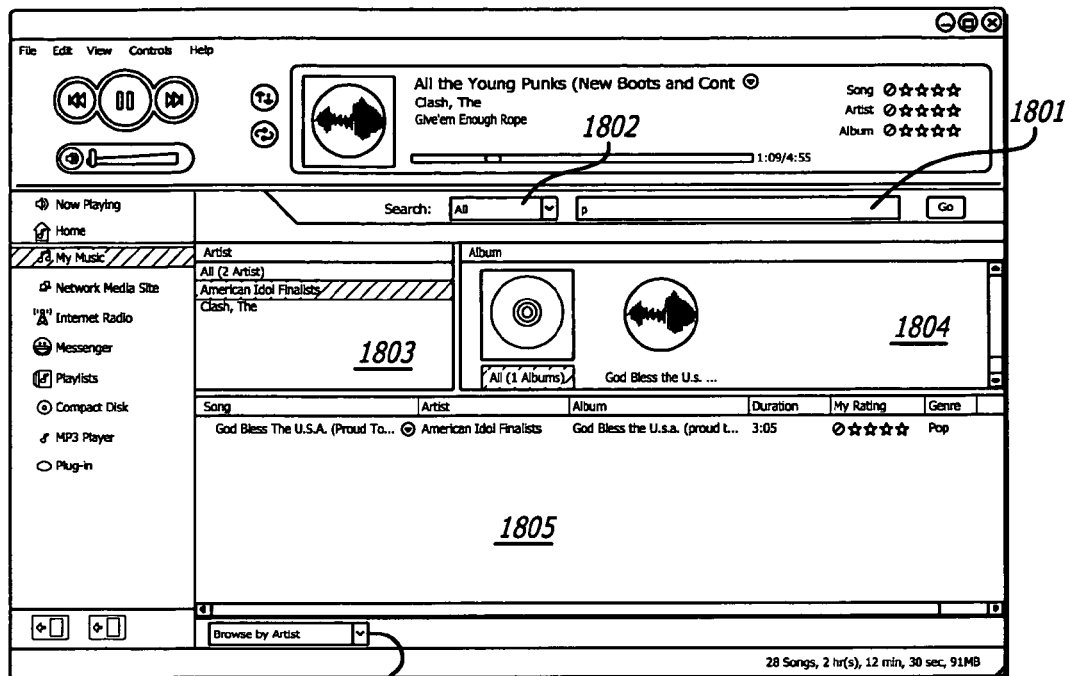
FIG. 22 is an additional exemplary user interface utilizing a search engine in connection with an exemplary media engine according to another embodiment of the present invention.
Figure 23:
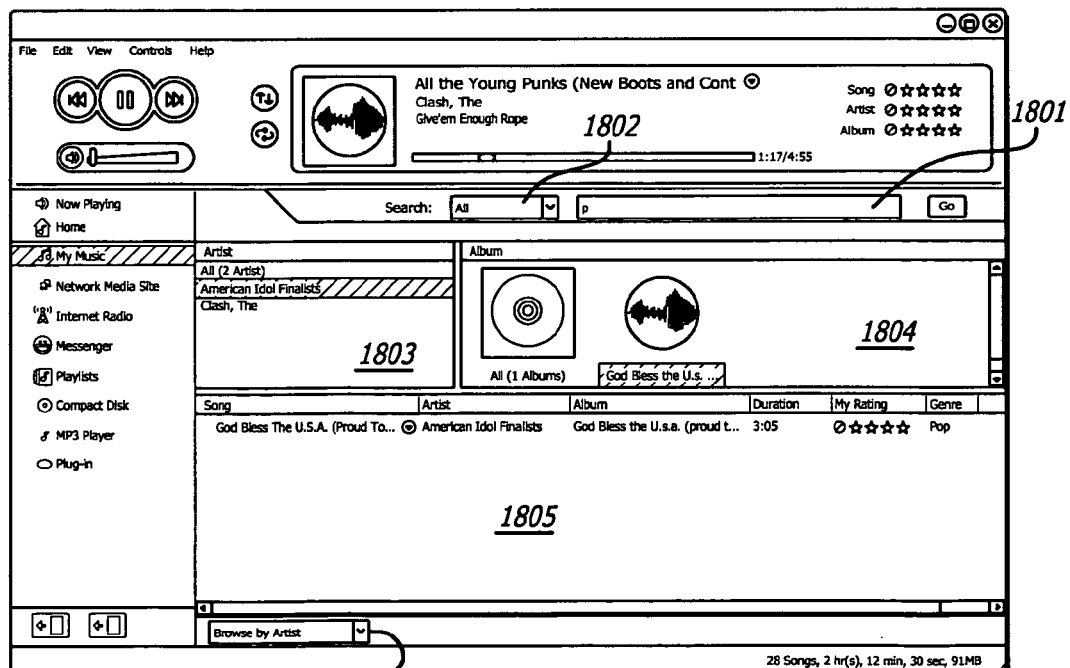
FIG. 23 is an additional exemplary user interface utilizing a search engine in connection with an exemplary media engine according to another embodiment of the present invention.

In another embodiment, a user may search for songs within their "my music" collection (or elsewhere on the network) by a variable that is only in the album name of a song by selecting album from drop-down menu 1802 and inserting the search criteria in field 1801. As can be seen in FIG. 21, if a user chooses to search album names from drop-down menu 1802 and populates, for example, field 1801 with the search string "p", the media engine 106 will return a list of artists in pane 1803, albums in pane 1804 and songs in pane 1805 that match that particular criteria. The user can then choose a song directly from pane 1805, or choose an artist from pane 1803 or an album from pane 1804 to further narrow the search to include only songs from that artist or album. As can be seen, for example, in FIG. 22, if a user chooses to view only the "American Idol Finalists" songs that have the search term "p" in them, the user would select the "American Idol Finalists" from pane 1803 that would bring up all of the "American Idol Finalists" albums in pane 1804 and all of the "American Idol Finalists" songs in pane 1805. As can be seen further in FIG. 23, if the user selects one of those albums in pane 1804, pane 1805 will only display songs from that particular album.

Figure 24:
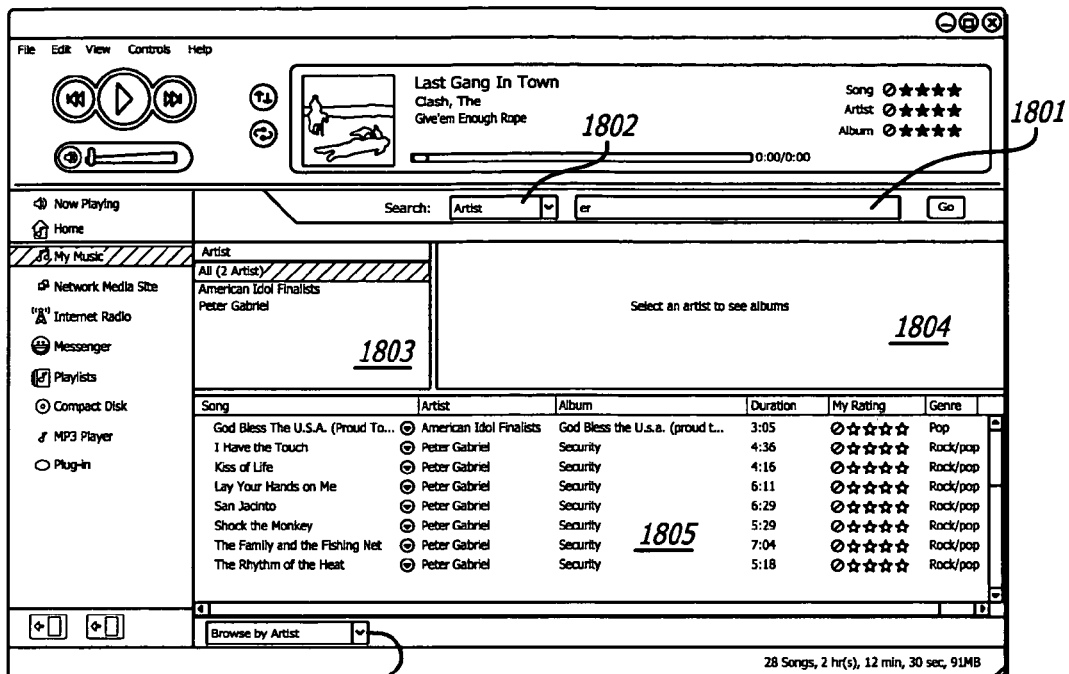
FIG. 24 is an additional exemplary user interface utilizing a search engine in connection with an exemplary media engine according to another embodiment of the present invention.
Figure 25:
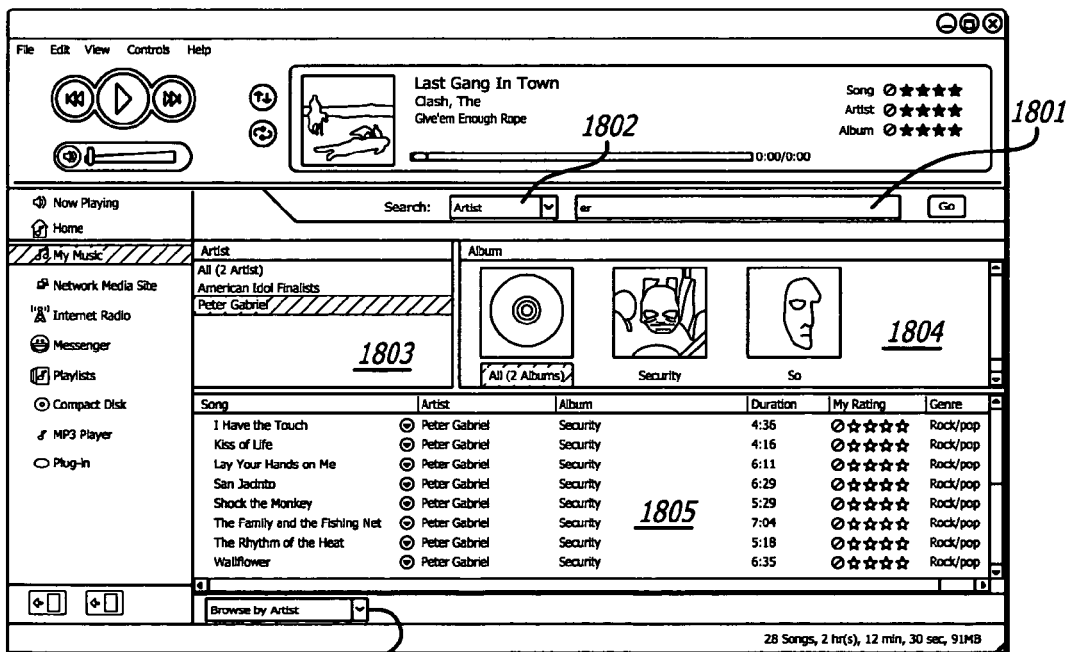
FIG. 25 is an additional exemplary user interface utilizing a search engine in connection with an exemplary media engine according to another embodiment of the present invention.
Figure 26:
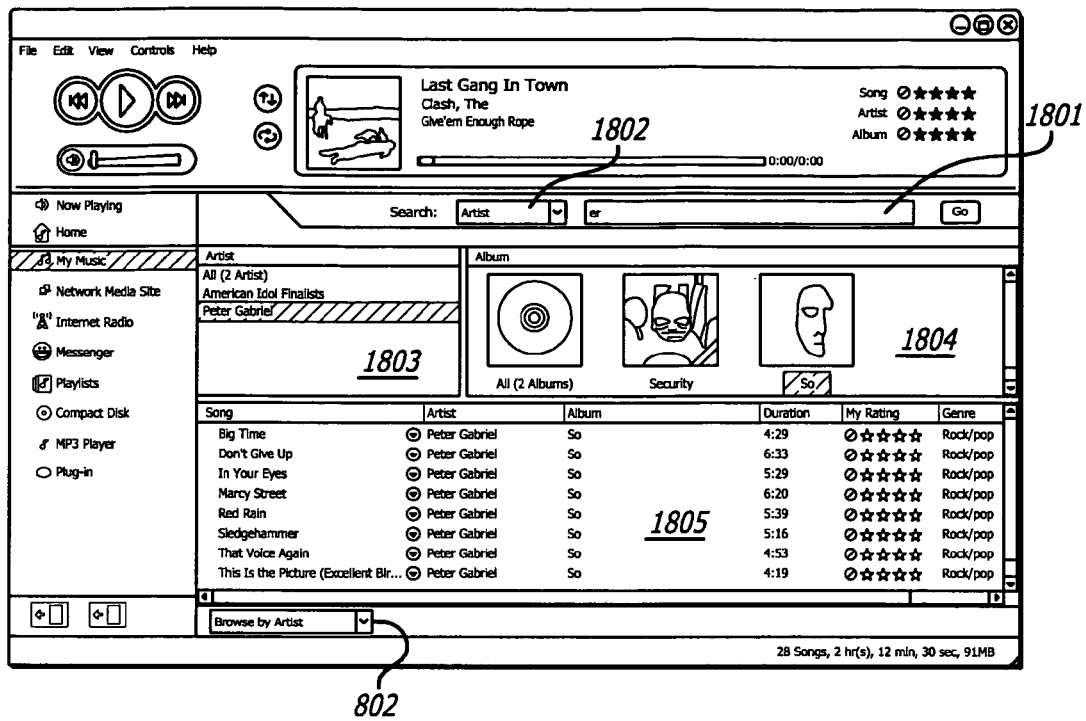
FIG. 26 is an additional exemplary user interface utilizing a search engine in connection with an exemplary media engine according to another embodiment of the present invention.

Additional similar embodiments that can search a user's "my music" collection (or elsewhere on the network) by artist, songs, and/or genre will now be discussed with reference to FIGS. 24-30. As can be seen in FIG. 24, a user can elect to search artist's names from their "my music" collection by choosing Artist from the drop-down menu 1802 and including a search term such as, for example, "er" in field 1801. This will once again result in those songs whose artist name has the term "er" within their name to be displayed in pane 1805. As can be see in FIG. 25, once again, a user can further narrow the search by choosing a particular artist from pane 1803, in which case only those songs belonging to that particular artist will be displayed in pane 1805. The user can once again further narrow down the search by choosing an album from pane 1804 in which situation only songs matching that album and the search criteria will be displayed in pane 1805, as can be seen in FIG. 26.

Figure 27:
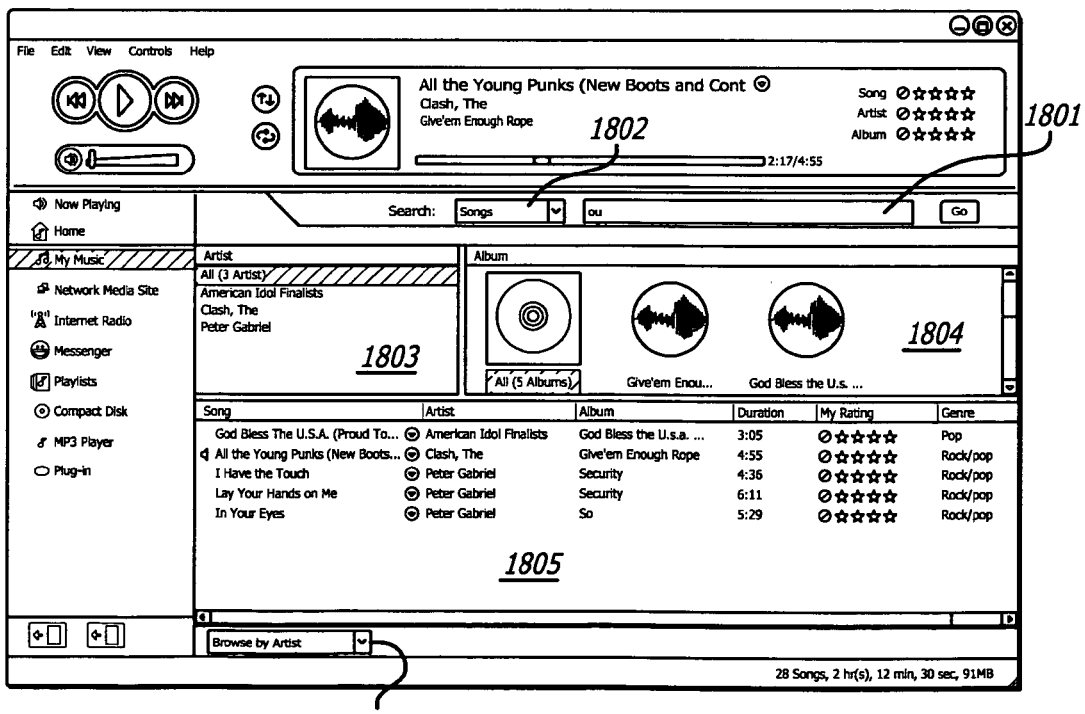
FIG. 27 is an additional exemplary user interface utilizing a search engine in connection with an exemplary media engine according to another embodiment of the present invention.
Figure 28:
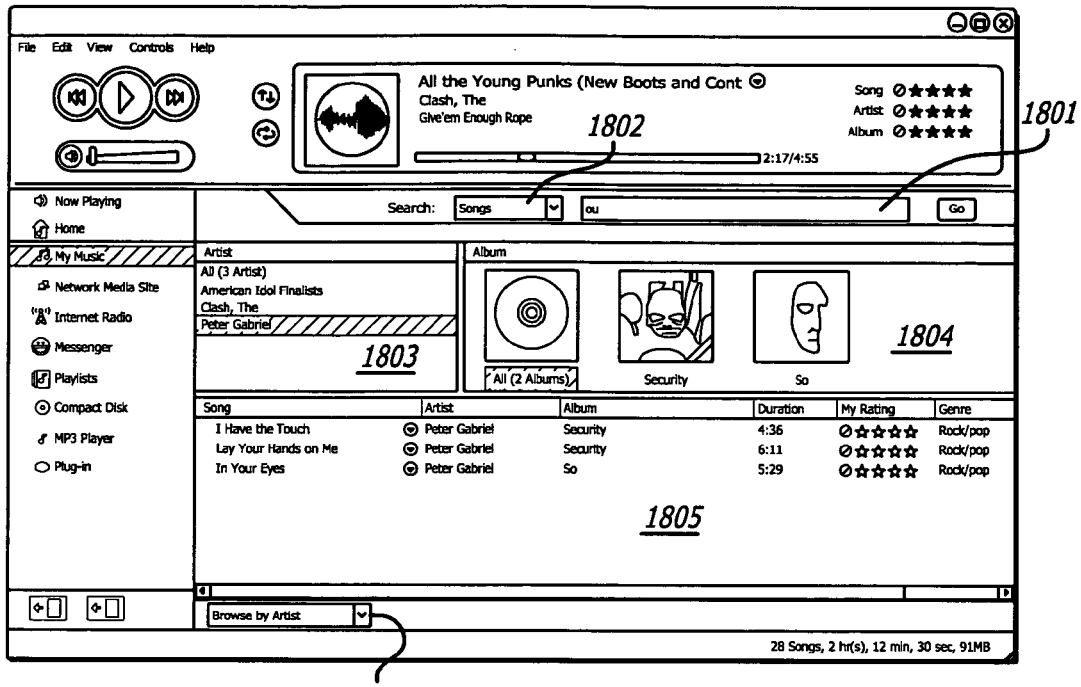
FIG. 28 is an additional exemplary user interface utilizing a search engine in connection with an exemplary media engine according to another embodiment of the present invention.
Figure 29:
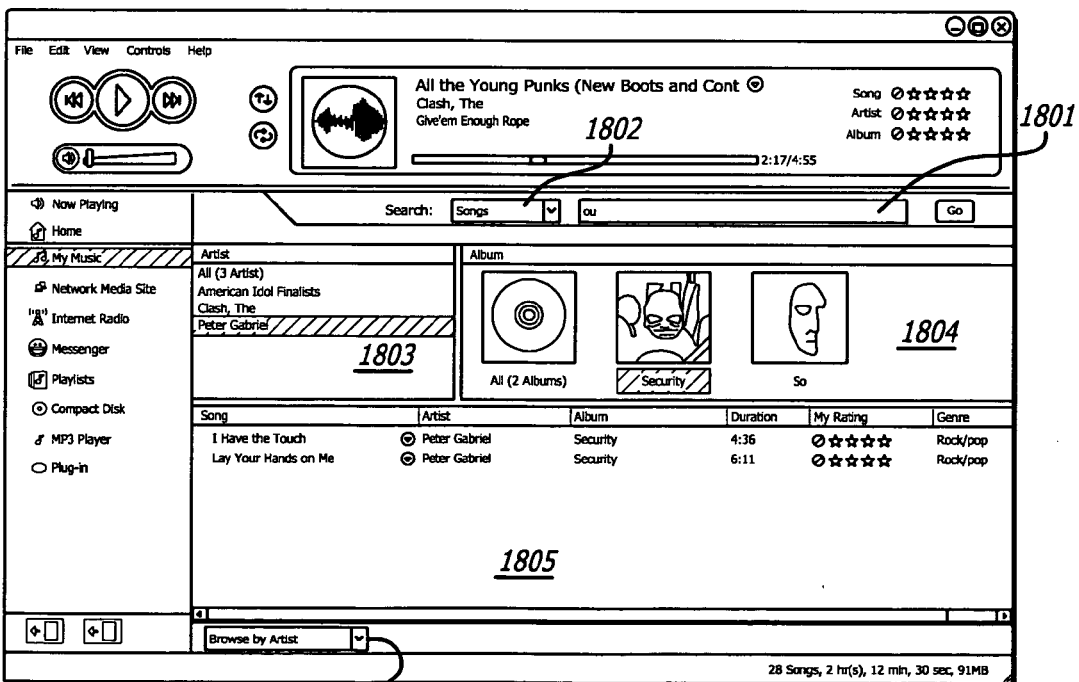
FIG. 29 is an additional exemplary user interface utilizing a search engine in connection with an exemplary media engine according to another embodiment of the present invention.

In another embodiment, a user can search for a particular term in a song name as can be seen in FIG. 27. Similar to above embodiments, a user can select songs from drop-down menu 1802 and enter a particular search criteria in field 1801. As can be seen in FIG. 27, if the user chooses songs from the drop-down menu 1802 and the string "ou" from field 1801, songs will be displayed in pane 1805 that have the string "ou" in their song name and a list of artists and albums for those songs will be displayed in pane 1803 and 1804, respectively. This search can once again be narrowed as can be seen in FIG. 28, if the user chooses a particular artist from the artist pane 1803. As is shown in FIG. 28, only songs matching the selected artist (Peter Gabriel) are shown in pane 1805 and only albums matching that artist are shown in pane 1804. The search can be further narrowed if the user chooses an album from pane 1804, as can be seen in FIG. 29, pane 1805 then only displays those songs that match the criteria and are from the particular album chosen by the user.

Figure 30:
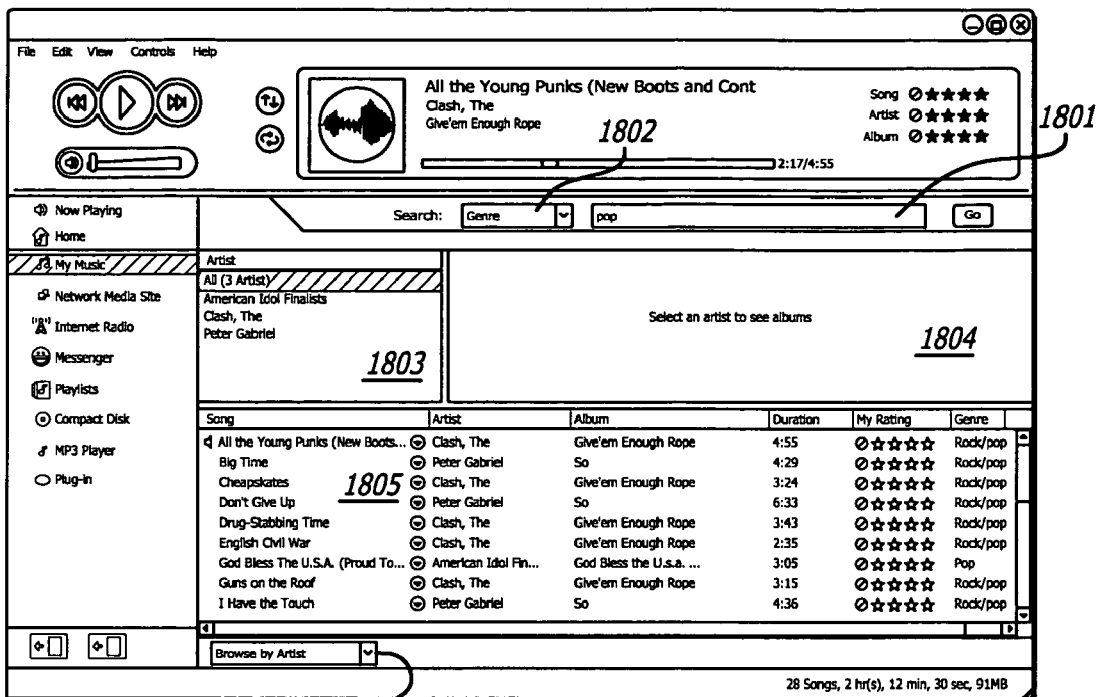
FIG. 30 is an additional exemplary user interface utilizing a search engine in connection with an exemplary media engine according to another embodiment of the present invention.
Figure 31:
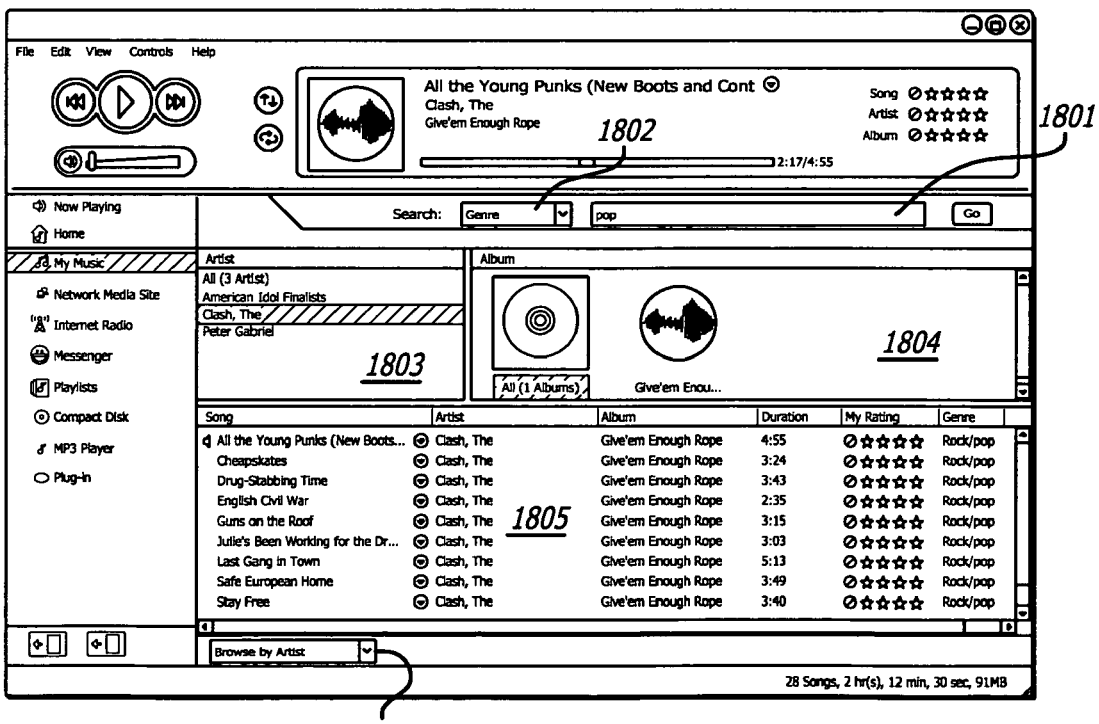
FIG. 31 is an additional exemplary user interface utilizing a search engine in connection with an exemplary media engine according to another embodiment of the present invention.
Figure 32:
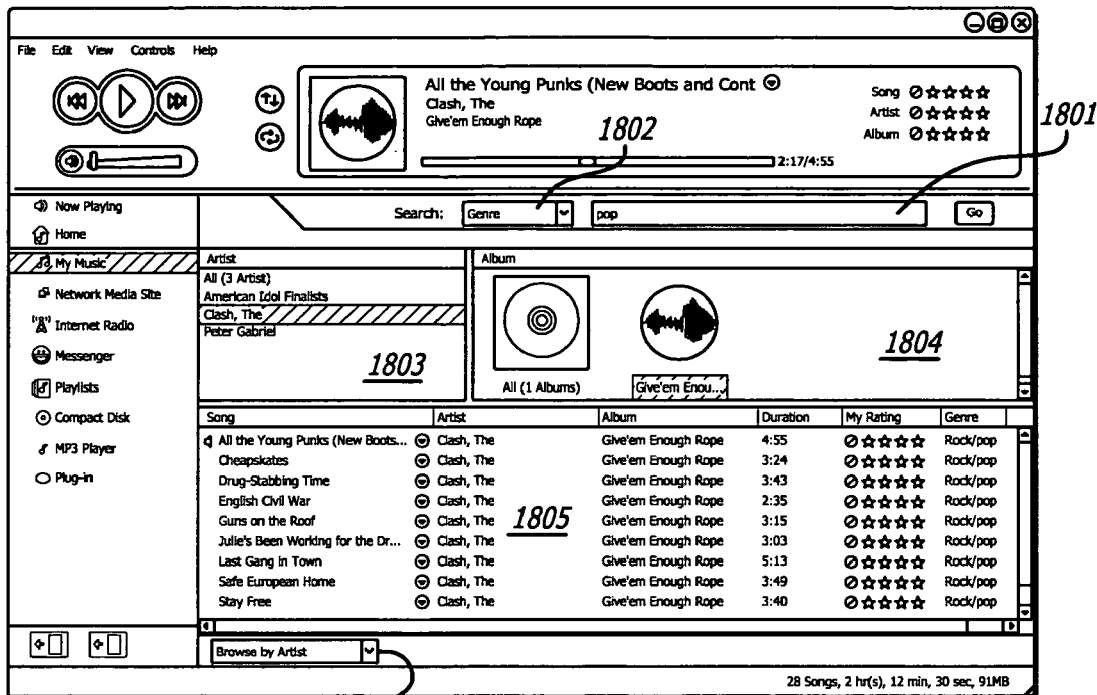
FIG. 32 is an additional exemplary user interface utilizing a search engine in connection with an exemplary media engine according to another embodiment of the present invention.

In another embodiment, as can be seen in FIG. 30, a user can perform a search of his or her "my music" collection (or elsewhere on the network) by genre, by choosing the term genre from the drop-down menu 1802 and entering a search term into field 1801. As can be seen in FIG. 30, if a user chooses the genre search from the drop-down menu 1802 and enters a search term, for example, "pop" into field 1801, pane 1805 will display all the songs that match that criteria and pane 1803 will display the artists that match those songs. In this particular embodiment, pane 1804 is not populated with album names until an artist is selected, as will be discussed with reference to FIG. 31. It should be appreciated that in different embodiments, panes 1803, 1804 and 1805 may be populated as soon as the initial search is performed or may remain unpopulated until an additional criterion is selected. Similar to previous embodiments, if a user wishes to narrow the search further, he or she can choose a particular artist from pane 1803 as can be seen in FIG. 31. If a user does choose a particular artist, for example, "The Clash" from pane 1803, the albums that match that particular artist and the criteria will be displayed in pane 1804 and songs belonging to that particular artist will be displayed in pane 1805 as is shown in FIG. 31. Once again, the user can further narrow the search by choosing a particular album from pane 1804, as is shown in FIG. 32. If the user does choose that particular album, then only songs that are in that particular album from that particular artist matching the genre criteria chosen from field 1801 will be displayed in pane 1805.

In one embodiment, the search field 1801 would populate automatically based on prior searches performed by the user, by for example filling in the word "Jones", once the user types "JO". Once again, as in previous embodiments the user has the ability to play any of the songs that are returned by the search by clicking on the particular song in the list in pane 1805. Additionally, if the album is already located in a user's "my music" collection, the add button 526 may not appear and rather an empty box 527 or icon which might for example say "already in my music" may appear instead. These searches may be carried out either in the user's "my music" collection, in the full collection available from the media database 120 or anywhere throughout the network 300.

Figure 33:
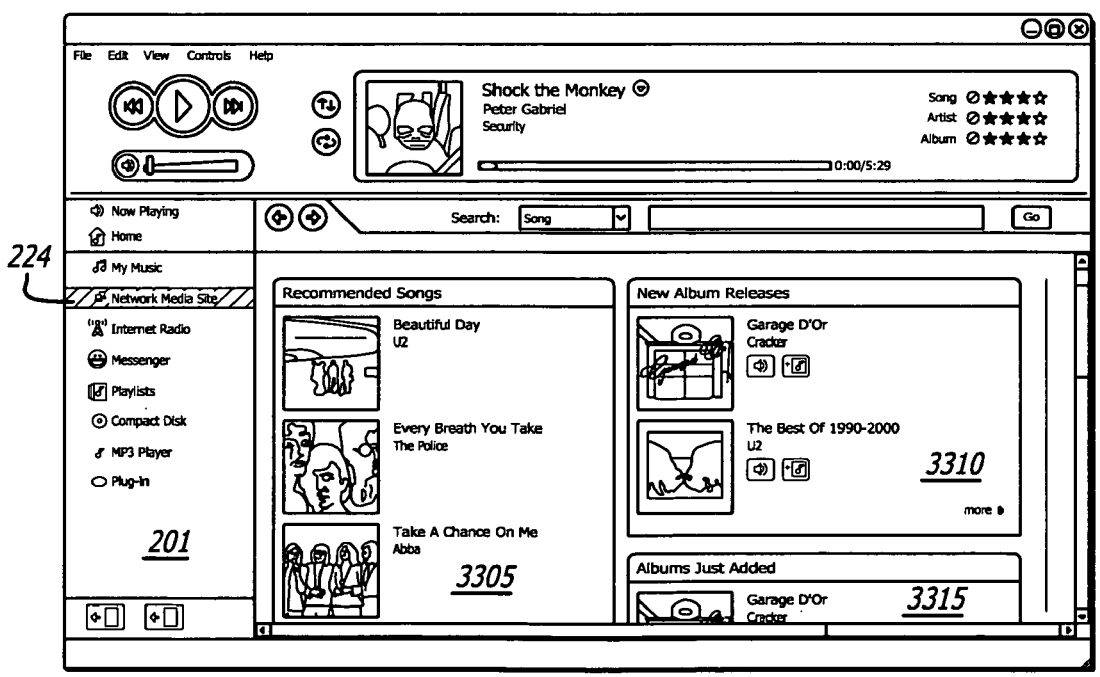
FIG. 33 is an exemplary user interface of an exemplary media engine according to one embodiment of the present invention.
Figure 34:
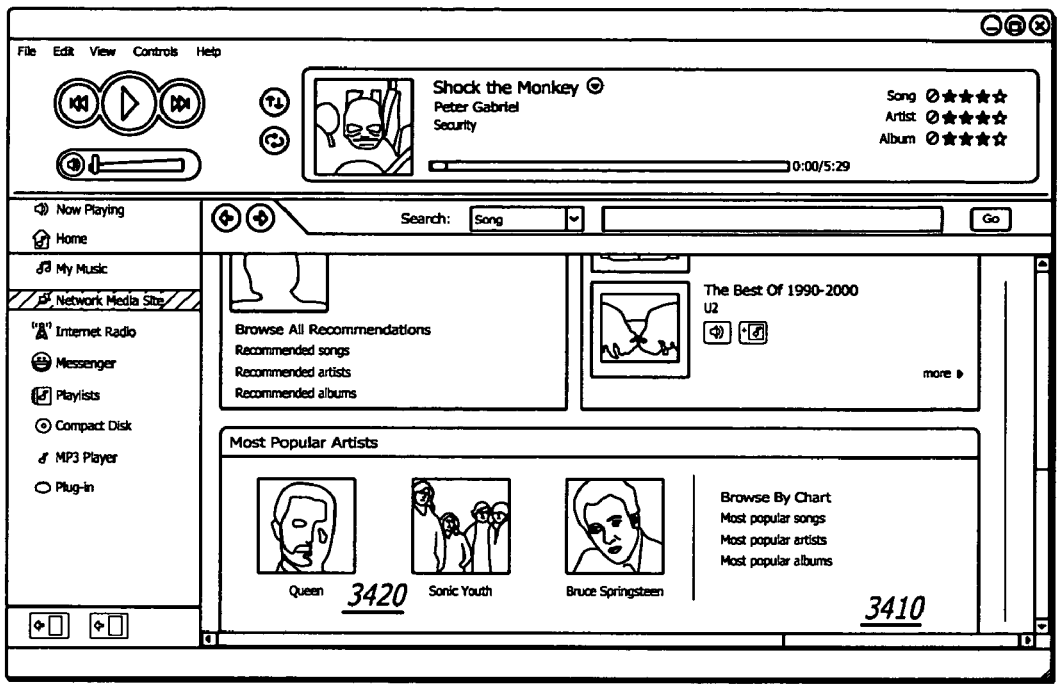
FIG. 34 is an exemplary user interface of an exemplary media engine according to one embodiment of the present invention.

As was discussed above, in one embodiment of the present invention, a user can access media files located in media database 120 via media server 118. Media engine 106 can generate for the user a listing of the music located on media database 120 in a similar way to the way the music located in a particular user's "my music" collection is displayed. As can be seen in FIG. 33, when a user selects the network media site tab 224, from pane 201, an interface 3300 is generated for the user that lists songs that are located on media database 120 that the operators of the media site wish to either recommend to the user or inform the user about. This recommendation is preferably, but not necessarily, based upon preference information stored in user information database 122 or on the user's processor or elsewhere on the network, as preference information, for the purposes of personalizing a user's experience, may be stored at, and accessed from the location or locations on the network where such information may be stored. For example, as can be seen in pane 3305, the media engine generates a listing of recommended songs that are located on media database 120 but are not in the user's "my music" collection. Additionally, as can be seen in listing 3310, the media engine can also generate a listing of albums that were recently released that the user might find interest in. Additionally, in one embodiment, the media engine can also generate a list of particular albums or songs that were just added to the database as is shown in listing 3315. It should be noted, that in different embodiments the media engine 106 can generate different listings and groupings of songs and/or albums located on media database 120. For example, as can be seen in FIG. 34, the media engine 106 can generate a most popular artists section 3410, which includes a listing of the most popular artists from within the database 120 as well as a .gif image 3420 of those particular artists. Once again, these .gif images can be stored together with the media and metadata stored on media engine 106 and/or media server 118. Although discussed in terms of a .gif image, any file format that displays images such as .jpg, .tif, or any other image file format heretofore and hereafter known to display the picture of the artist.

Figure 35:
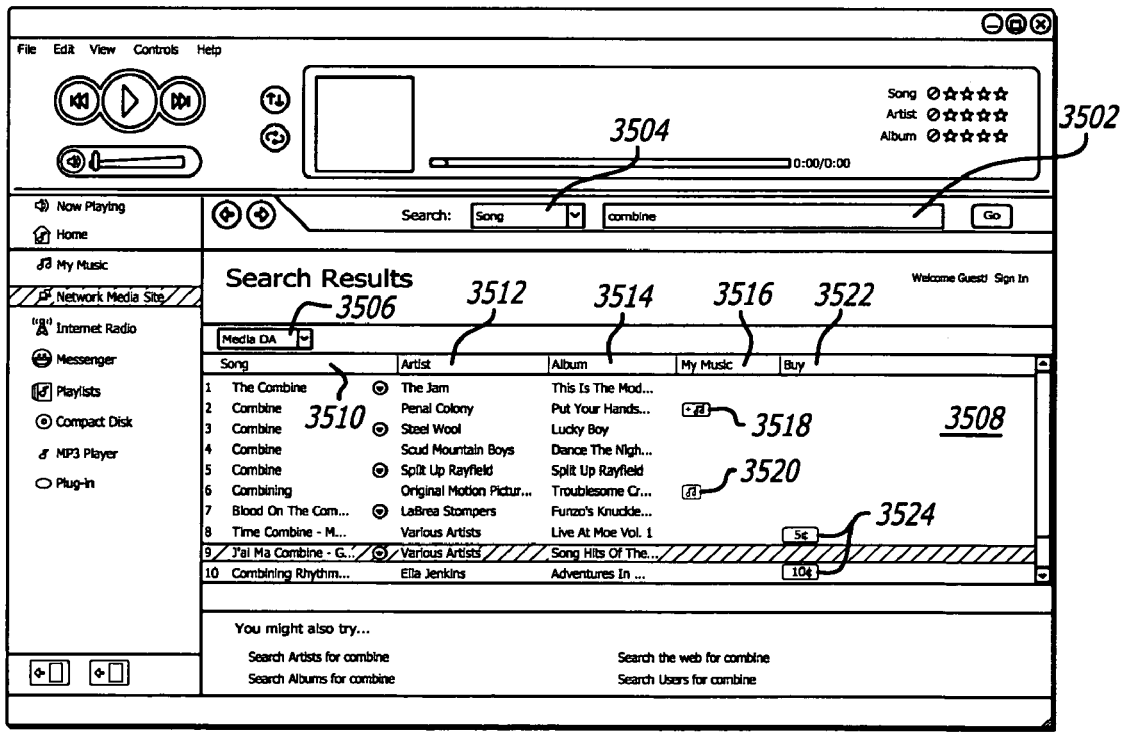
FIG. 35 is an exemplary user interface of an exemplary media engine according to another embodiment of the present invention.
Figure 36:
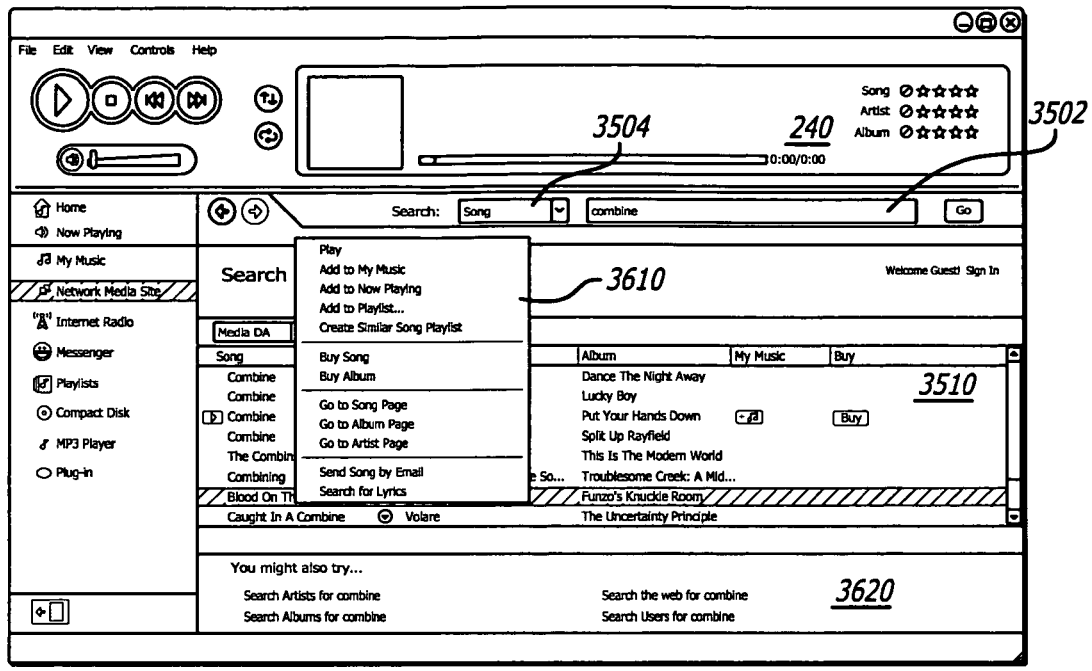
FIG. 36 is an exemplary user interface of an exemplary media engine according to another embodiment of the present invention.

In an additional embodiment, a user may search through songs located on media database 120 or elsewhere on the network for a particular term located in either the song name, artist name, or album name. For example, as can be seen in FIG. 35, user 102 has the ability to perform a search function within interface 3300 of all media that is available either on media database 120 and/or located in the user's "my music" collection or elsewhere. As can be seen from FIG. 35, user interface 3300 contains a field 3504 wherein a criterion may be selected to search a particular search variable which can be entered into field 3502. For example, in FIG. 35, a display is shown where a user has selected to search for the term "combine" in all song names of songs located on the media database 120. This is because the user has selected "song" from drop-down menu 3504, and entered the word "combine" in field 3502 as well as chosen to search the media database from drop-down menu 3506. Once the user has entered the search terms and the search has been performed, a list of those songs that match the criteria will be displayed in pane 3508. These listings may include song titles 3510, artist name 3512, and album names 3514. In one embodiment, the listing will also include a "my music" column 3516, which can include a button 3518 next to a particular song that the user can click upon to add to his or her "my music" collection. For example, as can be seen in FIG. 36, if a user wishes to add the song "Combine" by "Pino Colony," he or she would click on button 3518 and the song will automatically be added to the user's "my music" collection. Access to songs in media database 120 can be based on a tiered membership, or based on differing subscription fees. Therefore, certain users may be allowed to add certain songs to their "my music" collection while other users may not. Therefore, "my music" column 3516 displays to the user which songs can be added to the particular user's "my music" collection. Alternatively, the "my music" column 3516 may also include a button 3520, which can indicate that the particular song is already located in a particular user's "my music" collection. Thus, from this display, a user can readily ascertain which songs he or she may wish to add to their "my music" collection and/or which songs he or she may already have in their "my music" collection.

In one embodiment, in addition to a user's ability to click on button 3518 to automatically add the particular song to the user's "my music" collection, the user also has the ability to purchase a particular song for a pre-determined price via button 3524 in column 3522. For example, if the user enjoys a particular song that is returned by the search, and wishes to purchase that song, the user would click on button 3524. In one embodiment, the user would be directed to a payment page (not shown) where, for example the user can enter credit card information. From this page for example a user can complete an e-commerce transaction in a known manner to purchase a download and/or streaming rights, or other access rights in the song and/or album including a tangible copy. It should be appreciated that this combines the use of the media engine and the experiencing of media files with the ability to conduct commerce and purchase copies of and/or rights to the media that a user is listening to. This pricing information can be stored along with each media file metadata to make it easily accessible to the media engine 106. In other words, when displaying a song for a user, the media engine 106 knows whether the user already has the media file on their computer and the media engine 106 also knows from the media server 118, using commerce functions 330 located on network 300 what the proper pricing for that song is and which vendors may be selling that song. Thus, the user, through a user-friendly interface and by the click of a mouse, is able to purchase a particular song or album right from within the media engine 106, obviating the necessity of "shopping around" for a particular song or album. In another embodiment, as can be seen in FIG. 36, in addition to both options listed in interface 3508, the user may also right click on a particular song name to produce a drop-down menu 3610 that would display a list of options available to the user in relation to that particular song. For example, as can be seen in FIG. 36, the user has the option to play the song in which case the song will be played in music player 240, add the particular song to his or her "my music" collection, add the song to the music currently playing, add the song to a playlist, create a similar song playlist as will be discussed below in relation to FIGS. 46-47, or to buy the song and/or album, in which case the user may be directed to a payment page where, for example, the user can enter credit card information. Alternatively, from menu 3610, the user may go to a song page, album page, or artist page, which can be web pages with information about that particular song, album or artist. In addition, other choices available to the user may include sending the song to a friend either by a messaging program, email or other communication software or to search network 300 for the words or lyrics to that particular song. In one embodiment, interface 3300, may also include pane 3620 which includes a listing of other options that the user may wish to employ to perform similar searches to those that he or she has already performed. For example, as can be seen in FIG. 36, pane 3620 allows the user by a click of the mouse to easily search other artists' albums, users and/or the web for a particular search term that has already been entered in field 5001. Alternatively, a choice can be given to view similar artists or songs or albums based upon similarity data stored at media server 118 or elsewhere on the network.

Figure 37:
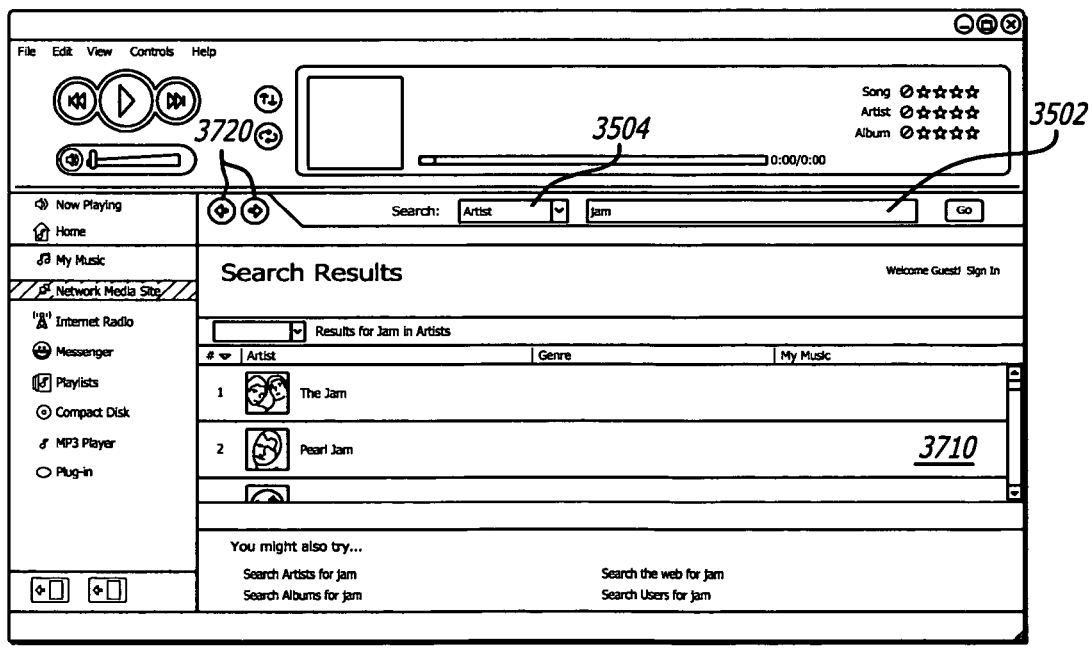
FIG. 37 is an exemplary user interface of an exemplary media engine according to another embodiment of the present invention.
Figure 38:
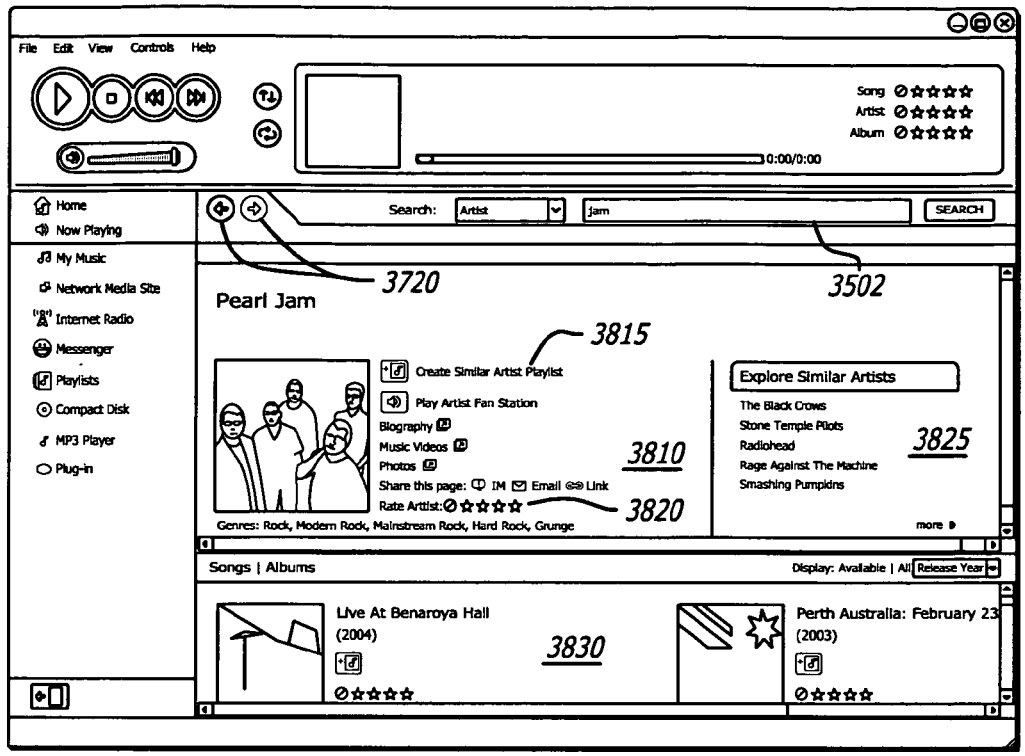
FIG. 38 is an exemplary user interface of an exemplary media engine according to another embodiment of the present invention.

In another embodiment, the user may search for songs within the media database 120 by a variable that is only in the song's artist name by selecting artist from the drop-down menu 3504 and entering the search term into field 3502. As can be seen in FIG. 37, if the user chooses to search artists names from drop-down menu 3504 and populates, for example, field 3502 with the search term "jam," the media engine 106 will return a list of artists in pane 3710 that match that particular criteria Once again, the user may choose to perform the search either in media database 120, in the user's "my music" collection, or both, or elsewhere, by selecting the particular location or locations from drop-down menu 3506. Additionally, the image of the particular artist may also be displayed next to the artist's name in pane 3710, as was discussed above with reference to album covers and artist images. If a user wishes to obtain additional information about a particular artist listed in pane 3710, the user can click on that particular artist's name and/or image and he or she will be directed to a display that lists information about that particular artist, as can be seen in FIG. 38. As is shown in FIG. 38, an interface 3810 about a particular artist can include a biography about the artist, photos of the artist, or a listing of the particular genre the artist's music falls under. Additionally, the user may create a similar artist playlist, as will be discussed with reference to FIG. 46, by clicking on the create similar artist playlist button 3815. Once again, in this embodiment, the user 102 can also rate the particular artist by clicking on the rating tool button 3820. As was discussed above, any ratings entered by a particular user helps create an enhanced experience for the user as the media server obtains additional information about the likes and dislikes of a particular user. Additionally, in one embodiment, display 3825 may include a listing of similar artists so that the user can explore music by a similar artist as well. Additional albums by that particular artist can also be displayed, as can be seen in display 3830. In another embodiment, as can additionally be seen in FIGS. 37-38, the user has the ability to navigate within displays, to go forward or backward from one display to another by clicking on the backward and/or forward buttons 3720, respectively. This enhances the user's experience, allowing them to navigate between different displays as one would be able to within a typical internet browser, for example.

Figure 39:
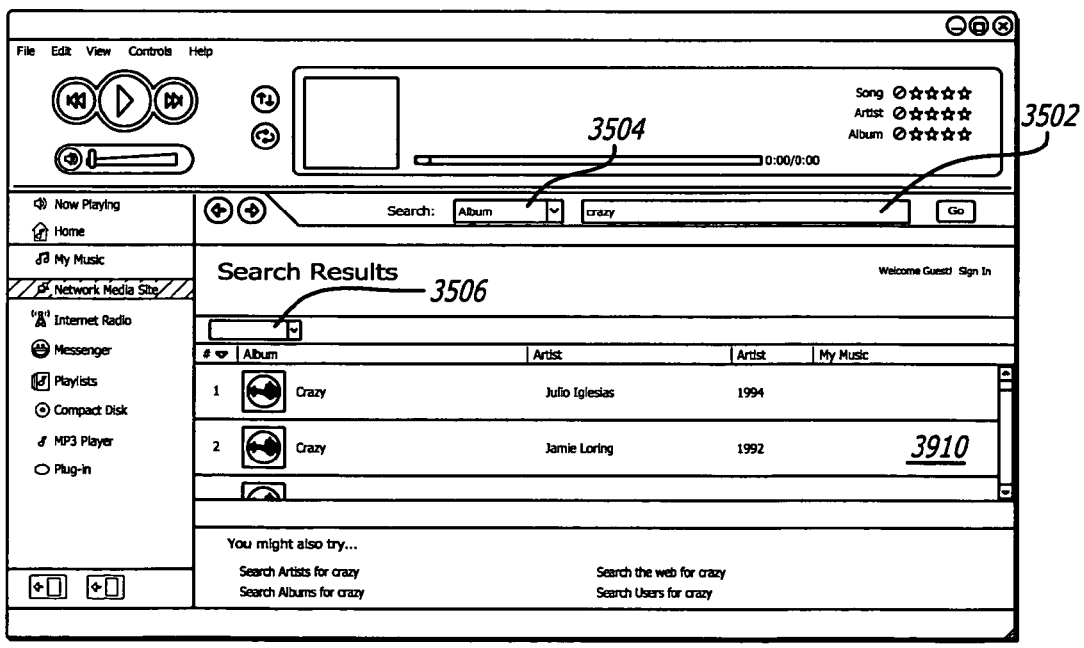
FIG. 39 is an exemplary user interface of an exemplary media engine according to another embodiment of the present invention.
Figure 40:
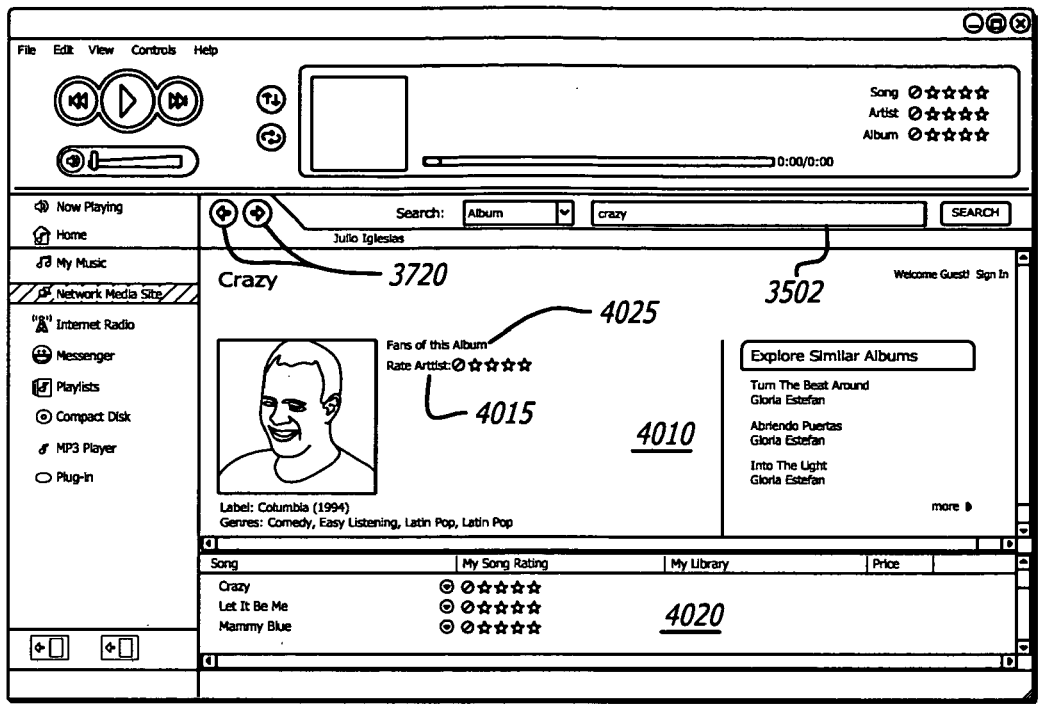
FIG. 40 is an exemplary user interface of an exemplary media engine according to another embodiment of the present invention.

In another embodiment, a user may search for songs within the media database 120 by a variable that is only in the album name of a song by selecting album from drop-down menu 3504 and entering the search criteria in field 3502. As can be seen in FIG. 39, if a user chooses to search albums from drop-down menu 3504 and populates, for example, field 3502 with the search string "crazy," the media engine 106 will return a list of albums in pane 3910 that match that particular criteria. Once again, the user may choose from drop-down menu 3506 whether to search for media located in the media database, in the user's "my music" collection and/or both. In addition to the album name, an image of the album cover may also be displayed in pane 3910 along with the artist's name and in one embodiment the year that the album was produced may also be displayed. Similar to previous embodiments, a "my music" column may also be shown to indicate whether any songs from the particular album are located in a user's "my music" collection. Once again, similar to previous embodiments, a user may access additional information about a particular album by clicking on that particular album name and/or image as can be seen in FIG. 40. As can be seen in FIG. 40, a display that includes additional information about the album is shown in pane 4010. Once again, from within the display, the user may rate the particular album by clicking on the rating tool 4015 or view the names of additional users who enjoyed that particular album by clicking on the fans of this album button 4025. In one embodiment, pane 4020 may show a listing of all the songs located on that particular album. Once again, a user can navigate from this album page to any previously viewed pages by clicking on forward or backward buttons 3720.

Figure 41:
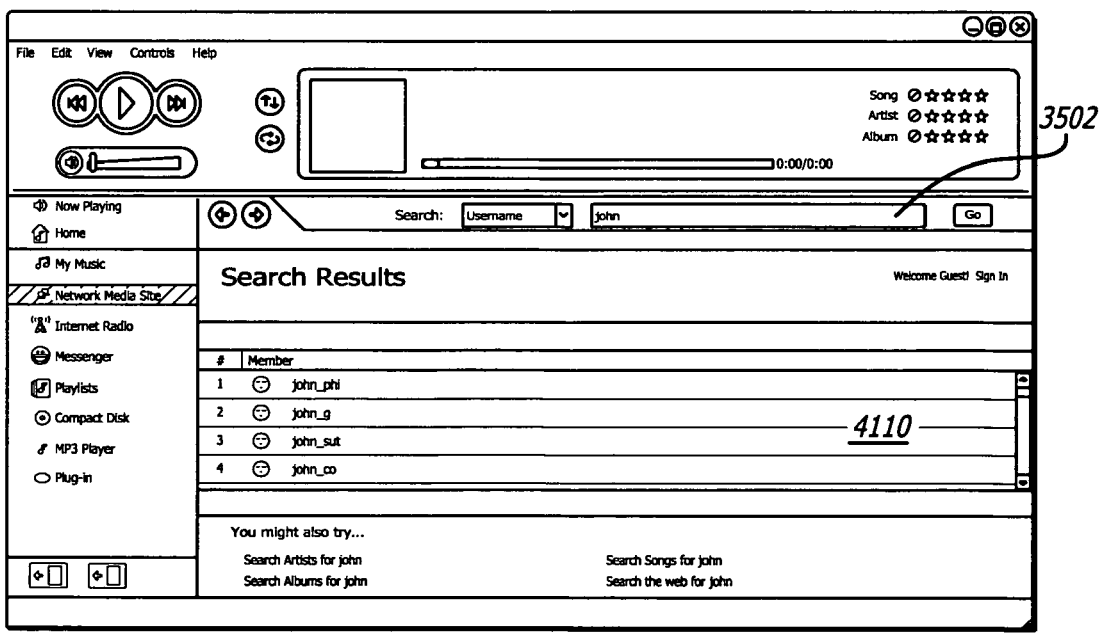
FIG. 41 is an exemplary user interface of an exemplary media engine according to another embodiment of the present invention.
Figure 42:
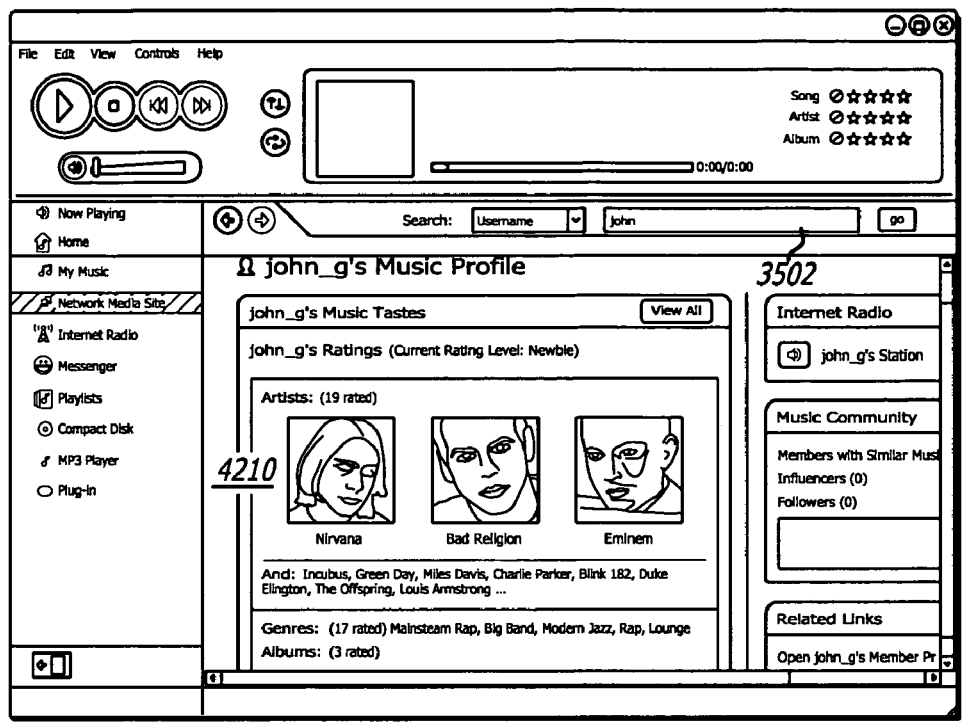
FIG. 42 is an exemplary user interface of an exemplary media engine according to another embodiment of the present invention.

In another embodiment, the user is given the ability to search for information related to another user of the media engine 106 to access songs that the other user prefers. As was discussed above, different users 102 are distinctly identified by a user Name or other identifier, which is also preferably associated with various preferences for that user stored on the network. Thus, in one embodiment, a user can search for another user's music by using the other user's identifier, or by the system finding the user or users that fit certain search criteria based on user preference and/or user behavior. For example as can be seen in FIG. 41, if a user populates field 3502 with a search term (e.g., John) and chooses to search through a user Name from dropdown menu 3504, a search result may be displayed in pane 4110 that shows all of the users that have that particular search term (e.g., John) within their user Name. If a user clicks upon a particular user from within pane 4110 (e.g., john_g) a page as can be seen in FIG. 42 will be displayed in pane 4210 that shows additional information about the user including artists, genres or albums that the chosen user has rated highly. Alternatively, a song title may be entered, and the drop down menu can contain an "all users" selection, to initiate a search of users' media files for a particular song. As another example, if the search is done instead on genres, a list of users that like a particular genre would be returned, or by further example, all users that like a particular song, artist, album or the like.

The use and creation of playlists in connection with one embodiment of the present invention will now be discussed with reference to FIGS. 43-48. The use of a playlist allows the user to listen to a number of media files organized by the user according to some user preference or other criteria.

Utilizing the user's "my music" collection or other media available through media server 118 or network 300, a user can easily create a playlist by ordering songs in a way that the user wishes to play them or some other order. This order of songs is then stored in a playlist database 340, on processor 103, in both locations, or other locations on network 300. For example, if a user wishes to create a playlist of Song 6, Song 8 and Song 10 that are each in the user's "my music" collection, the media engine 106 will create a file that will contain a list of pointers that point to the location of Song 6, Song 8, and Song 10, respectively, and send that file to the playlist database 340. This location information is preferably made available as a result of the media engine's 106 initial collection of information about each of the user's available media files or may occur at the time the song is selected for inclusion in the playlist. Thus when the user wishes to access the newly formed playlist, the media engine is able to locate and play those songs that are in the playlist. These playlists can be accessed from any location from which a user may run media engine 106.

Figure 43:
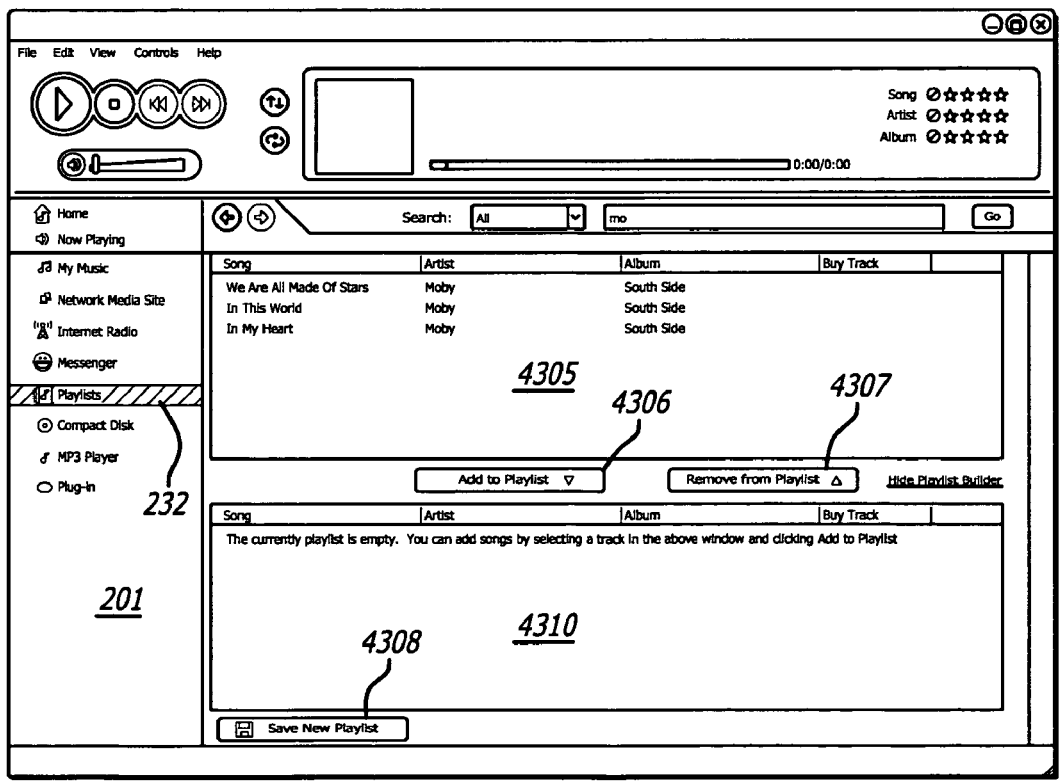
FIG. 43 is an exemplary user interface used in creating a playlist with an exemplary media engine according to one embodiment of the present invention.
Figure 44:
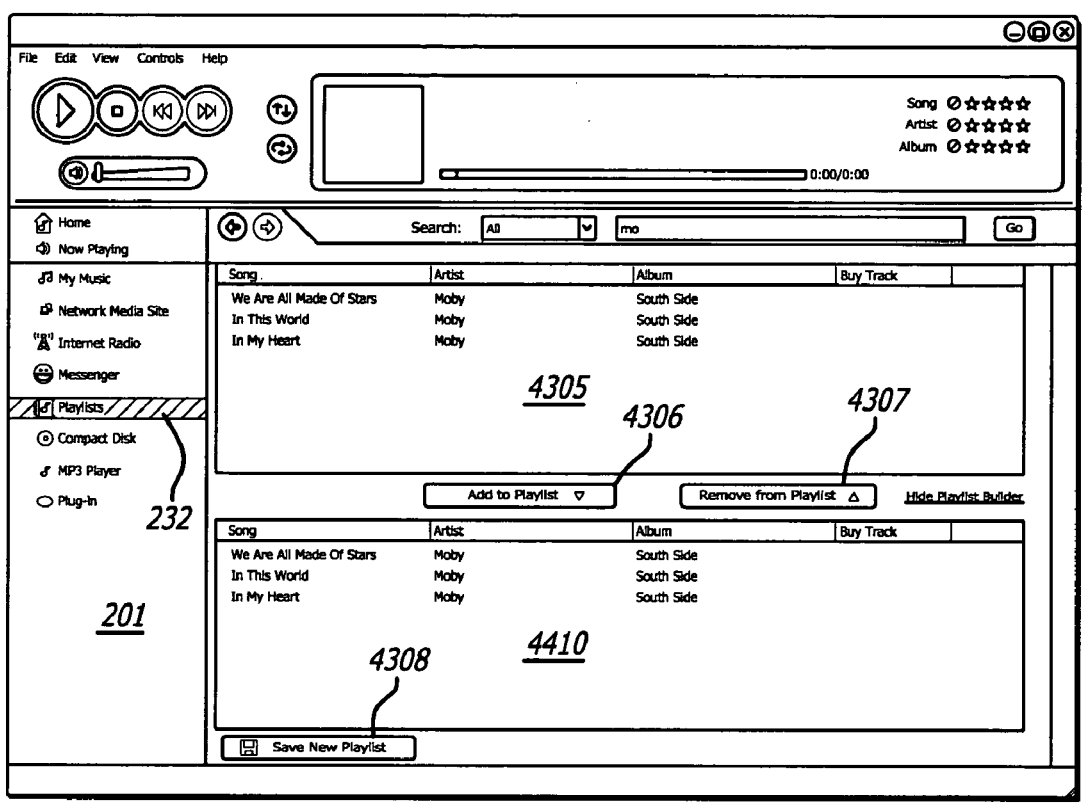
FIG. 44 is an additional exemplary user interface used in creating a playlist with an exemplary media engine according to another embodiment of the present invention.

The ability to create a more robust and versatile playlist from a user's "my music" interface discussed above with reference to FIG. 2, that can then be listened to by the user 102 from any processor 103 that the user 102 is located at will now be discussed in reference to FIG. 43. From a user's interface 200, user 102 is able to create a playlist by selecting a particular song that the user 102 wishes to add to create a new playlist. For example, as can be seen in FIG. 43, the results of a search that is searching for all media within this particular user's "my music" collection that has the string "mo" in it is displayed in interface 4305. As can further be seen in FIG. 43, the user then has the ability to click on buttons 4306 or 4307 to create and refine his or her playlist. For example, in FIG. 43, pane 4310 does not have any songs in the playlist; however, instructions are displayed showing the user how songs may be added to the playlist. As can be seen in FIG. 44, if the user elects to add songs to a playlist, by clicking on a select song and then clicking on the "add to playlist" button 4306, a new playlist is created for this particular user in pane 4410. This could also be accomplished through a drag and drop method by dragging the song into pane 4310 or over to playlist tab 232. Thus, through this interface the user is able to create a playlist that consists of all media available as part of a user's collection that contains the string "mo". If for example the user would then wish to remove one of the songs or all of the songs from the particular playlist the user can click on the "remove from playlist" button 4307 which would then remove those songs from the playlist. After this playlist has been created, the user has the ability to save the new playlist as a file by clicking on the "save new playlist" button 4308. Once the user clicks on the save new playlist button the user is preferably given the ability to name or otherwise identify the playlist and can then access the user's playlists at any time from the playlist list 232 in interface 201. As was discussed earlier in reference to FIG. 2, the playlists that are listed in pull down list 232 become available for the user to access from any location where the user is located and using media engine 106.

In another embodiment a user is able to easily create a playlist consisting of songs with a particular search criteria by manually selecting each song that the user wishes to include in the particular playlist area. Thus, a user can manually utilize their "my music" collection or the network at large to create a playlist that incorporates those particular songs that the user wishes to have in a particular playlist and can then access that playlist from a variety of locations. This is facilitated once again by media engine 106 and the information compiled by the media engine about a user's available media. Similar to individual songs added to a user's "my music" collection, these playlists become accessible for the user from any location that the user has access to media engine 106.

Figure 45:
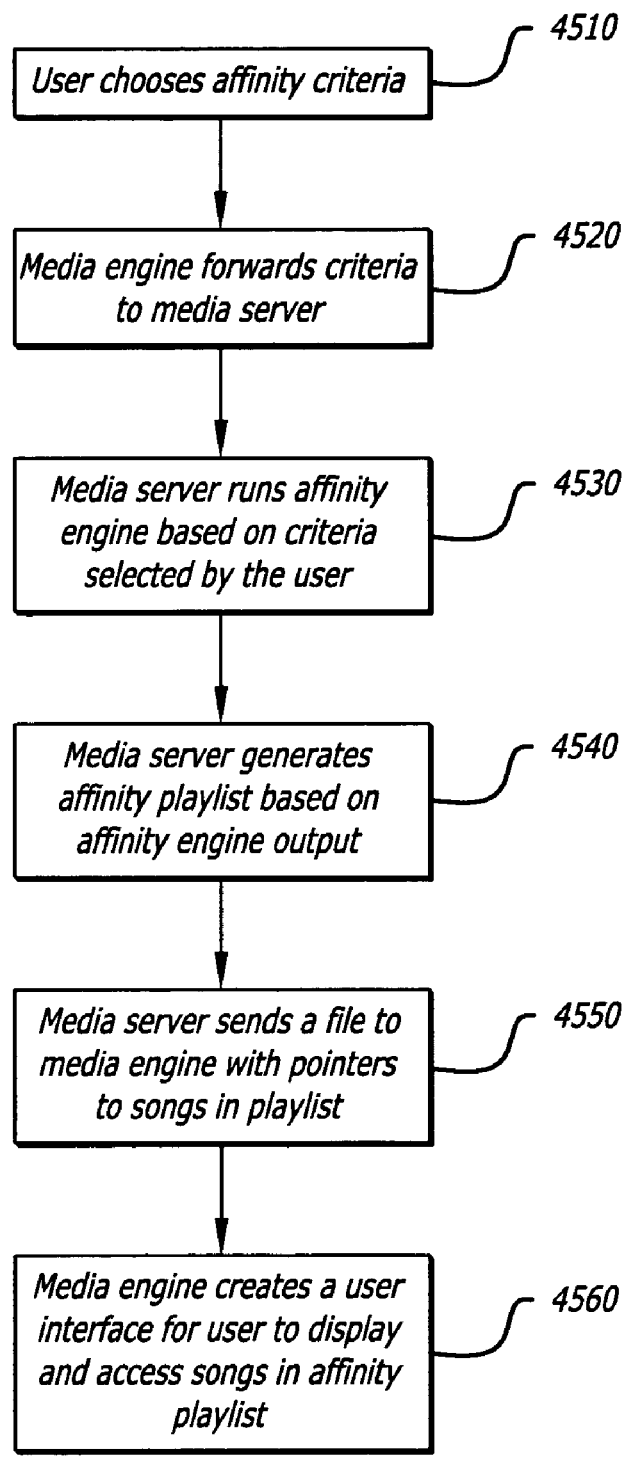
FIG. 45 is a flowchart depicting the creation of an affinity playlist.
Figure 47:
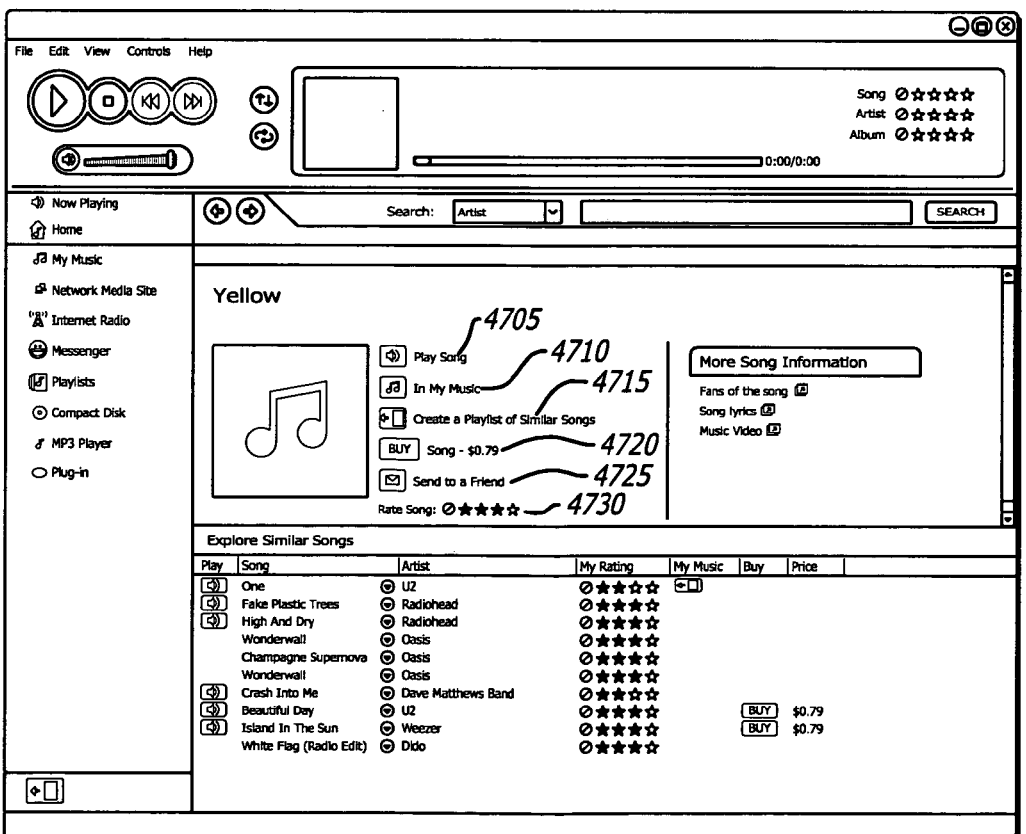
FIG. 47 is an exemplary user interface used in creating a playlist with an exemplary media engine according to one embodiment of the present invention.
Figure 48:
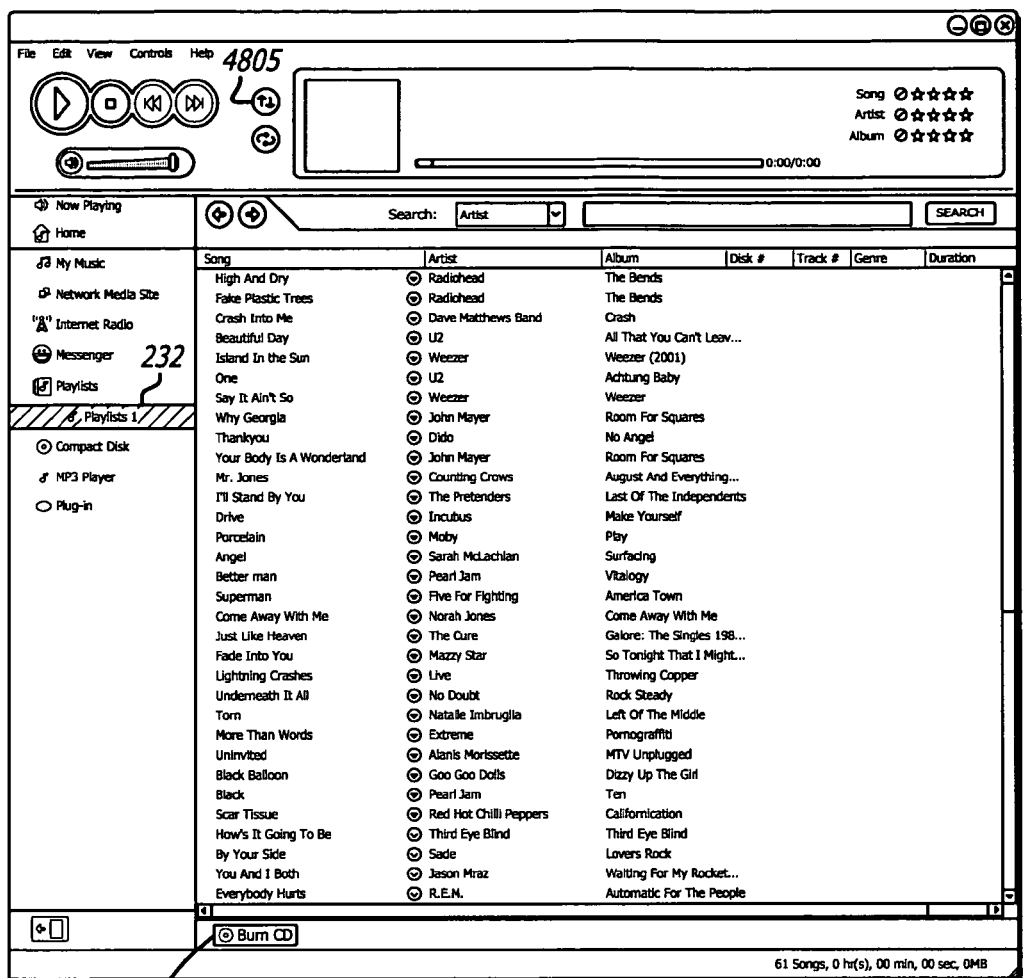
FIG. 48 is an additional exemplary user interface used in creating a playlist with an exemplary media engine according to one embodiment of the present invention.

Another embodiment of the present invention used to generate playlists will now be discussed with reference to FIG. 45 and the interfaces depicted in FIGS. 46-48. In this embodiment, the system can generate a playlist that is based on a relation of particular songs, artists or albums to each other and any affinity that those songs, artists or albums may have to each other. Different users may have different likes and dislikes for different songs, artists and/or albums. In general, however, users that like a particular song, for example, will likely enjoy other songs by that artist or songs that are similar to that particular song. Therefore, it is possible to create an affinity relationship between songs, albums, and/or artists by compiling a list of songs that are commonly liked by one user. Thus, for instance, if a user likes song A and song B, it is possible that the two songs are related in some way and that is why the user likes both of the songs. If two users both like song A and song B, the chance of the songs being similar or that affinity to each other is stronger because now an additional user has shown his or her like for both songs. Similarly, if 1,000 users like both song A and song B, the chance of there being an affinity or similarity in the songs is increased. In this embodiment, factoring in the likes and dislikes of a particular user, the media server utilizes an affinities engine 350 to generate a playlist that matches affinity criteria and/or degree of similarity between artist, albums or songs as desired by the user. As is depicted in FIG. 45, the media engine 106 receives the criteria (e.g., a particular artist or song) from user 102, step 4510. Once received by the media engine 106, the criteria is passed along to media server 118, step 4520 The media server then runs the criteria through affinities engine 350, step 4530. For example, the system may collect user information concerning listening patterns and preferences, and process that information to develop a database of relationship among items of media. Thus, for example, the system may, through processing user information, or by direct input by system administrators or operators, glean that many users that listen to artist A also listen to artist B, and thus the system can associate artist A and artist B as similar. The system can also utilize user genre ratings, third party reviews, implicit or explicit user behavior analysis, human editors or other information sources in developing affinity relationships. By way of non-limiting example, an exemplary formula processed by the affinity engine to establish the affinity between songs, artist and/or albums will be discussed below.

Once the affinity engine computes the affinities in accordance with criteria selected by the user, the media server 118 creates a playlist based on those affinity results. Step 4540. The media server then forwards a file containing pointers to the songs in the newly created playlist to media engine 106. Step 4550. The media engine then creates a user interface to display the songs in the playlist and grant access to those songs for the user. Step 4560.

Figure 46:
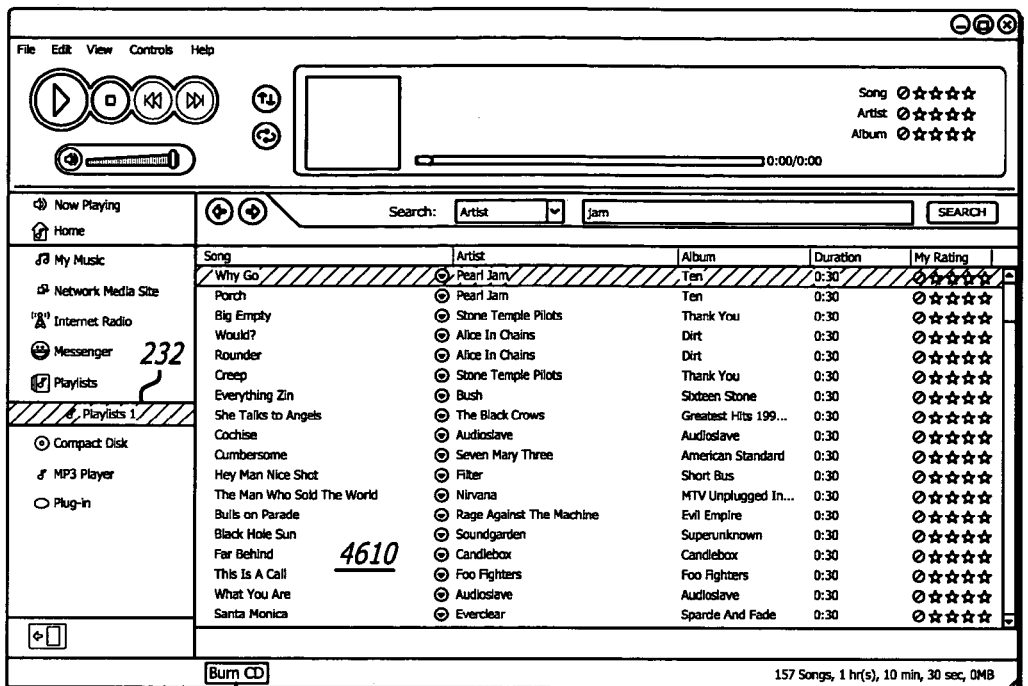
FIG. 46 is an additional exemplary user interface used in creating a playlist with an exemplary media engine according to one embodiment of the present invention.

The creation of an affinity playlist from a user's perspective will now be shown with reference to FIGS. 46 and 38. As was discussed above with reference to FIG. 38, users have the ability to create a playlist based on music that is similar to an artist by, for example, choosing the "create a playlist of similar artist" button 3815. When a user chooses to create a similar artist playlist, the media engine 106 queries the media server 118 for the results of the playlist for the particular artist and that playlist is then displayed for the user 102 in pane 4610 as can be seen in FIG. 46. As can be seen in FIG. 46 a new playlist called for example "Like Pearl Jam" is added to the User's 102 playlist list 232 in pane 201 which can then be accessed by the user at any time. It should be noted that in alternative embodiments, the media server 118 may recreate a Playlist that matches the chosen affinity each time the affinity Playlist is requested. Once the Playlist has been created, a User 102 can preferably also burn that Playlist to a CD or move it to other removable media device by clicking on the "Burn CD" button between 4601. This will cause actual media files to be stored on an external device or burned onto a portable media like a CD, or other storage medium now known or to become known.

The issue of whether users have appropriate rights to experience certain media can also be addressed by the media engine. Media engine 106 preferably contains digital rights management functionality to ensure that various copyright rights and media rights of owner's licenses are respected. Thus, while there are described herein embodiments that facilitate users sharing their media experiences, adequate controls can be incorporated into the system to frustrate unauthorized use of media. For example, media engine 106 can incorporate software and/or hardware to recognize digital rights management information that may be part of the media file and/or media metadata, and respond to user's requests accordingly by granting or denying access to the media based on that user's rights. For example, as was described above, access to the songs in the media database 120 can be based on a tiered membership based on differing subscription fees. Certain users therefore will be allowed access to certain media that other users are not allowed access to. That being the case, the possibility exists that one user will forward to another user songs that the other user is not authorized to access. In such a situation, according to one embodiment of the present invention the second user would be alerted to this fact and be offered the ability to sign up to the appropriate subscription service or to purchase rights in the desired item of media.

In another embodiment, access, viewing capabilities, and sharing rights between users preferably depend on certain conditions being recognized by the media management systems of media server 118. In one example, access, viewing, and sharing capabilities are based upon the system first recognizing the metadata associated with the media file and whether the particular media file is available through the media management system's services (e.g. subscription or not). If the system recognizes the metadata associated with the media file and the media file is within the system's services (e.g. available on media database 120 or other authorized service 130), or within the user(s)' subscription, the media file may be shared, viewed, and accessed among users. However, if the system does not recognize the metadata of a media file and/or the media file is outside of the system's authorized offerings, the receiving user will not be able to access or view the particular media file. It is noted that these conditions are merely exemplary and the system can base access and sharing rights on other conditions such as whether the users are within a subscription plan or other DRM parameter.

In an alternate embodiment similar playlists can also be created for songs and/or artists in a similar manner. Namely as can been seen in FIG. 47 if a user selects the "create a similar playlist of songs" button 4715 from a song page 4700, the media engine 106 will query the media server 118 for songs with a high affinity to the song selected and will display such a playlist for the user as can be seen in FIG. 48. Once again similar to what was discussed above with reference to FIG. 46 the user can elect to burn the created playlist to a CD by selecting "Burn CD" button 4802 or play the playlist from within their "my music" interface by choosing the "like Yellow" playlist from their playlist list 232. Alternatively from song page 4700, a user can play the song by clicking on "Play Song" button 4705, add the song to his or her "my music" collection by clicking on "In My Music" button 4710, purchase the song by clicking on the "Buy Song" button 4720, send the song to another user by clicking on the "Send to a Friend" button 4725 or rate the song by clicking on the rating tool 4730.

As was discussed above with reference to FIG. 45, an exemplary affinity engine is employed to develop identified and stored affinities between songs, artists or albums or other media-related information or metadata for use by the system. In one embodiment, affinities are used to create playlists as described above, but may also be used to present new media options to a user, or to effect what may be presented by other services or network 300, e.g. radio stations, commerce sites and the like. By way of non-limiting example, a formula preferably used by the affinity engine for the calculation of an artist affinity is described below, wherein:

A=the number of users who like artist A;
B=the number of users who like artist B; and
AB=the number of users who like artist A and artist B.

The affinity of artist A to artist B would equal $(AB/A) \times 100$, while the affinity of artist B to artist A equals $(AB/B) \times 100$. Through such a formula the system is able to compute the affinity or relationship between two artists. Although this formula is discussed in terms of artists, a similar formula can be used in terms of album and/or song or other item of media. Preferably, media rating data is sent to and compiled within media server 118 so the system can use that rating data and create a relationship between different media, artists, and/or albums. Once this data is compiled using the formula above, an affinity is determined between two different artists, albums, and/or songs. Once this affinity is established and stored, a playlist can be created based on that affinity. Depending on whether the user wants to create a highly similar or divergent playlist, songs or other media items can be compiled with a degree of variance based on the degree of their affinity to each other. In addition to the exemplary techniques set forth herein, other art-recognized affinity determining applications or techniques can be used or developed to identify affinities.

In an embodiment of the present invention, an additional factor is preferably taken into account to create the affinity playlist. This factor is the total number (N) of users 102 that are using the system. This variable factors into account cases where the affinity between one artist and another artist may be skewed by artists that are very popular versus artists that are not popular at all. For example using the above listed formula, an artist that is popular with 95% of the users may have an affinity to many more artists than an artist who is popular with only 5% of the users. The artist that is popular with 95% of the users will therefore appear to have a high affinity to nearly every other artist because an artist that has a great popularity is invariably going to have an overlap with another artist that was rated highly by many of the users of the system. Therefore, in order to balance out this equation, instead of using the equation, $(AB/A) \times 100$, the formula for determining an affinity from artist A to artist B, taking into account the popularity of an artist is $(AB/A) \div (B/N)$ and the formula for determining the affinity between artist B and artist A factoring in the popularity of an artist is $(AB/B) \div (A/N)$. This formula divides the relationship of artist A to B by the number of total users that like artist A. This lowers the affinity to an artist that is very popular while it raises the affinity to an artist that is very unpopular. In other words, an artist that is very popular will have to have a lot of users who like that artist and another artist to have a strong affinity to that artist, while an unpopular artist will need to have fewer users in common to have the same affinity. Therefore, using the above mentioned exemplary formulas, the system is capable of determining an affinity between one artist, album or song and another artist, album or song based on the likes and dislikes of other users. Based on affinity calculations and criteria selected by a user, a playlist can be created that will comprise artists, albums or songs that are most or least similar to a particular artist, album or song thereby enhancing a user's experience.

It should also be noted that affinity data can also be used to automatically generate a list of similar albums, artists or songs for a particular user. Thus, even without the creation of a playlist, in one embodiment, a user can request a list of albums similar to a particular album and based on the previously mentioned affinities data, a list of similar albums can be complied. Alternatively, the media engine 106 can also automatically recommend similar albums to a user based on this affinity data. For example, every time a user opens the media engine 106, the interface can display a list of recommended albums based on the albums' affinity to albums rated highly by the user. Thus in addition to tracking the media available to a user, the media engine 106, alone or in cooperation or combination with media server 118, is also able to intelligently recommend other media to the user based on other music that the media engine knows the user prefers.

In another embodiment, the media engine is able to manage a playlist in such a manner that the playlist is not merely played back to the user in a particular pre-assigned order or random order. Rather, the media engine and/or media server 118 is able to generate an order for the songs in the playlist that better reflects the user's likes and dislikes. Once again referring to FIG. 48, a user interface that incorporates functionality that provides a user the ability, in playing a playlist, to utilize a randomize feature that is based on data acquired by the media engine 106. In order to access such a randomized playing of the media located in the playlist, the user would preferably select smart shuffle button 4805. When selecting smart shuffle button 4805, the playlist will begin to play the songs in the playlist in an order that is not completely randomly selected, but rather the order of the playlist is based in part on data that the media engine 106 and/or media server 118 has acquired about the user. In other words as will be discussed in more detail below, the system will consider various factors such as user ratings and/or other factors such as frequency of play, time the song was last played, whether or not the song has been burned by the user or recommended to friend, what other artists are in the playlist, or other factors. The smart shuffle feature factors in the system's knowledge of the users' listening preferences to create a more enhanced user experience. This is yet another use of the user data garnered by media engine 106 and/or media server 118, which is supplemented as the user continues to use the system in order to create a more enhanced and personalized listening experience for the user.

Figure 49:
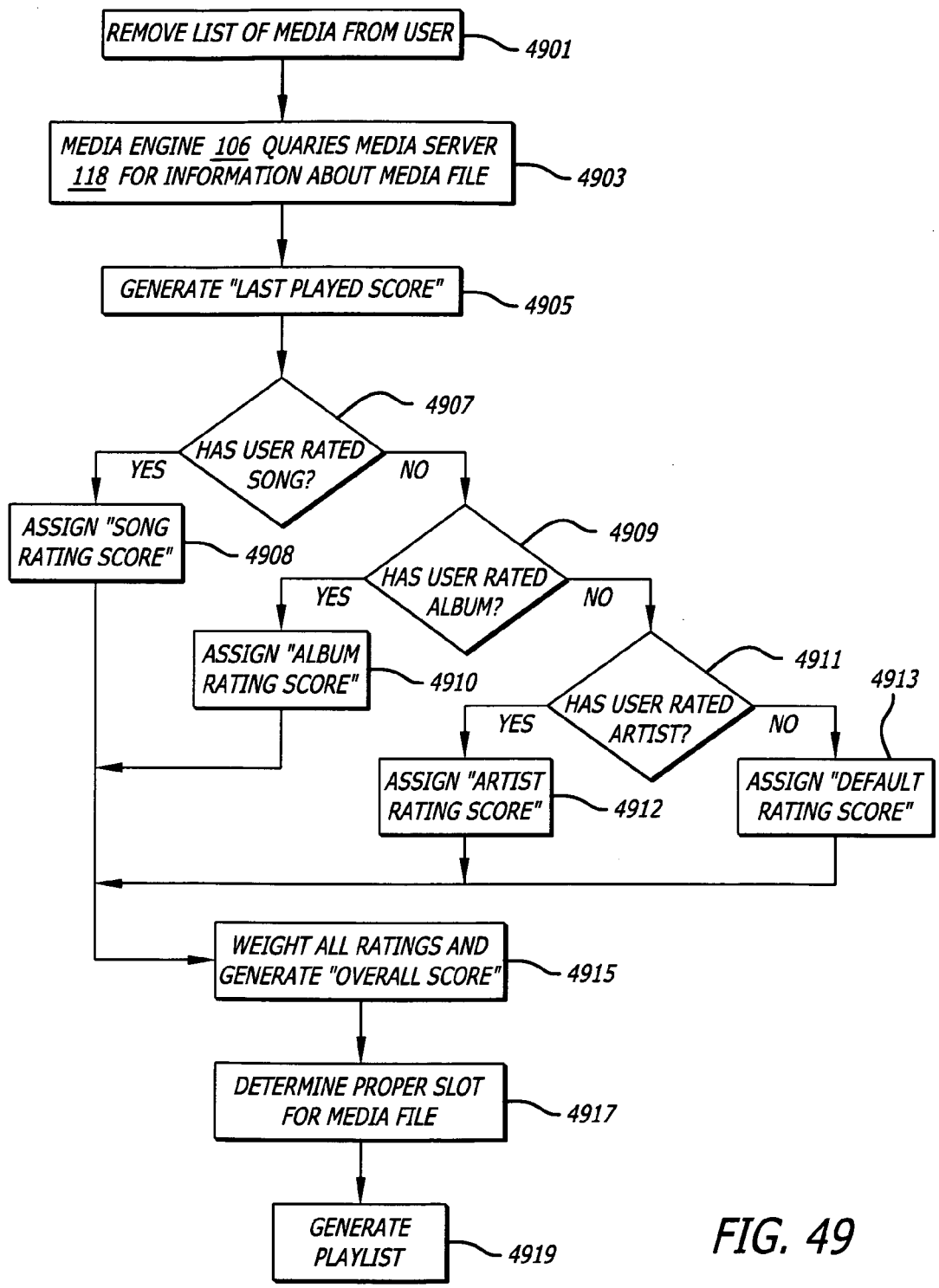
FIG. 49 is a flowchart depicting a process of generating a playlist according to one embodiment of the present invention.

As can be seen with reference to FIG. 49, according to one embodiment of the present invention, a process is carried out to create a playlist whose order is based on various user preferences so as to create a playlist whose order is more pleasing to user 102. In this exemplary embodiment, a list of media files to be included in the playlist is selected by the user 102. Step 4901. It should be noted that although discussed in terms of a user selecting which media files are placed into the playlist, a playlist can also be created using any or all media files located anywhere throughout the network 300. Also, functionality and processing may take place in various locations on the network, not only as described. This processing and data storage can be distributed across network components and not confined to a single element on network 300. Once the list of songs for the playlist is generated, media engine 106 queries media server 118 for information about each particular media file to be sorted into the playlist. Step 4903. This information includes any rating information that is available for user 102 for this particular media file as well as information about when the media file was last played. Once the media engine 106 receives this information from the media server 118, a score is generated for each particular media file based on when the media file was last played by the user 102. Step 4905. This "last played score" according to one embodiment is generated on a 1-100 scale with 100 being the most recently played media file from the list of media files being included in the playlist and 1 being the least recently played song and all of the other songs containing a value between 1 and 100 based on their linear relation to most and least recently played songs. Once a "last played score" is assigned for each media file or song, the media engine 106 looks to the rating data available for the particular song to see if the user 102 has rated this song. Step 4907. If the user has rated the song, a "song rating score" is assigned to the media file based for example on a 1-100 rating scale, with 100 being the highest rating and 1 being the lowest rating. Step 4908. If the song has not been rated by the user, the media engine then looks to the rating information to determine if the album that the song is associated with has been rated by the user. Step 4909. If the album has been rated by the user 102, an "album rating score" is assigned to a media file based on the user's rating of the album associated with the song. Step 4910. Once again, in one embodiment the score is based on a 1-100 scale with 100 being the most highly rated album and 1 being the lowest rated album. If the album has not been rated by the user, the media engine 106 then reviews the rating information to see if the artist associated with the album has been rated by the user. Step 4911. If the artist has been rated by the user, an "artist rating score" is generated by the media engine 106 based on the rating given by the user 102. Step 4912. Once again, this score according to one embodiment is preferably generated based on a 1-100 scale with 100 being the most highly rated artist and 1 being the lowest rated artist. If the artist associated with this song also has not been rated, a "default rating score" will be associated with the media file. Step 4913. In one embodiment, this rating score would be a score of 50. Once all the various scores have been assigned to the particular media file or song, the scores are preferably weighted so as to give the proper significance to each of the scores. In one embodiment, this rating is accomplished by multiplying the "played recently rating" by 0.17, and if available, the "song rating score" by 0.83, the "album rating score" by 0.80, the "artist rating score" and the "default rating score" by 0.77. Step 4915. Once all the scores are computed and weighted, which computation may occur on user processor 103 as part of media engine 106, or at media server 118, or elsewhere on network 300, the weighted scores are added to each other and compiled to create one "overall score" for each media file in the list of files to be included in the playlist. Once an "overall score" is computed for each of the media files, a formula is run for each individual file to ascertain the proper slot in the playlist for that media file. Step 4917. According to one exemplary embodiment, the formula that is used to select the slot for the media file is:

$$i = [N^*(R/N)^p]^{0.94};$$

N=the # of items in the list

R=a random integer in the range [0, N]

p=a constant value used to increase the weighting on higher scoring items i=the chosen slot to insert the media file into.

Once the slot is determined for each particular media file, a playlist is generated based on those results. Step 4919.

According to another embodiment of the present invention, an additional factor that is utilized by the media engine 106 in connection with generating a playlist is artist separation. This factor allows media engine 106 to create a playlist that ensures that whenever possible, songs from a particular artist are not repeated within a playlist or at least not repeated too closely in time. It should be appreciated that although this embodiment is being discussed in terms of artist separation, a similar embodiment is also envisioned where playlists are separated by song or album separation and/or genre separation or any other factor associated with a song or media file. In order to create the artist separation, a list is tabulated by the media engine or media server that totals the number of songs for each particular artist from within songs chosen for a playlist. Once this task is completed, a minimum separation number can also be generated for each song based on the information garnered from this tabulated list. In order to create a minimum separation number, the following formula is used:

total number of songs/number of songs by the particular artist.

Thus, for each artist associated with a song in this list of media files to be included in the playlist, a minimum separation number will be generated. For example, if there are a total of 50 songs chosen by a user to be placed into a playlist, and a particular artist X is associated with 10 of those songs, the minimum separation number for artist X would be 50 divided by 10 or 5. When the playlist is generated, the media engine 106 keeps track of the last slot occupied by media file for each particular artist, the minimum separation number is then added to that slot number and no song by that particular artist will then be placed in any slot number higher than the slot number+the separation number. For example, if a song by artist X is chosen to be placed in slot number 3 in the playlist after the formula is run on that particular media file, and the minimum separation number for that particular artist is 5, when generating a playlist with artist separation, no songs by artist A will be allowed to be placed in slots 4, 5, 6, or 7, and the media engine will attempt to place that song in slot 8 or later. If a slot is chosen for a particular song that is not available, the media file will be placed in the next available slot. In one embodiment, if the end of the playlist is reached by going through this process of slot filling, the process will begin once again from the first slot in the playlist. It should be noted that any or all of the above discussed preferences can be either set by the media engine 106 or be chosen by each individual user for each individual playlist.

In another embodiment of the present invention, a playlist may be generated automatically based on particular criteria. In this embodiment, the system is able to create a playlist based on specific user criteria. For example, the user is able to choose different criteria such as artist, album, genre, date that the song was added to the system, last time the song was played for this particular user, rating, or other criteria, from a drop-down menu. Based on the chosen criteria, a list of modifiers is given to the user that is appropriate for those particular criteria. For example, if the criteria chosen were "date added", the modifier list would for example included "is", "is after", "is before", "on or before", "on or after", "is not". All of these choices being applicable to a specific date entered by the user. On the other hand if the criteria chosen by the user were genre, then this modifier list would include choices, such as "is" or "is not," these choices being applicable to the criteria of genre. After the modifier is chosen, the user is prompted to insert a term that would be applicable to the playlist wanted. For example, if a user chose "genre" as their criteria, "is not" as their modifier" and the word "disco" as the term, the system would automatically generate a playlist of songs in which the genre was not disco. Once again these playlists can then be accessible from any location where the user is running the media engine 106.

In one embodiment of the present invention, there are additional choices that may be given to a user in creating the playlist. For example, a user may be given a choice to select whether they wish to incorporate multiple conditions for their playlist or whether they would prefer a playlist that only meets a certain number of the conditions. Additionally, the user can select how long the playlist should be and whether or not to limit the playlist to a certain number of songs. Thus, if the conditions of a playlist return 1,000 songs for example and the user only wishes to have a playlist that is a length of 25 songs, the user would alleviate this problem by choosing to limit the playlist to 25 songs. The 25 songs that would be used for the playlist can either be chose at random by the media engine or can once again be selected using user selected criteria. For example, a user may further narrow the playlist by selecting that the 25 song playlist should be the 25 most highly rated songs or the 25 most recently listened to songs. Thus, the media engine can return a playlist with numerous different tiers of criteria. This eliminates the creation of a playlist that is larger than the one envisioned by the user or larger than a particular size that the user's storage medium can hold. Thus, in the previously discussed example a user would have created a 25 song playlist of the most popular or most recent songs matching the user's criteria.

Additional criteria that may be set by the user include whether the user would like the system to continuously update the playlist based on the criteria. A playlist created using this option can periodically change based on the media that is added to the system. So for example, if a playlist was created that encompassed all media where the genre was "not disco," the composition of the playlist would change every time an additional piece of media, which was not disco, was added to the system. Thus, if a user chooses the live updating feature, the media engine may run the search criteria at fixed or variable times, or every time that the playlist is requested, in order to incorporate any new media that may have been added to the system since the last time the search was run. Thus, the user can have the ability to listen to a playlist of songs that match the conditions and criteria selected but the playlist may not necessarily consist of the same songs each time the playlist is requested. In other words, each time the playlist is selected or requested, the media engine creates the updated playlist based on the previous criteria assigned to the playlist.

An example of a user interface used in connection with the function of creation of the criteria of playlists discussed in the previous embodiment is shown in FIG. 73. For example, from this interface the user is able to select a criteria from the drop-down list 7301, a modifier term from drop-down list 7302 and insert a value into field 7303. Once all the conditions are set the user can either click to generate a playlist button 7310 and/or save criteria as button 7312. When clicked upon, the media engine 106 alone or in tandem with media server 118, or media server 118 itself, generates a playlist such as, for example, in the form shown in user interface portion 7315. However, if the user does not wish to generate a playlist for immediate viewing, he or she may click on the "save criteria as" button 7312 that will save the conditions selected and allow the user to easily create a playlist matching those chosen conditions at a later point in time. Once the playlist is created, the user preferably has various options as to what to do with that playlist by clicking on the buttons located below interface 7315. In this embodiment, the user can either play the playlist by clicking on the play button 7316, or download the playlist to their local device by clicking on the download button 7318. In addition, the user may add a song to, or entire playlist to, another playlist by clicking on the "add to" button 7317 or obtain more detailed information about the playlist or a particular song by clicking on the information button 7319. The user may also choose save the playlist by clicking on the "save list as" button 7320. In one embodiment, if the user elects to save the playlist, the playlist will be saved in the form that it was generated. In other words, the particular songs that were chosen by the system to match the conditions set by the user will always reside in that playlist. The file that is saved preferably only contains pointers to the location of each of the individual songs in the playlist. In contrast, however, if the user elects to only save the criteria of the playlist, by clicking on the save criteria as button 7312, only the particular criteria for generating the playlist may be saved to a file on the user's processor and thus the next time this playlist is run, the media engine will generate a playlist that may generate a different list of songs that also match the criteria selected by the user. Of course if the user elects to save the playlist on a portable device or storage medium, the actual media files may be stored.

The ability to create a criteria playlist allows the user to generate a playlist based on specific criteria and then save that playlist for later listening. Alternatively, the user can send the criteria playlist to another user via e-mail, instant messaging, peer networking, or any other communication channel known or to become known. For example, if the user creates a criteria playlist that includes the criteria, for example, of songs that were uploaded after Sep. 1, 2004 with specific criteria, one user can send the criteria to another user. The other user can use the same criteria to create his or her own playlist based on the media available to that other user. For example, if user A runs the playlist on his or her "my music" collection the playlist may return songs A, B and C, user 2 might run the same playlist criteria and be returned songs D, E and F. On the other hand, a user also has the ability to save the playlist as it was generated, namely with the same songs and or media that was generated when the user initially generated the playlist. Therefore, when communicating such a playlist, the other user will receive a file containing pointers to the location of those specific songs in network 300.

Figure 74:
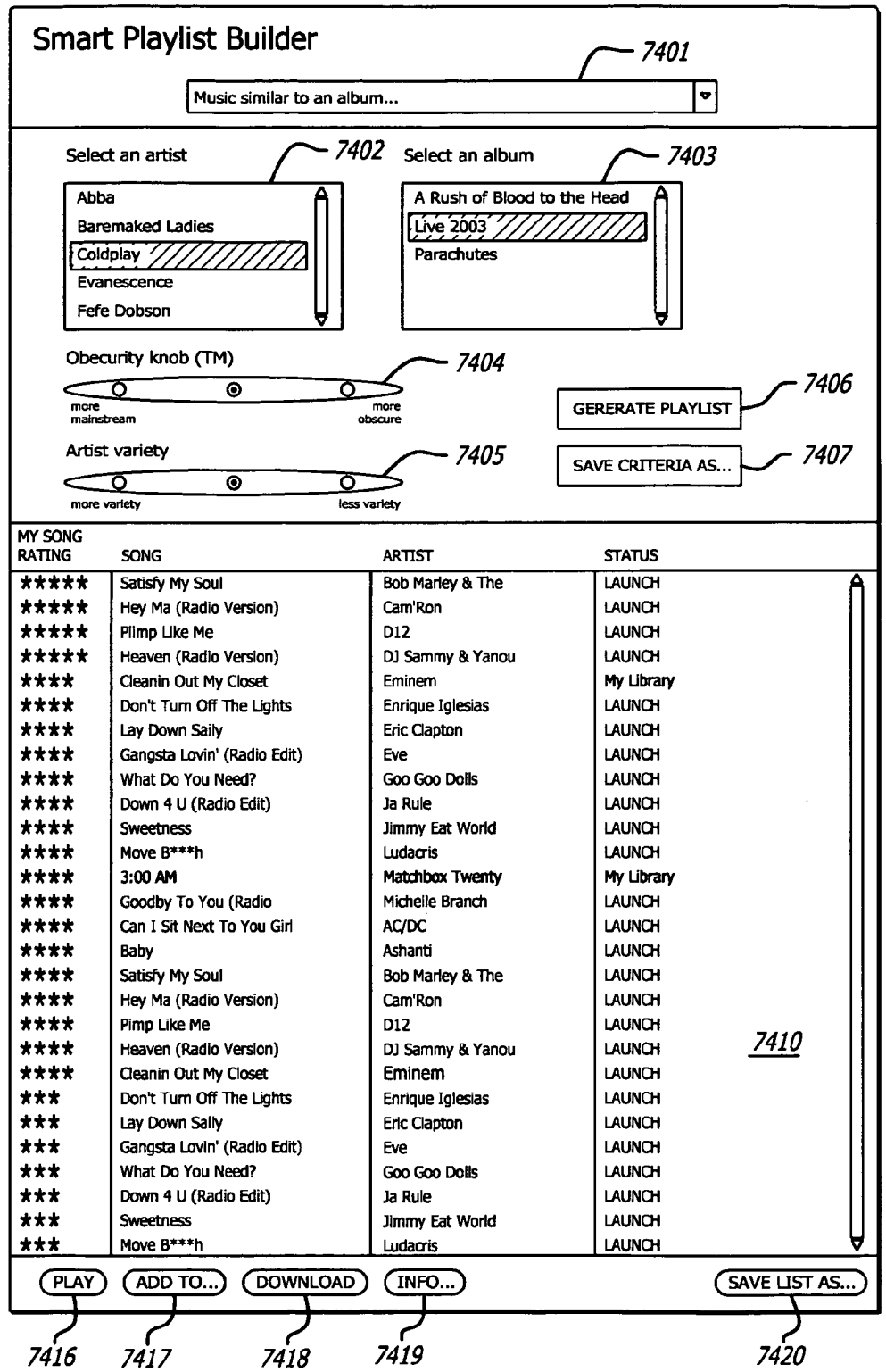
FIG. 74 is an exemplary user interface used in creating a playlist with an exemplary media engine according to one embodiment of the present invention.

The creation of an exemplary affinity playlist according to another embodiment of the present invention will now be discussed with reference to FIGS. 74 and 75. Looking to FIG. 74, users have the ability to create a playlist based on music that is similar to or not similar to an album or artist by, for example, choosing the criteria from a drop-down menu 7401. Once the user has chosen whether they wish music similar to a particular album and/or not similar to a particular album, similar to a particular artist and/or not similar to a particular artist, the user may choose an artist and/or album from artist drop-down list 7402 or album drop-down list 7403. Also, a degree of similarity may be chosen, e.g. "not too similar," "very similar," etc. The system would then adjust the algorithms utilized to find similarity between two or more items by applying more or less stringent similarity factors, as per a user's choice.

Additionally, a user is preferably given the option to choose a level of obscurity by selecting the level of obscurity on obscurity knob 7404. The obscurity of a particular song/artist or album is a measure of the degree of affinity an item has with other items in a chosen category. Obscurity is preferably determined by the collective rating or listening patterns of that song/artist/album among other users on the network, and/or through system operator input. For example, if the user wishes to create a playlist with very obscure songs, the media engine 106 will query media server 118 to find songs that have not been rated by x number of users in the last y number of days. Thus the resulting playlist will consist of songs that are obscure relative to other songs located on the network, meaning other users have not rated or listened to the song often.

After choosing the obscurity, the user is preferably also given the option to select whether they wish the playlist to be generated with a wide variety of artists and/or albums or whether the songs should mostly be from the same artist and/or album. Once the user has selected the criteria, similar to the playlists discussed previously, the user may have the option to either generate a playlist by clicking on the generate playlist button 7406 or save the criteria as a file by clicking on the "save criteria as" button 7407. Media engine 106 preferably forwards criteria to media server 118. Once the playlist is generated, the results of the playlist may be displayed in interface 7410. Additionally, similar to the previously discussed playlists, a user may be able to either play the playlist by clicking on the play button 7416, download the playlist by clicking on button 7418, add the playlist to another playlist by clicking on button 7417 or get additional information about the playlist or any song in the playlist by clicking on information button 7419. The user can save the playlist as a file by clicking on "save list as" button 7420.

Figure 75:
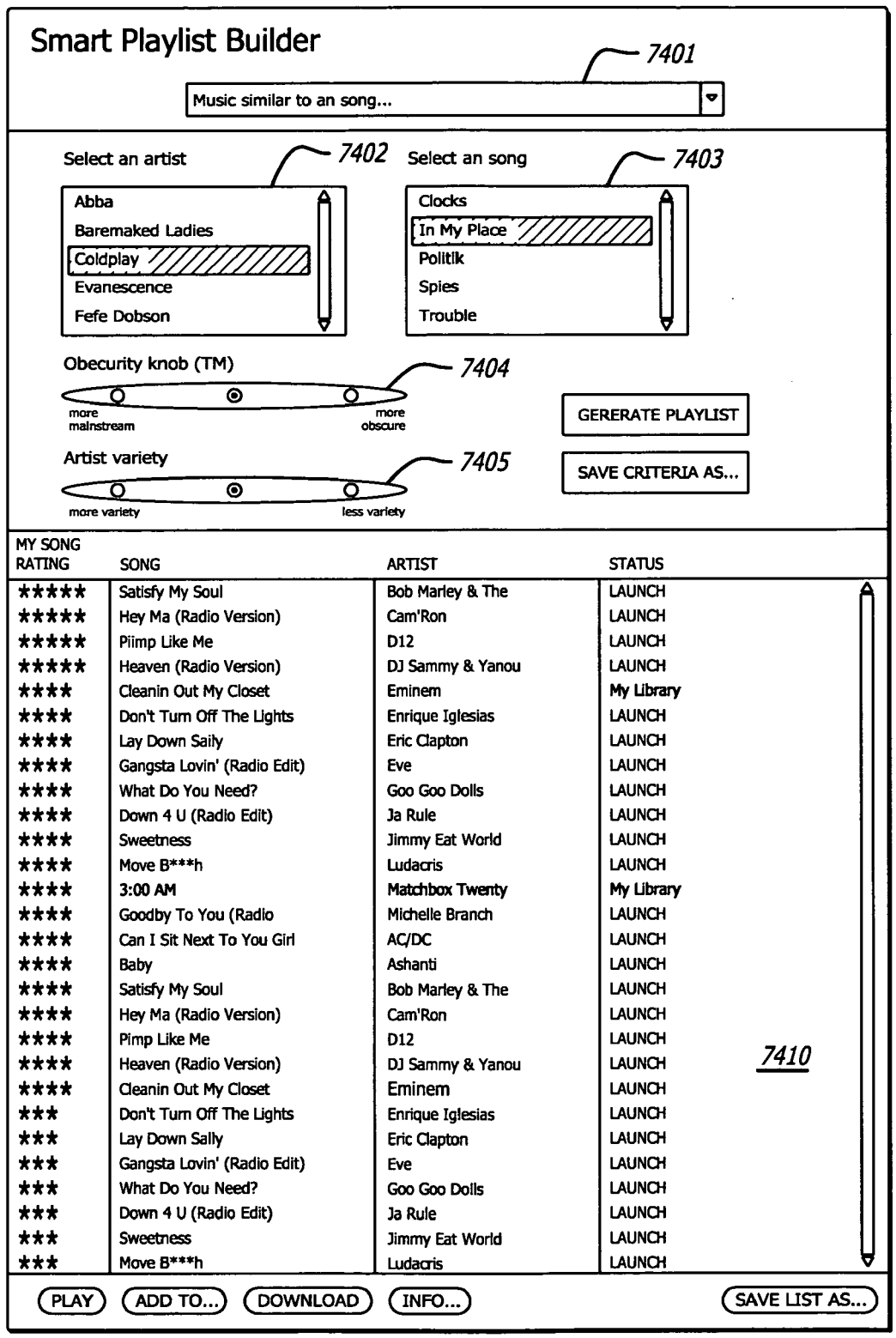
FIG. 75 is an additional exemplary user interface used in creating a playlist with an exemplary media engine according to one embodiment of the present invention.

In another embodiment, as can be seen in FIG. 75, a playlist can be generated based on similarity to an artist and/or a particular song. Similar to the previously discussed embodiment, the user will choose criteria as to whether they wish music that is similar or not similar to a particular song by selecting criteria from drop-down list 7401, the only difference being that in this embodiment, the user would choose a song from drop-down menu 7403 instead of an album. Similar other options like artist, genre or rating can also be utilized.

Figure 76:
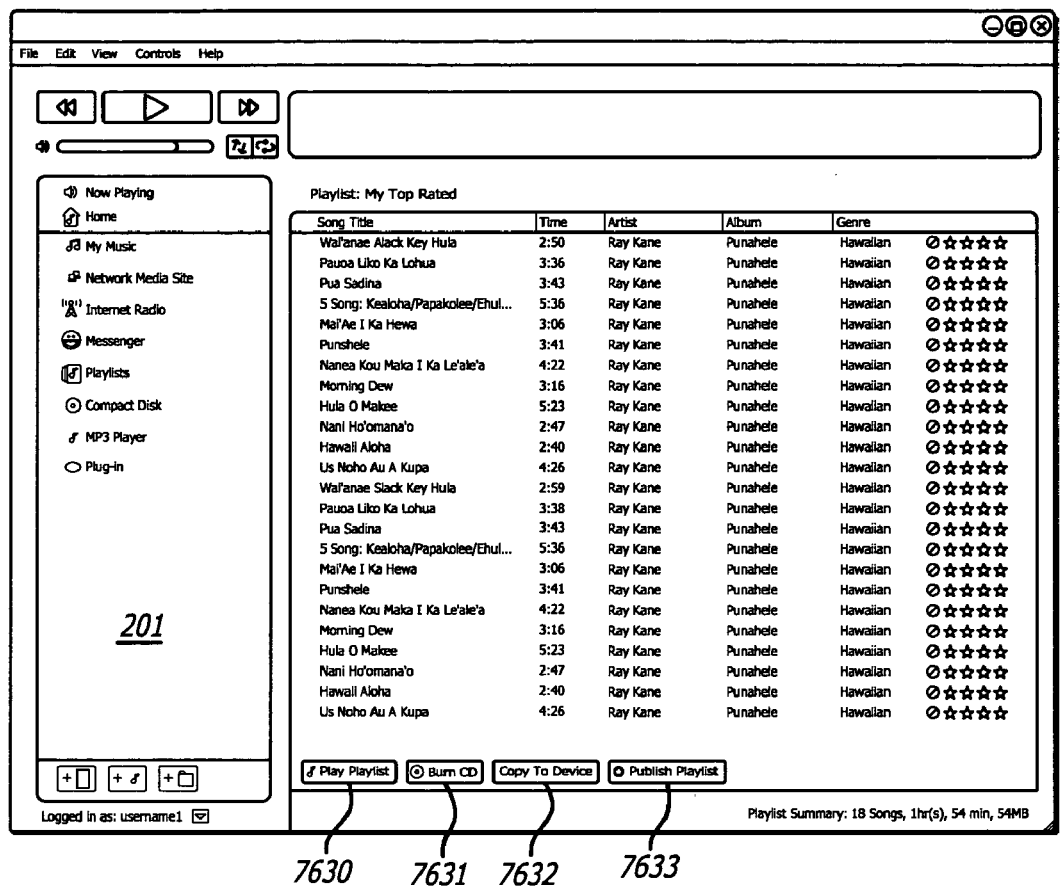
FIG. 76 is an exemplary user interface used in creating a playlist with an exemplary media engine according to one embodiment of the present invention.

In one embodiment of the present invention as is shown in FIG. 76, once a playlist is created, the user has various different options as to what to do with the created playlist. For example a user can either play the playlist as in previous embodiments by clicking on the play playlist button 7630, or alternatively, the user may burn the playlist onto a CD that is located in device 114 by clicking on the "burn a CD" button 7631. In one embodiment, when a user clicks on the burn a CD button 7631, or save it to a portable media player or other storage media. He or she is prompted to insert a blank CD into device 114 so that the playlist can be burned onto the CD. If the playlist is too long and/or too large for the CD, the user is alerted to this fact and is offered the option of either changing the media type or selecting which songs from the playlist the user wishes to burn onto the CD. Alternatively, the user can choose to copy the playlist to a portable media storage device, such as by way of non-limiting example an MP3 player or the like, so as to make a playlist portable. In such embodiments, the playlist will not contain merely pointers but will comprise the actual media file and optionally associated metadata.

Additionally, a user may choose to publish their playlist to other users of the system by, for example, clicking on the publish playlist button 7633. By electing to publish the playlist, a user will be prompted to enter a name for the playlist. The playlist will be saved on processor 103 and/or at media server 118 or other location on the network 300. The user is preferably given the option of making the published playlist public, thus allowing other users to not only view the playlist but to listen to media listed in the playlist as well. The ability to publish a playlist has the added benefit of making the playlist completely portable by being available to all users, as it will be residing on the media server 118 or other user accessible location(s) on the network.

Figure 77:
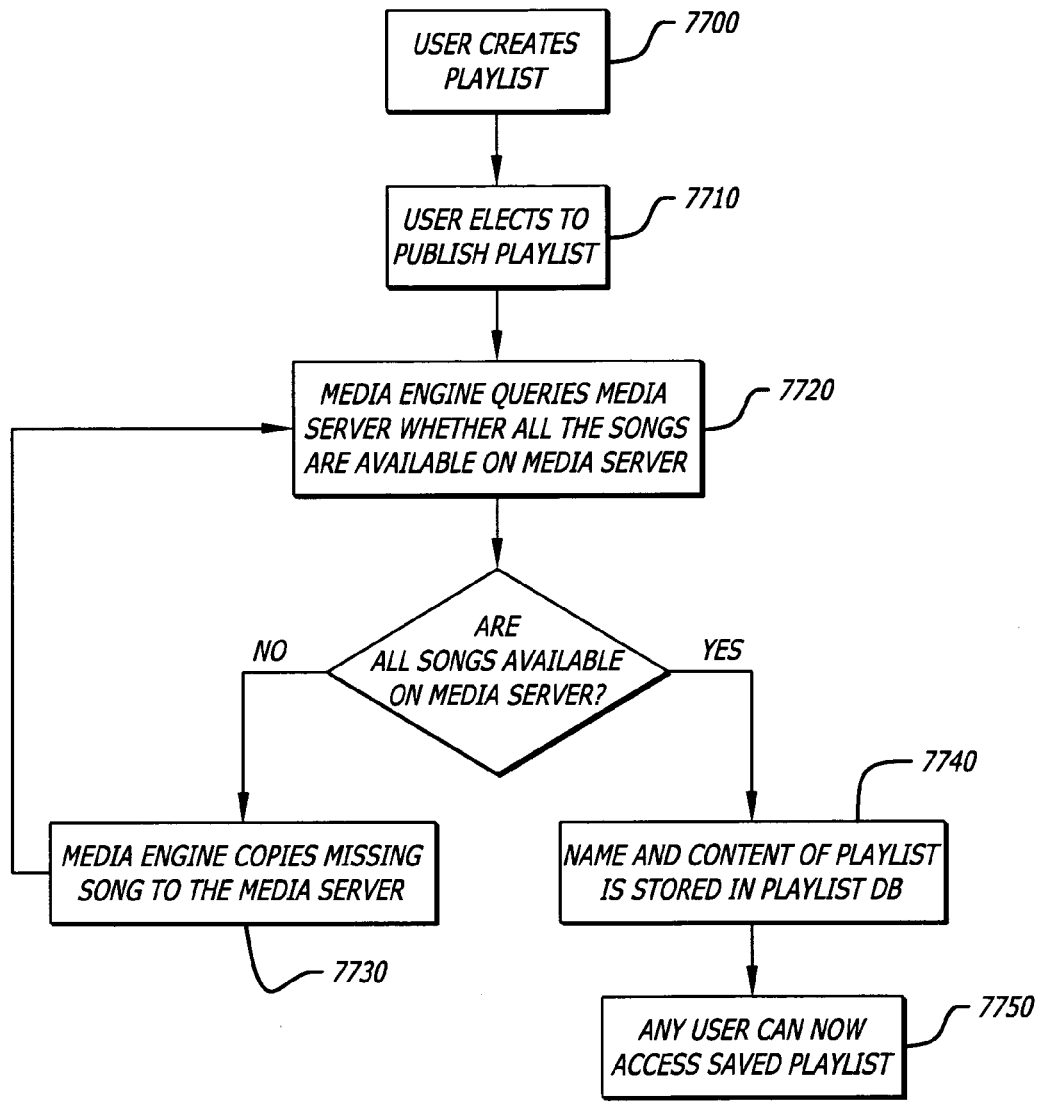
FIG. 77 is a flowchart depicting the publishing of a playlist according to one embodiment of the present invention.

The publishing of a playlist according to one embodiment of the present invention will now be discussed with reference to FIG. 77. First the user creates the playlist. Step 7700. This playlist can be created in any number of different ways (i.e., criteria playlists; affinity playlists) as was discussed above. Once the playlist is created, the user can elect to publish the playlist. Step 7710. If the user chooses to publish the playlist, the media engine 106 will query media server 118 to determine whether media database 120 has available to it all the songs in the playlist. Step 7720. If there are songs in the playlist that are not in the media database 120, the media engine 106 will copy those songs to media database 120. Step 7730. Once the media database 120 has all of the songs in the playlist, the name and content of the playlist is saved in the playlist database 120. Step 7740. Thus, if another user requests that playlist, for example through the search functions described elsewhere herein or through the "friends" functionality also described elsewhere herein, the playlist can be served to that user. Step 7750. The published playlist can contain pointers that identify the network location(s) at which the media file resides or may be accessed (a pointer may comprise a URL or URI), metadata or actual media files, although preferably the playlist contains pointers to avoid the need to store multiple copies of the same media file on the network. Thus, a playlist can be made available to a user by publishing the playlist via the network.

Figure 50:
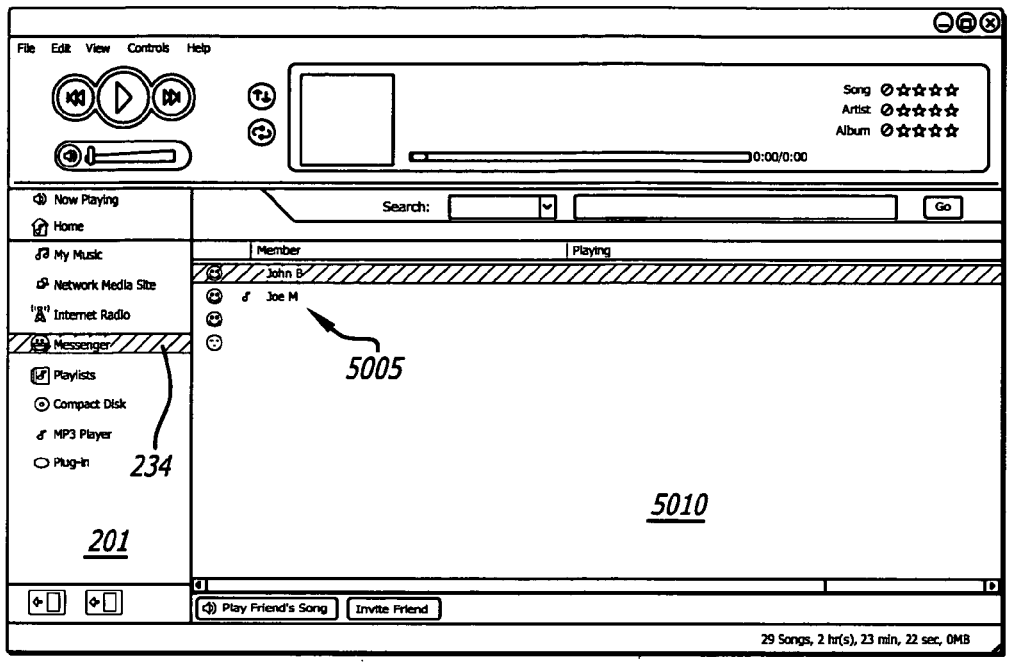
FIG. 50 is another exemplary user interface of an exemplary media engine according to one embodiment of the present invention.

According to another embodiment in the present invention, as is depicted in FIG. 50, a user is able to utilize the media engine 106 to identify and communicate with other users that are connected to the system via an instant messaging program. As was discussed above, each user preferably has a messaging program 108 on their processor 103 through which they can communicate with other users utilizing the messaging platform. The messaging program 108 may be presented as a stand-alone feature for just messaging and/or be integrated into the media engine 106 functionality when expanded media-related functions are desired. Core messaging functionality can be utilized by multiple applications on processor 103, depending on user requirements. Within the messaging program, information is preferably stored about the user's messaging preferences. This information can include, for example, a list of "friends" or other users with which that user is acquainted in some way. This list is compiled by each individual user and can include co-workers, family or classmates, for example. From within the messenger client, this list of "friends" allows a user to easily interact with other users that he or she wishes to interact with on a regular basis. According to one embodiment of the present invention, media engine 106 may utilize this information from the messaging program 108 to improve a user's media listening experience. For example, the media engine 106 can use the "friends" information from the messaging program to share media information and experiences among users. As was noted above, media engine 106 preferably compiles and stores information about each user's particular available media files. In this embodiment the media engine utilizes the messaging program to allow each user to view and/or access media available to their friends.

Figure 51:
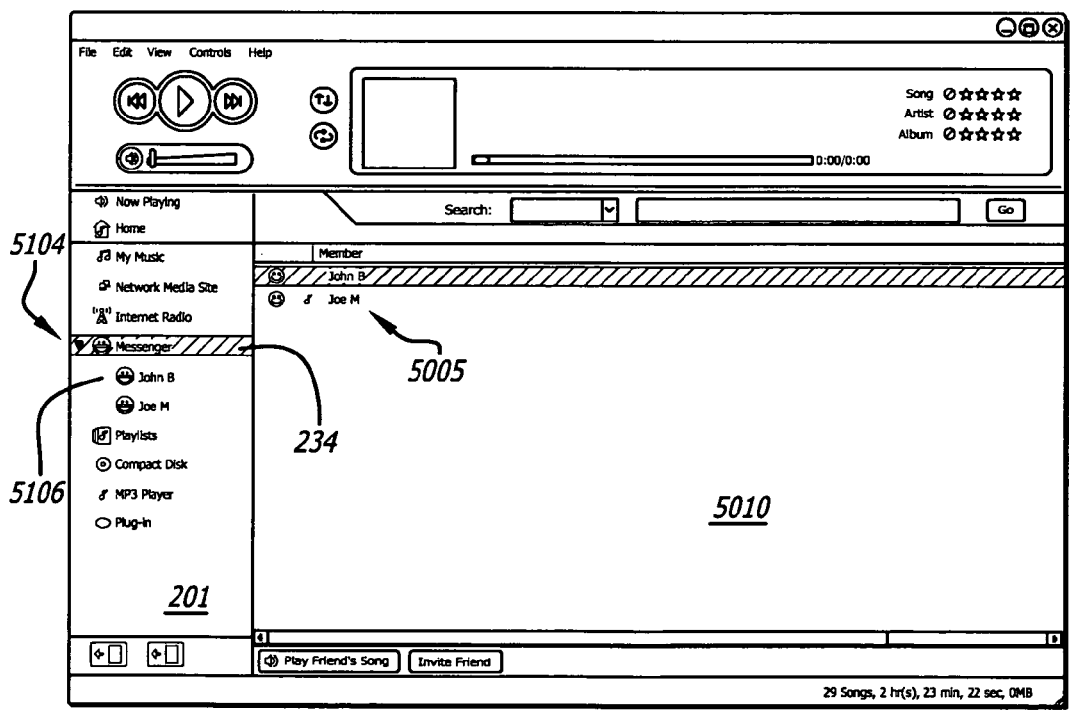
FIG. 51 is another exemplary user interface of an exemplary media engine according to another embodiment of the present invention.

One exemplary user interface in connection with this functionality is depicted in FIG. 50. As can be seen in FIG. 50, if a user accesses the messenger button 234 from pane 201, a list of the user's "friends" 5005 are displayed in pane 5010. As can be seen in FIG. 51, in one embodiment, the user may also see a drop-down list of its "friends" 5106 in pane 201 by clicking on the arrow 5104 next to messenger button 234.

Figure 52:
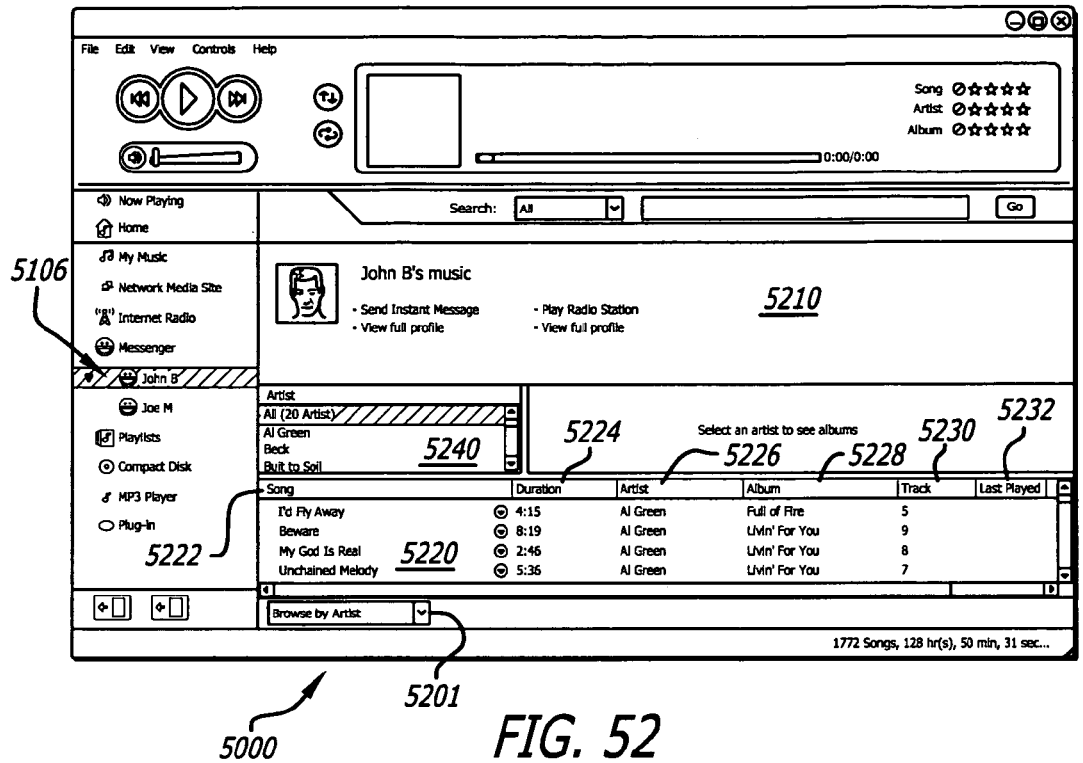
FIG. 52 is another exemplary user interface of an exemplary media engine according to another embodiment of the present invention.

Through the user interfaces discussed in FIGS. 50-54, the user will be able to display media files that one of his or her "friends" have in their "my music" collection. Media engine 106 can generate a user interface that displays information about the media of another user who is both running a media engine 106 as well as a messaging program 108. Similar to a user's "my music" collection, a user will also have the ability, preferably with proper rights management permissions, to explore and listen to any of its "friend's" music as well as playlists and/or other preferences of the particular "friend". For example, as is depicted in FIG. 52, if a user highlights a particular friend from list 5106 (e.g., JohnB), pane 5220 will populate a list with all songs in JohnB's "my music" collection. Similar to the embodiments discussed above in relation to a user's "my music" collection interface, a list of all songs in JohnB's "my music" collection will be listed in the right, bottom-most pane 5220. This list is sorted in columns representing information about each respective song, including, for example, song title 5222, duration 5224, artist 5226, album 5228, track 5230, and the last time this particular song was played 5232. It should be noted that these columns are only exemplary and columns including other information about a particular song, such as genre or the ability to rate a particular song with a rating tool as was discussed above in reference to FIG. 2, can also be included in the listing in pane 5220. Additionally, a full listing of all of the artists' songs in JohnB's "my music" collection will preferably be displayed in pane 5240. In addition to information about media files located in a "friend's" "my music" collection, a user may also access additional information about the "friend" from within interface 5000. Information from user to user is preferably passed through messaging program 108, but may be passed in any data transfer methodology now known or to become known. For example, a user may access profile information about his or her "friend," that can indicate, for instance, hobbies and/or likes or dislikes of the "friend" as well as access the "friend's" internet radio station from pane 5210. This profile information about each user each user is stored in User Information Database 360 as was discussed above with reference to FIG. 3. User preference data is also storable and exchangeable. Media Engine 106 obtains this profile information and allows a user to access it from within pane 5210. In one embodiment, a user can also select to add his or her "friend" as an "influencer" for their radio station. If a user chooses to add his or her "friend" as an "influencer", when the media server 118 streams music via an Internet Radio to the user it will stream songs with a bias toward songs preferred by the "influencer" or when providing recommendations to a user those recommendations will be based on songs rated highly by the "influencer". In other words the songs streamed or recommended by the media server 118 will be songs rated highly by the "friend" chosen as an influencer. The amount of influence can be altered by the user or system, or both, based on predetermined or calculated factors such as implicit or explicit user behavior or other preference-based techniques discussed herein.

Figure 53:
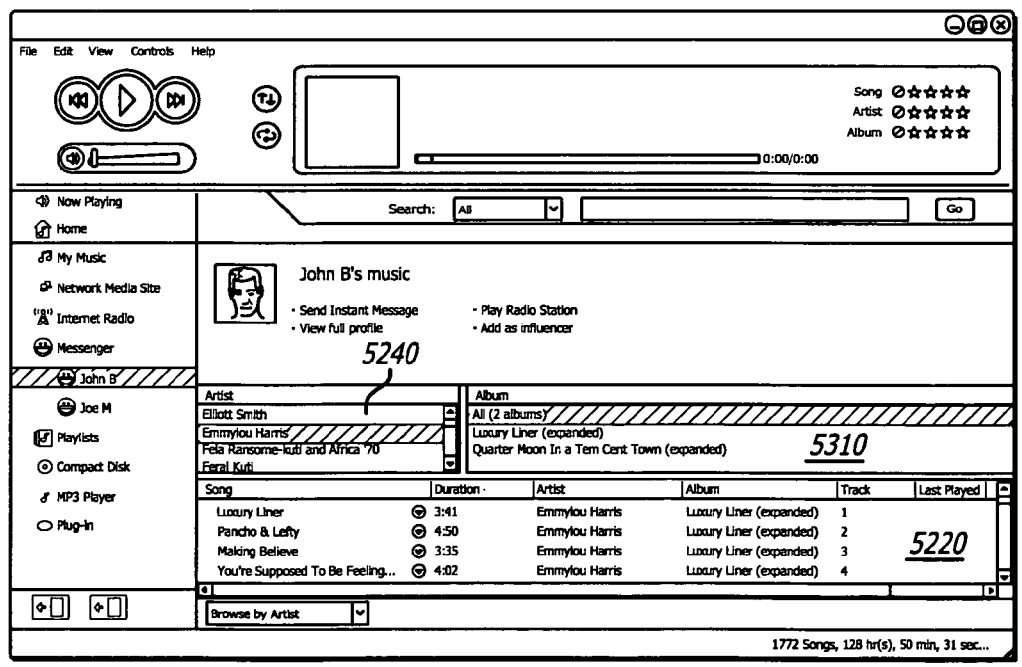
FIG. 53 is another exemplary user interface of an exemplary media engine according to another embodiment of the present invention.
Figure 54:
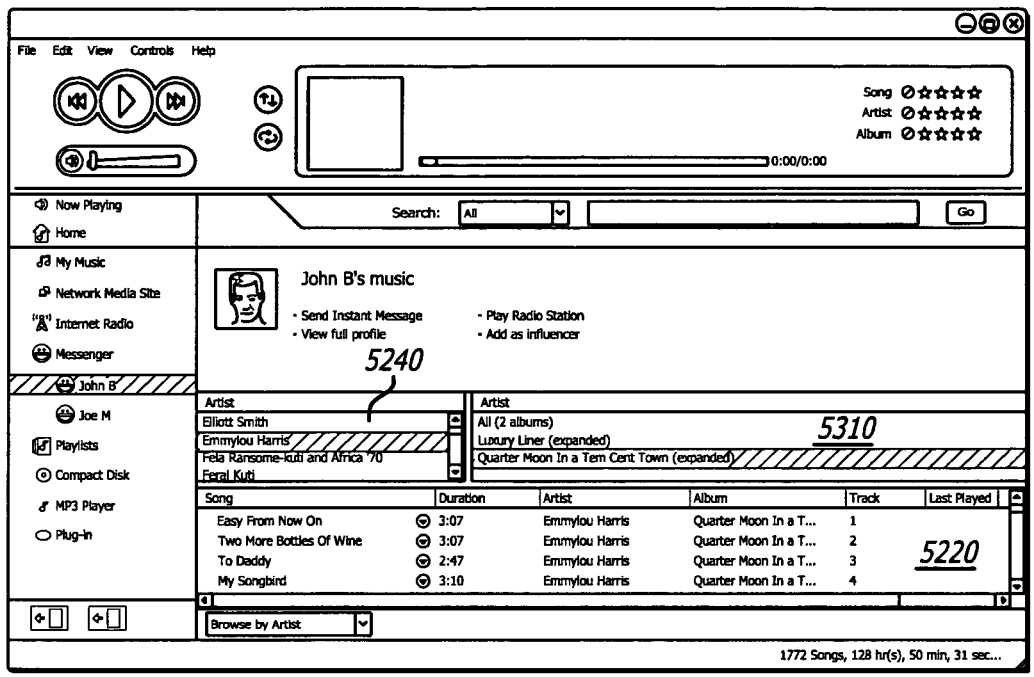
FIG. 54 is another exemplary user interface of an exemplary media engine according to another embodiment of the present invention.

As can be seen in FIG. 53, the user may further narrow his or her view of the "friend's" "my music" listing by clicking on a particular artist (i.e., Emmylou Harris) from the artist listing in pane 5240. The user can then see a listing of albums in pane 5310 for that particular artist. Additionally, only songs by that particular artist that are in the "friend's" "my music" collection will be displayed in pane 5220. A user may further narrow the view in pane 5220 by selecting an album from the listing in pane 5310 as can be seen in FIG. 54. By choosing a particular album from pane 5310, a user is given a listing of only songs from that album in the particular "friend's" (i.e., JohnB) "my music" collection. Additionally as can be seen in FIGS. 50-54, similar to the way a user can browse his or her own "my music" collection by either artist, album, genre, or song, as was discussed above in reference to FIGS. 2-3 the user can similarly browse a "friend's" "my music" collection by selecting which criteria to browse from the drop-down menu 5201. Media items can then be selected for playing, storing, adding to playlists and the like, in the same or similar manner as that described elsewhere herein. In short, a user's friend's "my music" collection becomes an extension of that user's "my music" collection.

Figure 55:
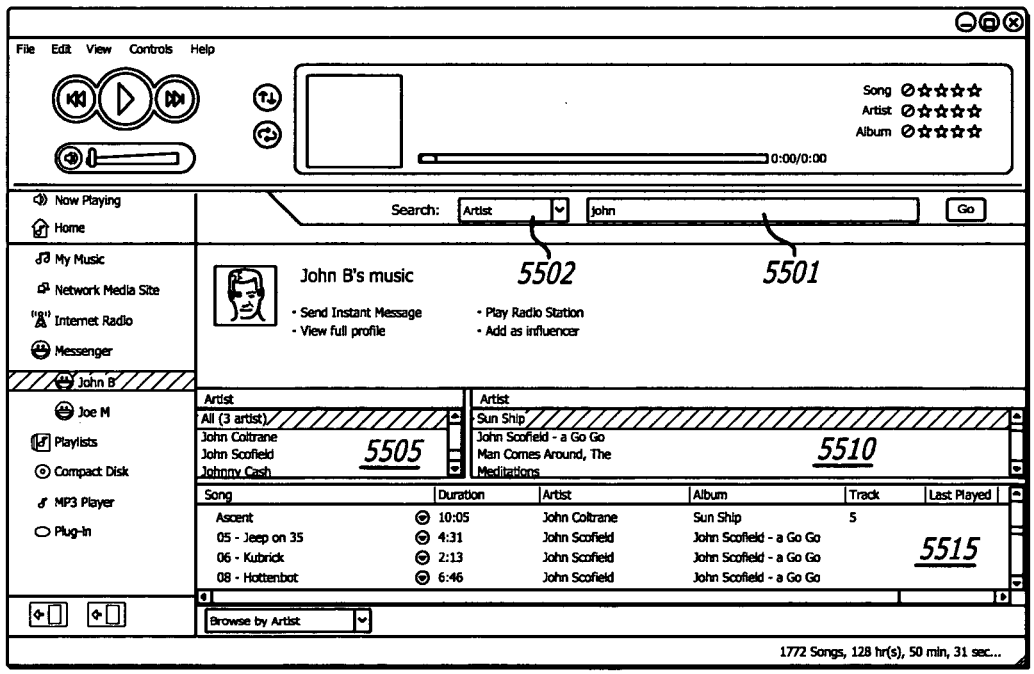
FIG. 55 is another exemplary user interface of an exemplary media engine according to an embodiment of the present invention.
Figure 56:
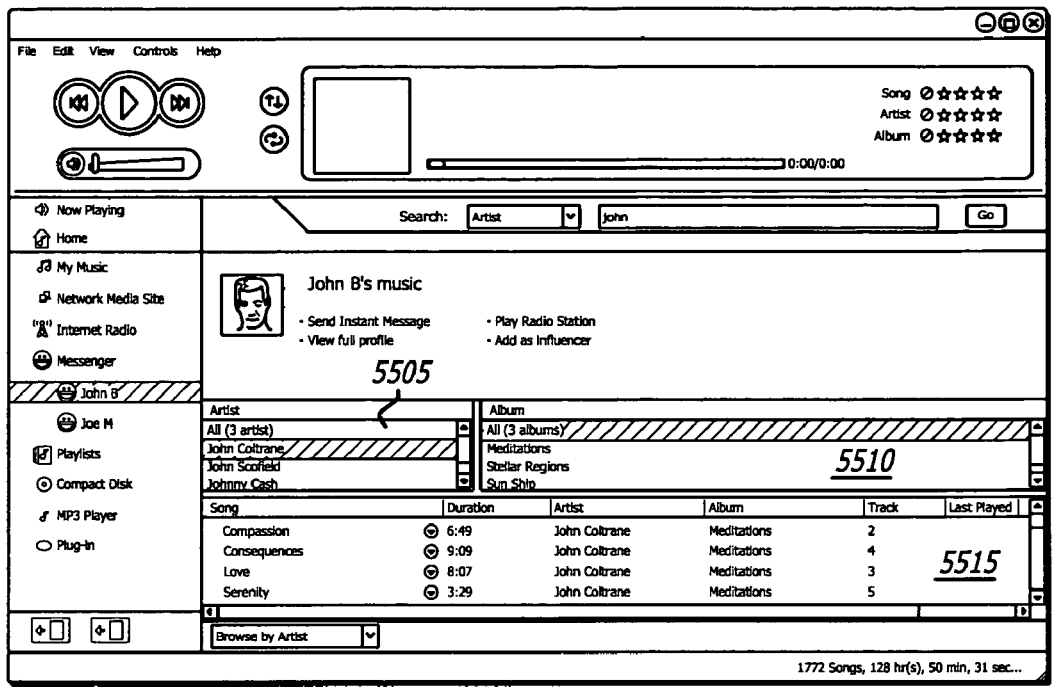
FIG. 56 is another exemplary user interface of an exemplary media engine according to another embodiment of the present invention.

Similar to the embodiments discussed in reference to FIGS. 18-32 above, in another embodiment to the present invention, a user may search through another user's media collection. As can be seen in FIG. 55, user interface 5500 contains field 5501 wherein a search term may be entered and drop-down menu 5502 wherein a category to search for the search term may be selected. For example, in FIG. 55, a display is shown where a user has selected to search for the term "John" throughout all artists in JohnB's "my music" collection. Once the user has selected the search term (e.g., John), a list of artists for those songs that match the criteria is shown in artist pane 5505. All the songs that match the criteria are shown in pane 5515 as well. Additionally, a list of albums matching the criteria is shown in pane 5510. A user can further narrow search results by clicking on an artist in pane 5505. For example, if a user clicks on the artist John Coltrane from pane 5505, as can be seen in FIG. 56, pane 5515 will display only those songs from the artist John Coltrane. Similarly, only albums matching the selected artist will be displayed in the album pane 5510.

Figure 57:
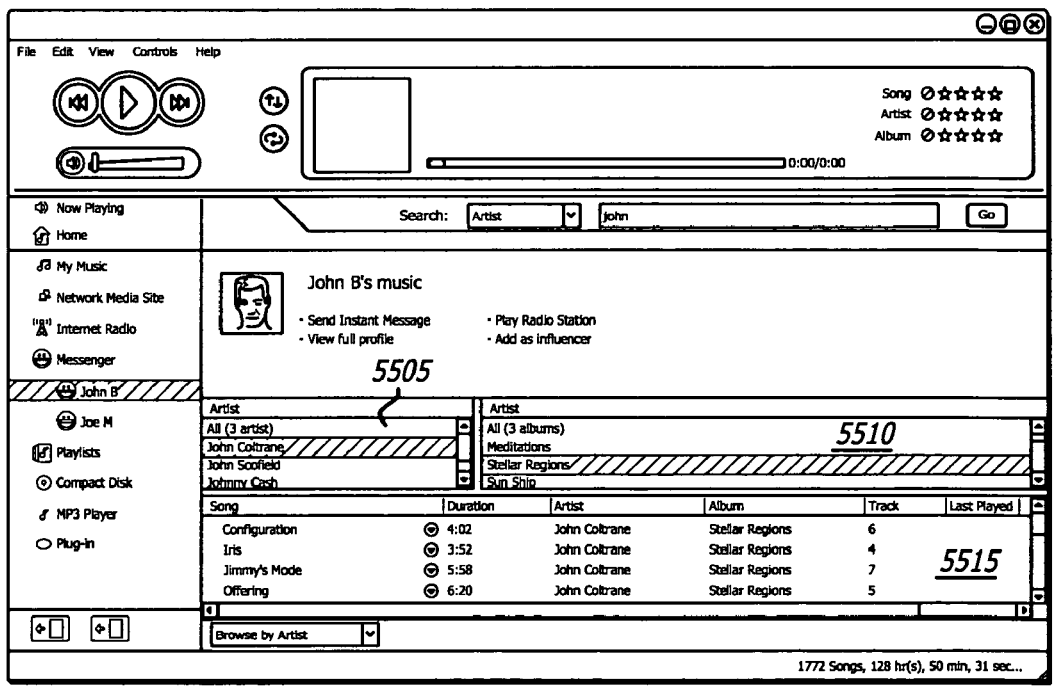
FIG. 57 is another exemplary user interface of an exemplary media engine according to another embodiment of the present invention.
Figure 58:
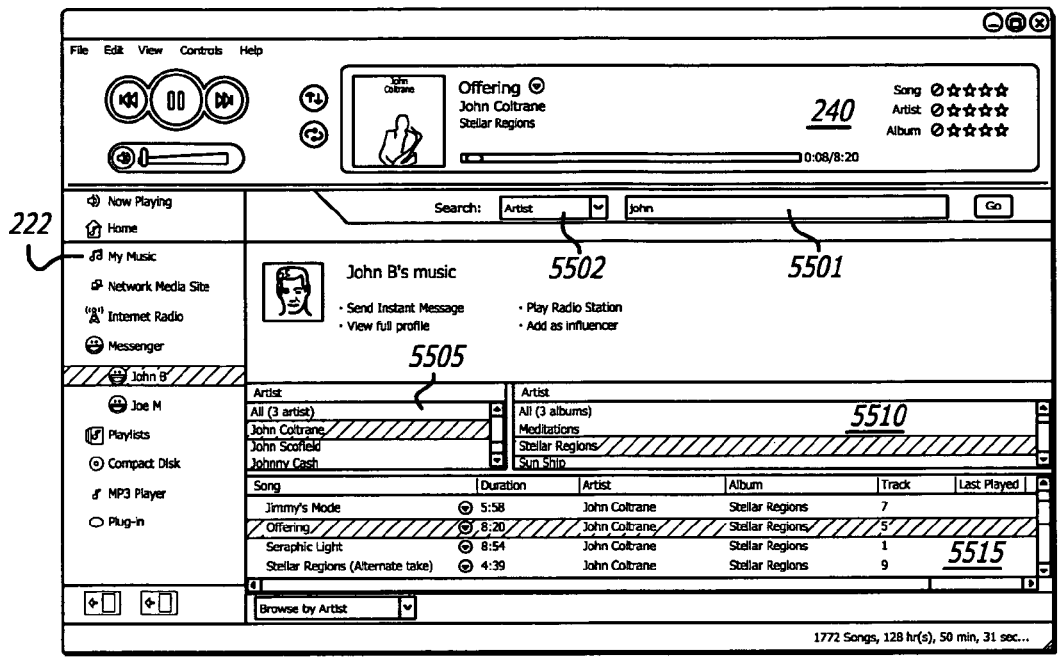
FIG. 58 is another exemplary user interface of an exemplary media engine according to another embodiment of the present invention.

A user can further narrow search results, as can be seen in FIG. 57, by choosing a particular album from pane 5510. If a particular album is chosen from pane 5510, only songs from that album will be displayed in pane 5515. In this embodiment, similar to the way a user is able to browse and play songs from his or her own "my music" collection, a user can browse and play songs from his or her "friend's" "my music" collection. As can be seen in FIG. 58, if a user highlights and clicks on a particular song from pane 5515, that song will be played in media player 240. Additionally, a user may add a song from a "friend's" "my music" collection into his or her own "my music" collection. This can be done in one embodiment by dragging and dropping the particular song from pane 5515 into the user's "my music" button 222. Similarly, songs from a "friend's" "my music" collection may also be dragged and dropped into a particular user's playlist by dragging and dropping a particular song from pane 5515 into playlist list 232. It should be noted, that this embodiment enables a user to perform any actions on his or her "friend's" "my music" collection that he or she can perform on his or her own "my music" collection, preferably while taking into account proper digital rights or other authorization considerations.

Figure 59:
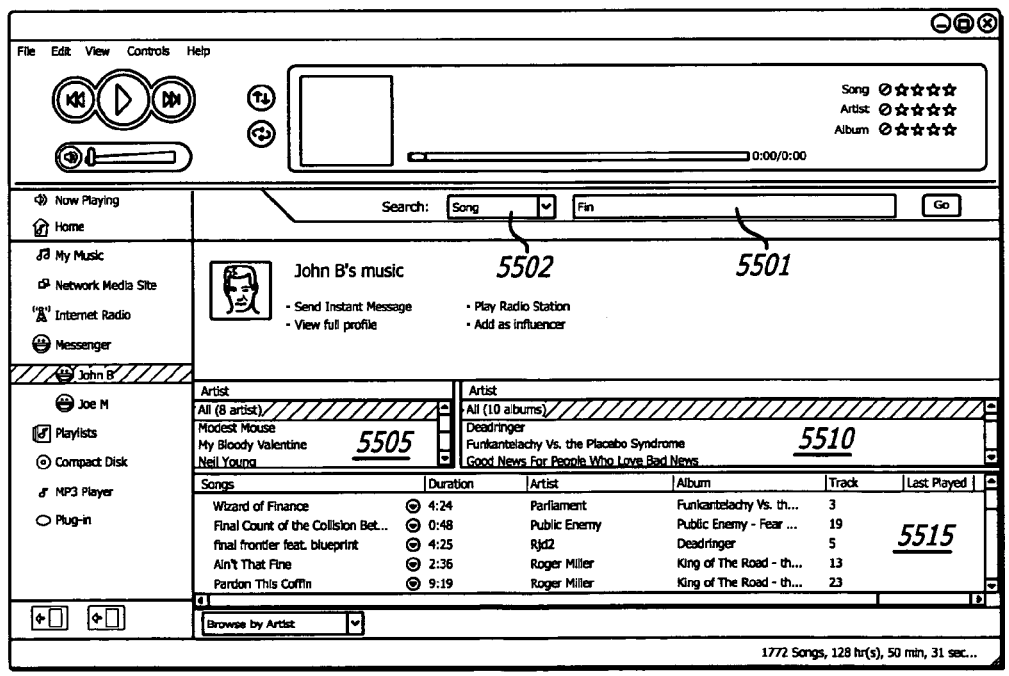
FIG. 59 is another exemplary user interface of an exemplary media engine according to another embodiment of the present invention.
Figure 60:
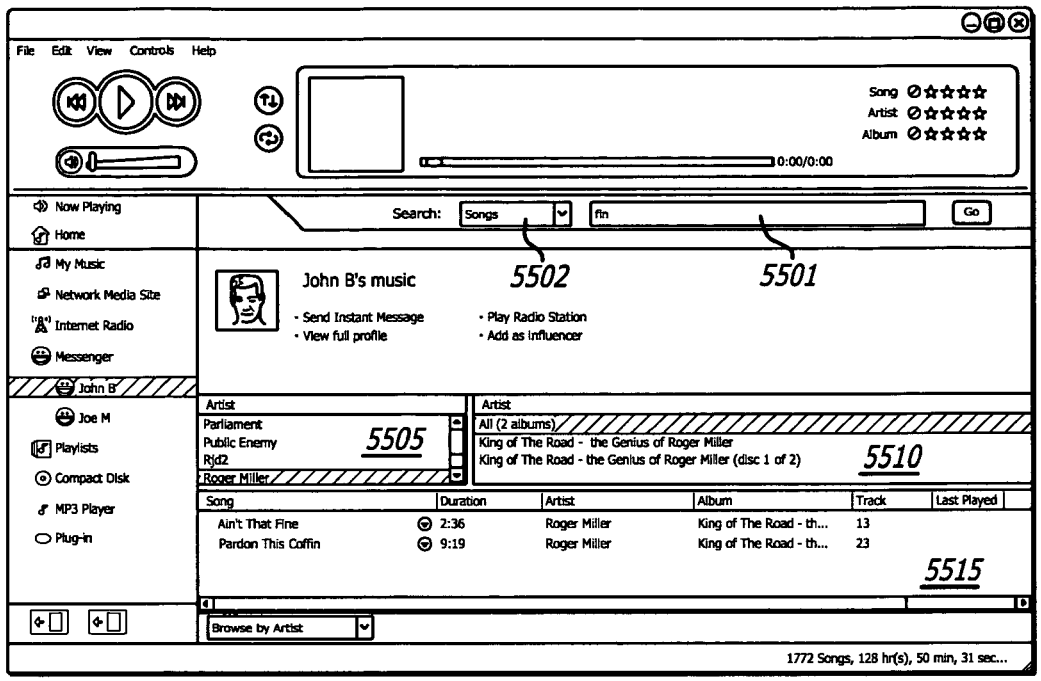
FIG. 60 is another exemplary user interface of an exemplary media engine according to another embodiment of the present invention.
Figure 61:
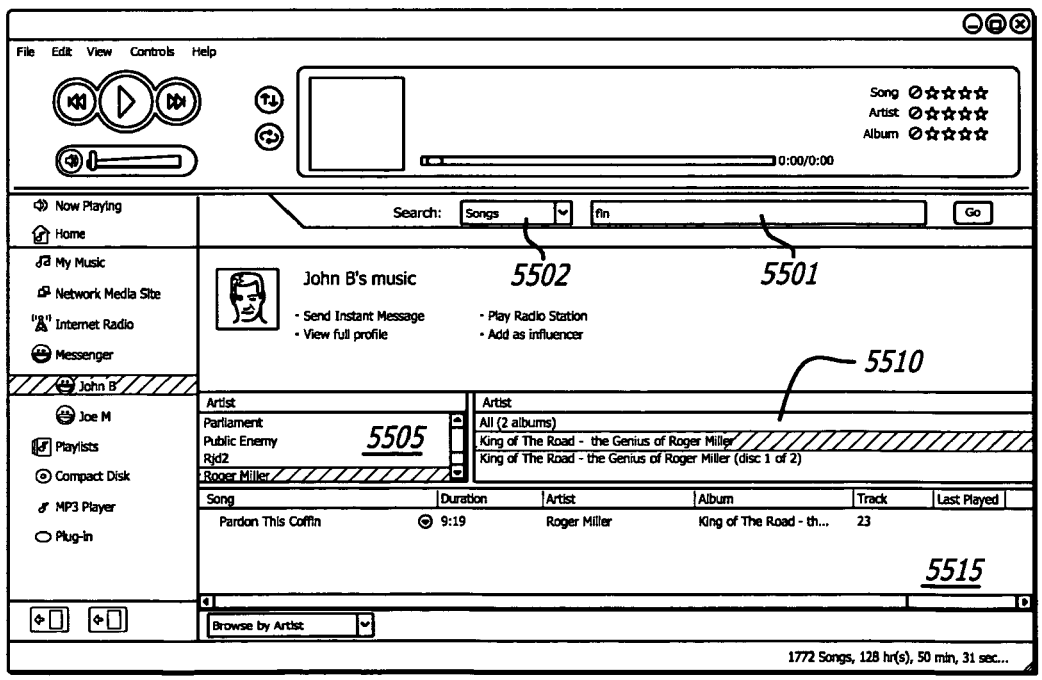
FIG. 61 is another exemplary user interface of an exemplary media engine according to another embodiment of the present invention.

In another embodiment, a user may search for songs within their "friend's" "my music" collection by a variable term that is in the name of a song in their "friend's" "my music" collection by selecting "song" from drop-down menu 5502 and inserting the search variable in field 5501. As can be seen in FIG. 59, if a user chooses to search song names from drop-down menu 5502 and populates, for example, field 5501 with the search term "fin", the media engine 106 will return a list of artists in pane 5505, albums in pane 5510 and songs in pane 5515 that match that particular criteria. The user can then choose a song directly from pane 5515 or choose an artist from pane 5505 or an album from pane 5510 to further narrow the search to include only songs from that particular artist or album. As can be seen, for example, in FIG. 60, if a user chooses to view only the "Roger Miller" song in JohnB's "my music" collection, that has the term "fin" the user would select Roger Miller from pane 5505 that would display all of the Roger Miller albums in pane 5510 and all of the Roger Miller songs in pane 5515. As can be seen further in FIG. 61, if user selects one of those albums in pane 5510, pane 5515 will only display songs from that particular album. Once again, a user can play, store, transfer, etc. any particular song by selecting that song from pane 5515.

Figure 62:
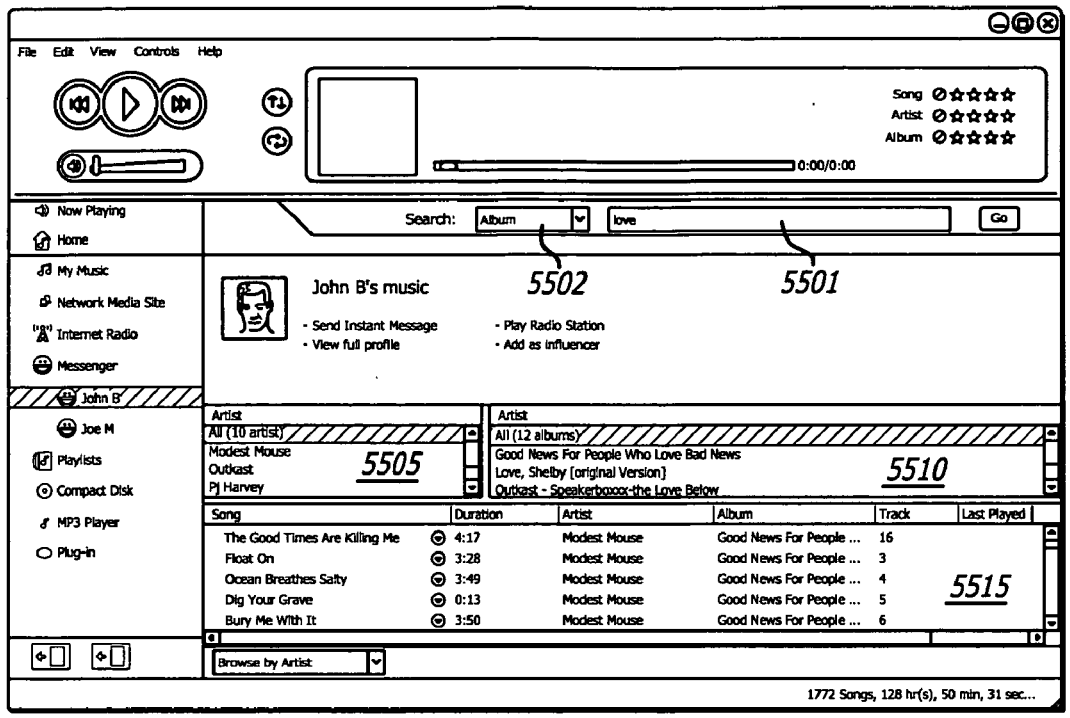
FIG. 62 is another exemplary user interface of an exemplary media engine according to another embodiment of the present invention.
Figure 63:
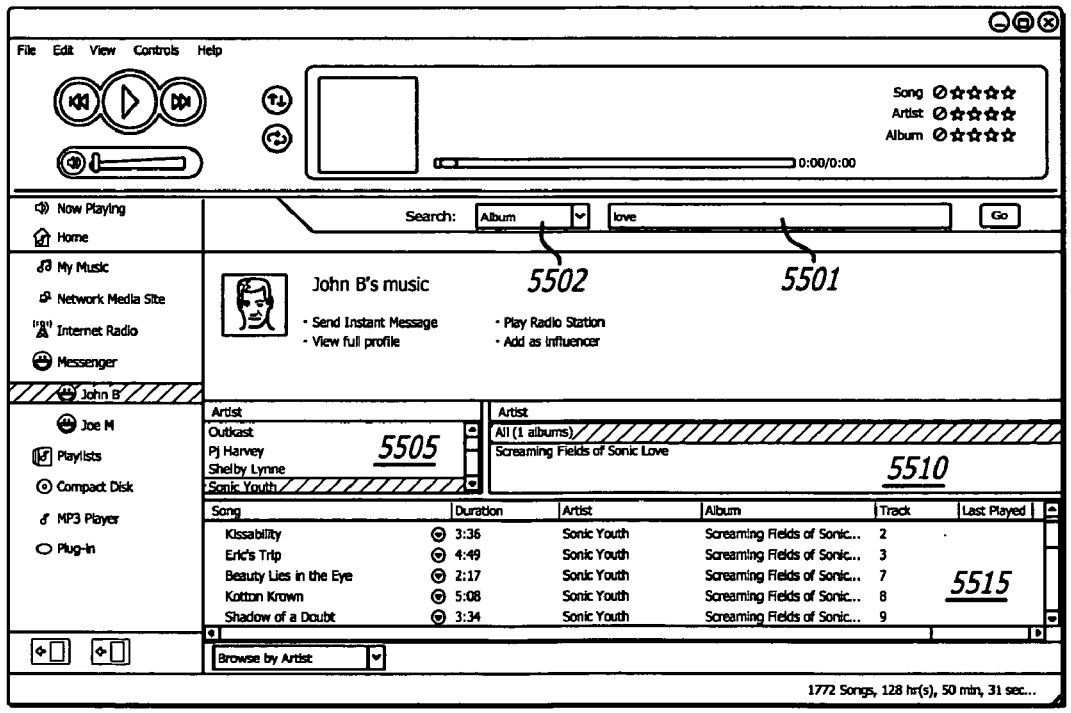
FIG. 63 is another exemplary user interface of an exemplary media engine according to another embodiment of the present invention.
Figure 64:
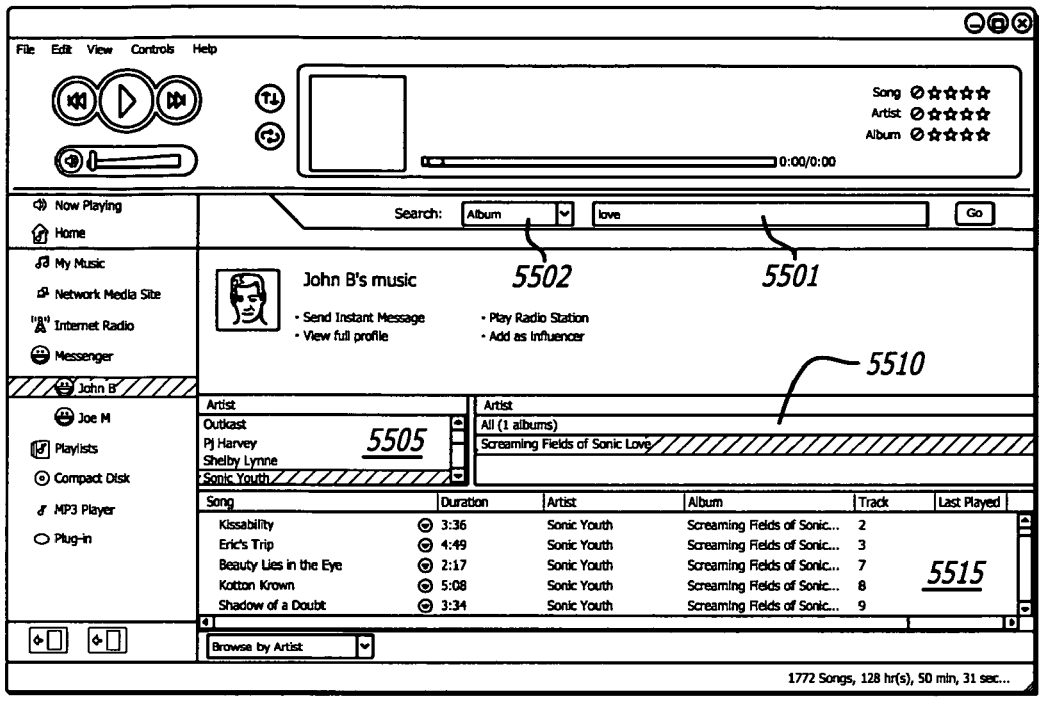
FIG. 64 is another exemplary user interface of an exemplary media engine according to another embodiment of the present invention.

In additional similar embodiments in which a user can search a "friend's" "my music" collection by album and/or genre will now be discussed with reference to FIGS. 62-70. As can be seen in FIG. 62, the user can elect to search for a particular search term in an album name from their "friend's" "my music" collection by choosing an album from the drop-down menu 5502 and including a search term, such as, for example, "love" in field 5501. This will once again result in the song in the particular "friend's" "my music" collection whose album's name has the term "love" within their name to be displayed in pane 5515. As can be seen in FIG. 63, once again, a user can further narrow the search by choosing a particular artist from pane 5505, in which case only those songs from that particular artist will be displayed in pane 5515. The user can once again further narrow the search by choosing an album from pane 5510, in which situation only songs matching that album and matching the search criteria will be displayed in pane 5515 as can be seen in FIG. 64.

Figure 65:
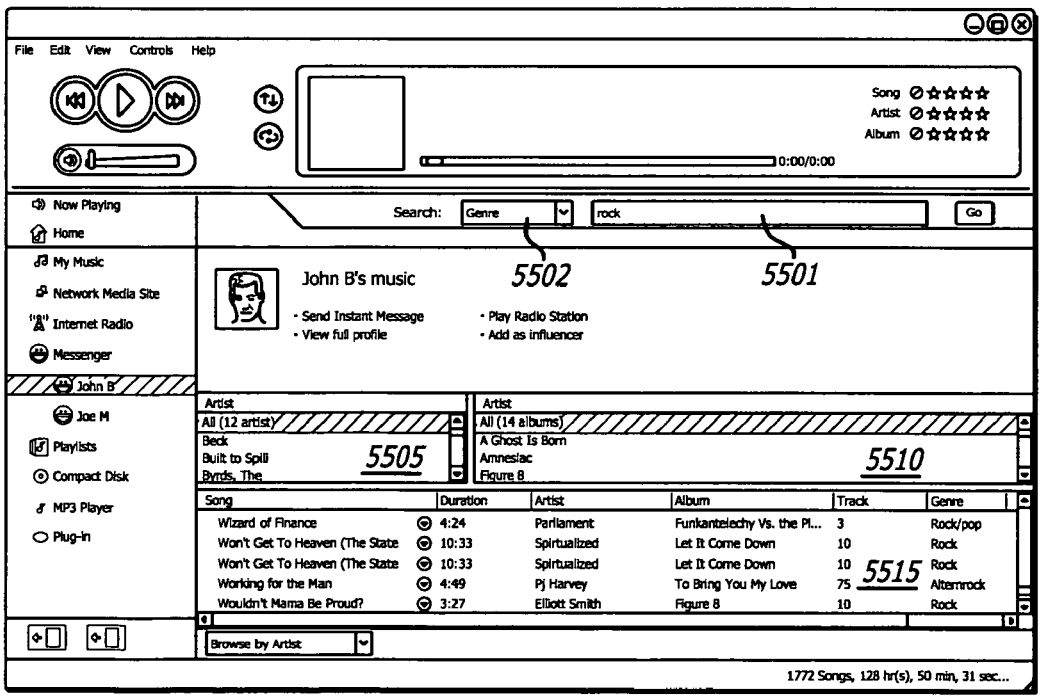
FIG. 65 is another exemplary user interface of an exemplary media engine according to another embodiment of the present invention.
Figure 66:
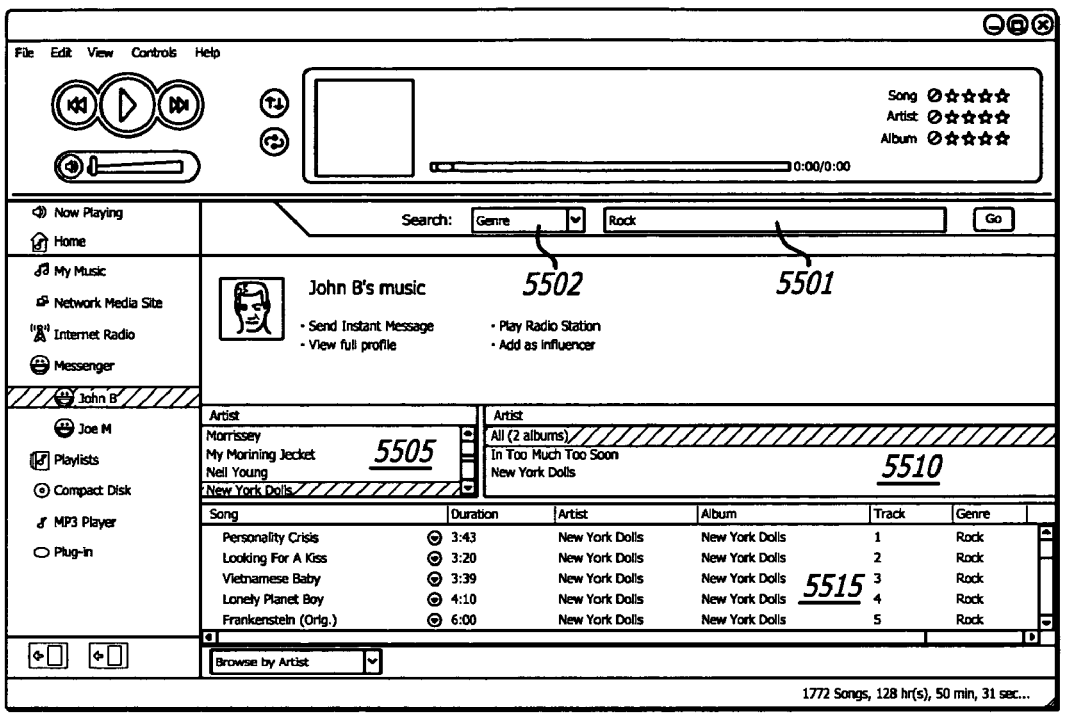
FIG. 66 is another exemplary user interface of an exemplary media engine according to another embodiment of the present invention.
Figure 67:
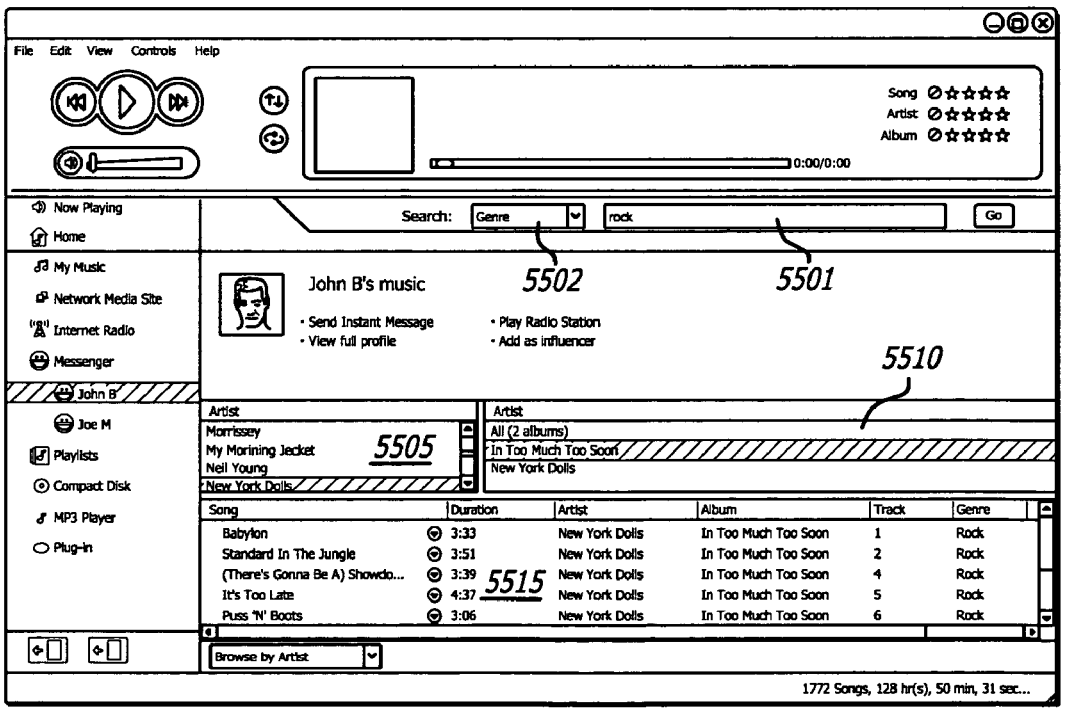
FIG. 67 is another exemplary user interface of an exemplary media engine according to another embodiment of the present invention.

In another embodiment, a user can search for a particular term in the genre of songs in a "friend's" "my music" collection as can be seen in FIG. 65. Similar to the above embodiments, to perform such a search, the user may select "genre" from drop-down menu 5502 and enter a particular search criteria in field 5501. As can be seen in FIG. 65, if the user chooses genre from drop-down menu 5502 and the string "rock" from field 5501, songs will be displayed in pane 5515 that have the string "rock" in their genre name, and a list of artists and albums for those songs will be displayed in pane 5505 and 5510, respectively. The search can be further narrowed, as can be seen in FIG. 66, if the user chooses a particular artist from artist pane 5505. As shown in FIG. 66, only songs matching the selected artist "New York Dolls" are shown in pane 5515 and only albums matching that artist are shown in pane 5510. The search can be further narrowed if the user chooses an album from pane 5510. As can be seen in FIG. 67, pane 5515 will then only display those songs which match the criteria and are from the album chosen by the user.

Figure 68:
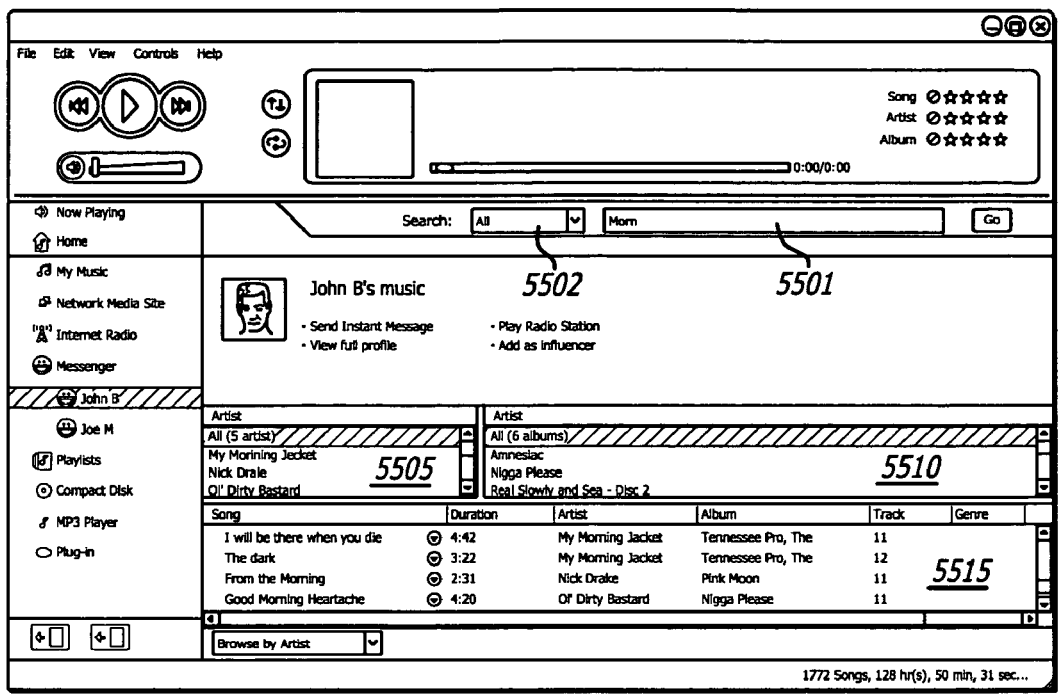
FIG. 68 is another exemplary user interface of an exemplary media engine according to another embodiment of the present invention.
Figure 69:
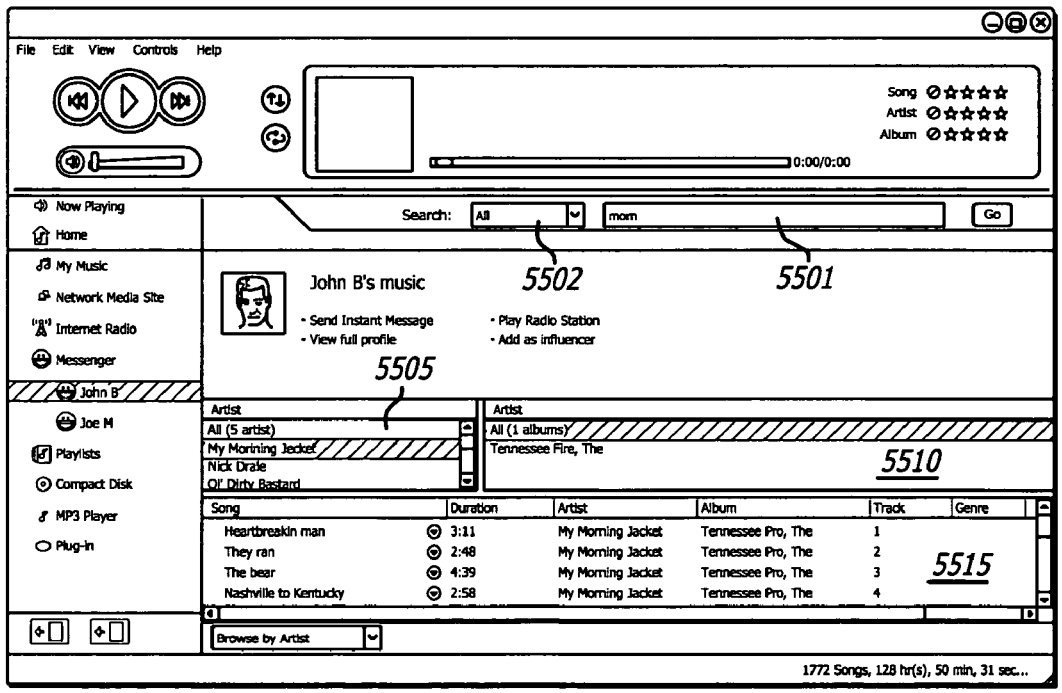
FIG. 69 is another exemplary user interface of an exemplary media engine according to another embodiment of the present invention.
Figure 70:
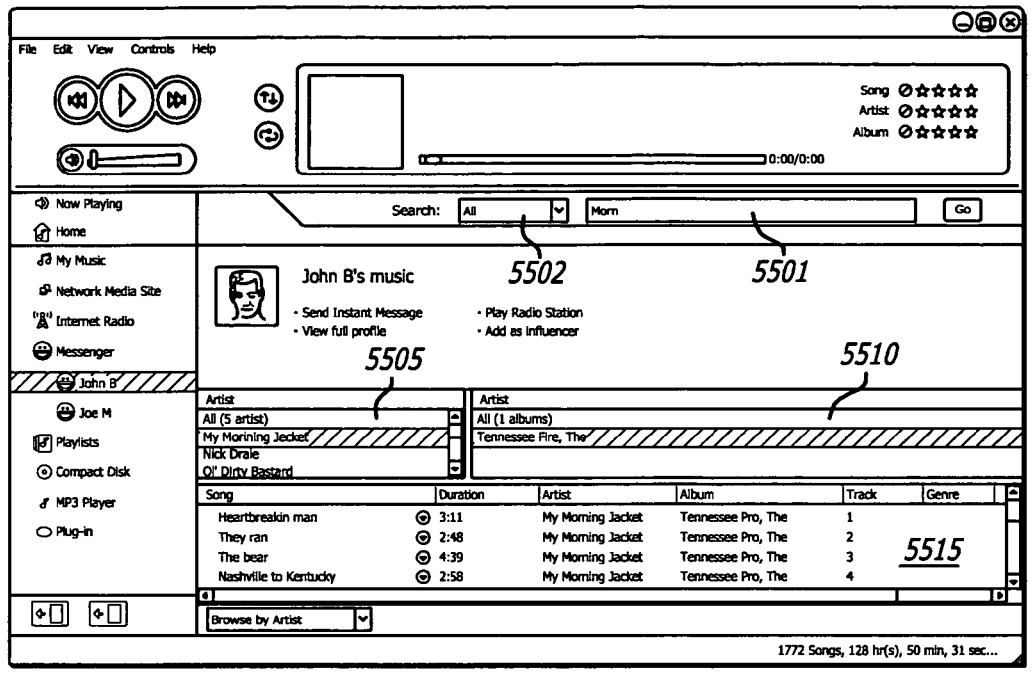
FIG. 70 is another exemplary user interface of an exemplary media engine according to another embodiment of the present invention.

In another embodiment, a user can search through various identifying characteristics of his or her "friend's" "my music" collection (i.e., album name, song name, artist name, genre, preference rating) for a particular search term all at once. As can be seen in FIG. 68, if a user selects "all" from drop-down menu 5502, and a particular search term in field 5501 (e.g., "morn"), the user interface will return all songs in the particular "friend's" "my music" collection that have that criteria in pane 5515. Additionally, a list of all the artists that match those criteria will be displayed in pane 5505 and all the albums that match that criteria will be displayed in pane 5510. Similar to previous embodiments, a user can further narrow the search by selecting a particular artist from pane 5505 (e.g., "my morning jacket") as can be see in FIG. 69. Once a user selects a particular artist, only albums from that particular artist that match the criteria will be displayed in pane 5510 and only songs that match that particular artist and the criteria will be displayed in pane 5515. The search can be further narrowed as can be seen in FIG. 70 if the user selects a particular album from pane 5510. As can be seen in FIG. 70, once a user selects a particular album from pane 5510, only songs from that particular album are displayed in pane 5515. Similar to the embodiment discussed above with reference to FIGS. 18-32, in one embodiment search field 5501 can populate automatically based on prior searches performed by the user, for example filling in the word "mirror" once the user types "MI".

Figure 71:
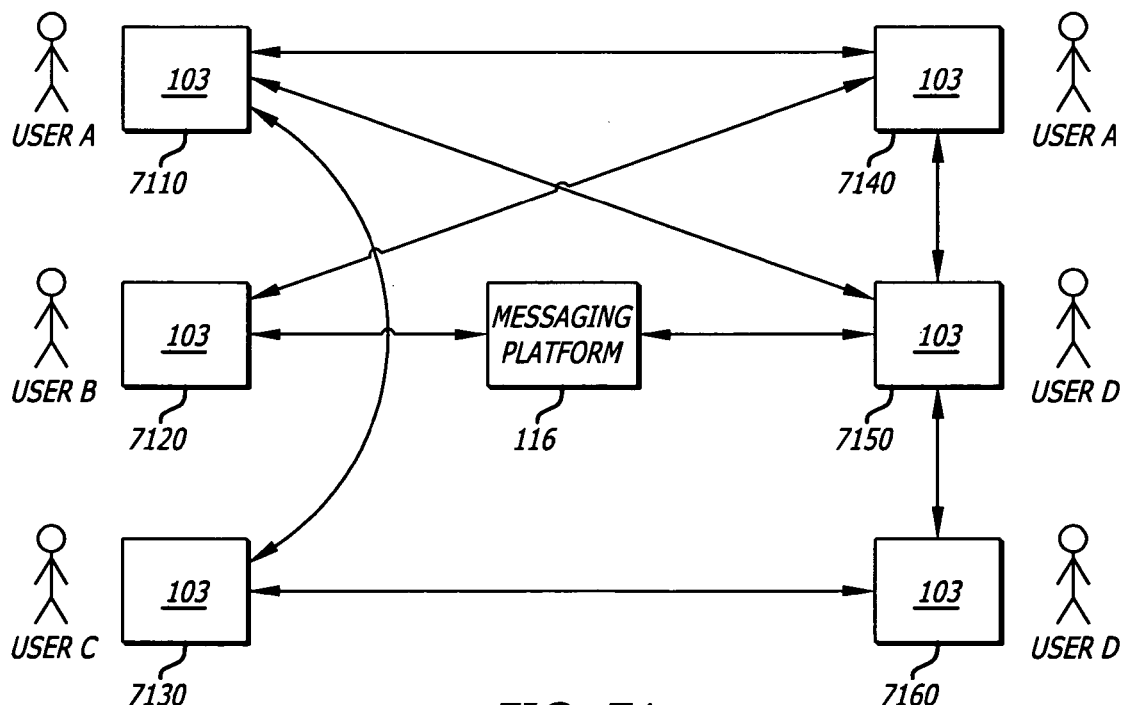
FIG. 71 is a schematic illustrating exemplary system architecture of one embodiment of the present invention.

In another embodiment of the present invention with reference to FIG. 71, various processors 103 that are connected to the messaging platform 116 can be interconnected without making use of the messaging platform 116 by being connected to the network 300. Use of a similar type network is disclosed in U.S. patent application Ser. No. 10/715,694 entitled "Method and Apparatus for Assisting With Playback of Remotely Stored Media Files" that was filed on Nov. 18, 2003, has been assigned to the assignee of the present application and is hereby incorporated by reference. In one embodiment of the present invention for example, user A uses both processor 7110 and processor 7140, with processor 7110 located at user A's home, and processor 7140 located at user A's work location. User B uses processor 7120 while user C uses processor 7130 and user D uses processor 7150 and processor 7160, processor 7150 being located for example at user D's home, and processor 7160, for instance located at user D's work location. All of these processors can be interconnected without having to stay connected via the messaging platform 116. Specifically, if all of the processors are connected to the messaging platform 116, the messaging platform 116 is capable of sensing and relaying information between each of the processors. For example, if in addition to being connected to the messaging platform, both of user A's processors, namely processor 7110 and processor 7140 are connected to each other via network 300, and both of user D's processors namely processor 7150 and processor 7160 are connected to each other via network 300, and processor 7120 is connected to processor 7140 while processor 7150 is also connected to processor 7130, all of the processors displayed in FIG. 71 can be considered as interconnected. This is because since processor 7110 maintains a connection with both processor 7140 and processor 7130 it can also use processor 7130 as a conduit to connect to processor 7120, 7150 or 7160. This conduit is preferably managed through messaging program 108, but a separate peer networking software application running on processor 102 may also be utilized, alone or in concert with or as part of messaging program 108. Namely, if user A at processor 7110 wishes to exchange a media file or other information with processor 7150, it can do so by sending the file via its connection with processor 7130 which will forward it on through its connection with processor 7160 that will be able to transfer it to link or point to the processor 7150 via their direct connection. Alternatively, processor 7110 will receive a location of where the particular media file or other information is located. Processor 7110 can then go and have it streamed from processor 7150, for example. It should be noted once again that in certain embodiments, a verification would first be performed to ascertain that the user has the proper digital rights to have the particular song streamed to them. In other words, as was discussed in other embodiments, the system is preferably capable of managing digital rights so as to avoid the unlawful distribution of media files between users.

Figure 72:
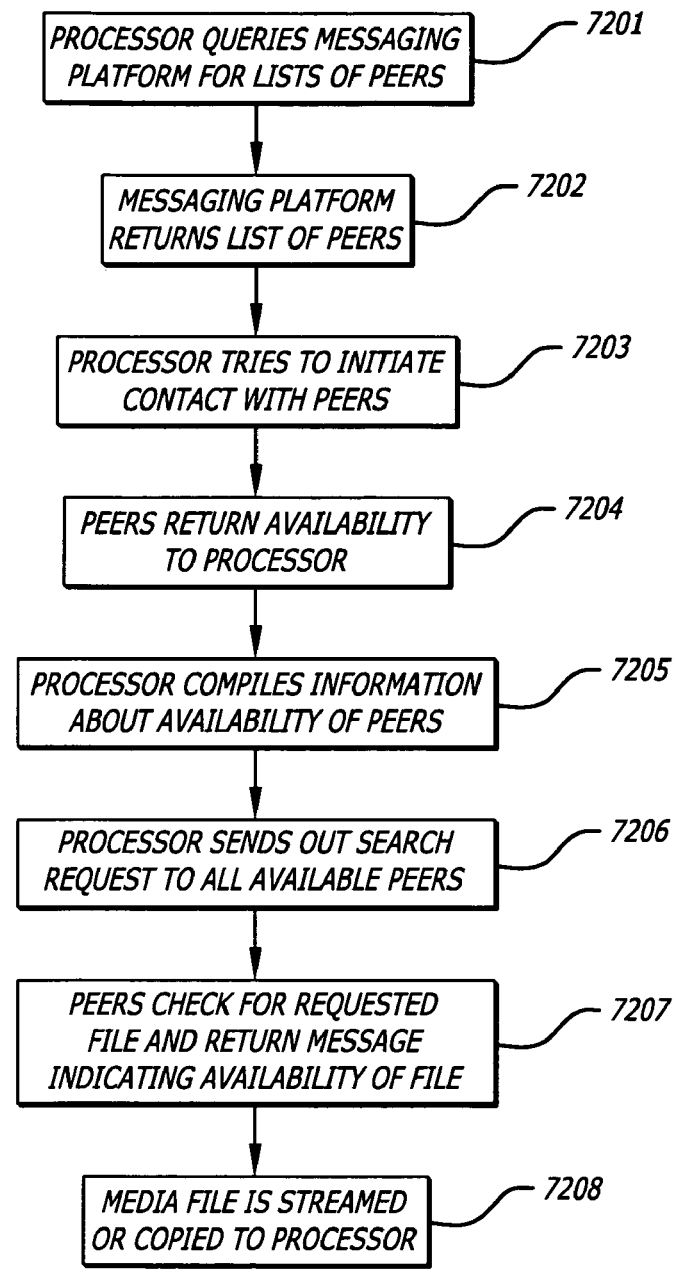
FIG. 72 is a flowchart depicting a process of creating and interacting with a network according to one embodiment of the present invention.

In this exemplary embodiment, a network is created in which a group of users utilizes their various interconnections to create a network that can be used to exchange files and/or stream information or media files between various processors. As can be seen with reference to FIG. 72, a processor 103 connects to the messaging platform 116 to obtain a listing of other processors 103 that the messaging platform 116 is aware of and that can act as a member of the processor 103's extended network. Step 7201. In other words, the messaging platform 116 will provide information to the requesting processor 103 of all other processors that maintain a connection with messaging platform 116 which may be available to the requesting processor 103 by either a direct connection or through another processor's connections. This list of processors that is given by the messaging platform 116 is referred to as a listing of all different "peers" that can be available to the requesting processor through their "peer network." Step 7202. Once processor 103 gains the list of "peers" from messaging platform 116 the processor 103 no longer needs to be connected to messaging platform 116. Processor 103 then tries to initiate a connection with each of the other processor 103's or peers passed to it by messaging platform 116. Step 7203. This can be done by sending messengers to each of the processors peers requesting information about the processors availability. If the other processors are available they will return a message indicating their availability. Step 7204. Once processor 103 receives all the information back regarding the availability of the other processor or peers in the processor's network, it compiles information about the "peers" including the time that it took for the message to be returned. Step 7205. Thus, in addition to having a listing of available processors within their peer network, the processor will also have a listing of which connection responded faster and thus maintains a faster connection between peers and which connections are the slower ones. Next, if processor 103 wishes to search for a particular media file (e.g., a song), the processor would send out a search request to all of the processors listed in the peer network. Step 7206. Each of the processors within the network checks if they have the requested file and sends an appropriate message back to the requesting processor indicating that they have or do not have that file. Step 7207. Once the requesting processor receives any or all responses from peers within the peer network, the media file can then either be streamed or copied to the requesting processor. Step 7208.

It should be noted when searching for a file within the network, the processors searched can include two processors that are directly connected such as processor 7110 and 7130 in FIG. 71 or include processors that are not directly connected to each other but rather connected through another processor. For example referring once again to FIG. 71, a peer network created from processor 7130 can include processors 7160 and 7110 both of which are directly connected to processor 7130. However, in searching for a file or other information, processor 7130 may also in addition to searching those processors that are within its peer network (namely, processor 7110 and 7160) processor 7130 would also be able to search within its peers' network, namely 7110's network and 7160's network. Therefore, processor 7130 would be able to also search processors 7120, 7140, and 7150. This is because although those processors are not directly within processor 7130's network, they do fall in one of 7130's peers' network.

When querying message platform 116, for a listing of those other processors that can act as peers to processor 103, the messaging platform in one embodiment can also supply information about the processors state or status such as whether they are actually connected to the network at that point in time or whether they are actively receiving messages. In another embodiment, the messaging platform only supplies information that there exists certain processors that the requesting processor can connect to but not supply any information about the current state of that processor. In such an embodiment, it would be up to the processor to connect individually to each processor and/or peer and to obtain the current state. Thus, through the use of messaging and/or peer connectivity, the media engine 106 is able to incorporate a larger universe of media for a specific user, expanding a user's media file access options beyond that user's specific collection to that user's friends' collections as well.

In another embodiment, through the user interface, the user can utilize a similarity explorer function to generate a list of similar users/members, albums, artists, songs, or genres. This functionality may be performed in whole or in part by the affinity engine 350, which generates the desired list based on the user's ratings, preferences, play data, and/or explicit and/or implicit user behavior. In further embodiments, the affinity engine preferably applies a filter function or a threshold when generating the list. The threshold preferably relates to a number or amount or size of items or actions associated within each potential candidate for the similarity list. In order for the potential candidate to qualify as a suitable match for the similarity list, the candidate must preferably meet the particular threshold.

Figure 78:
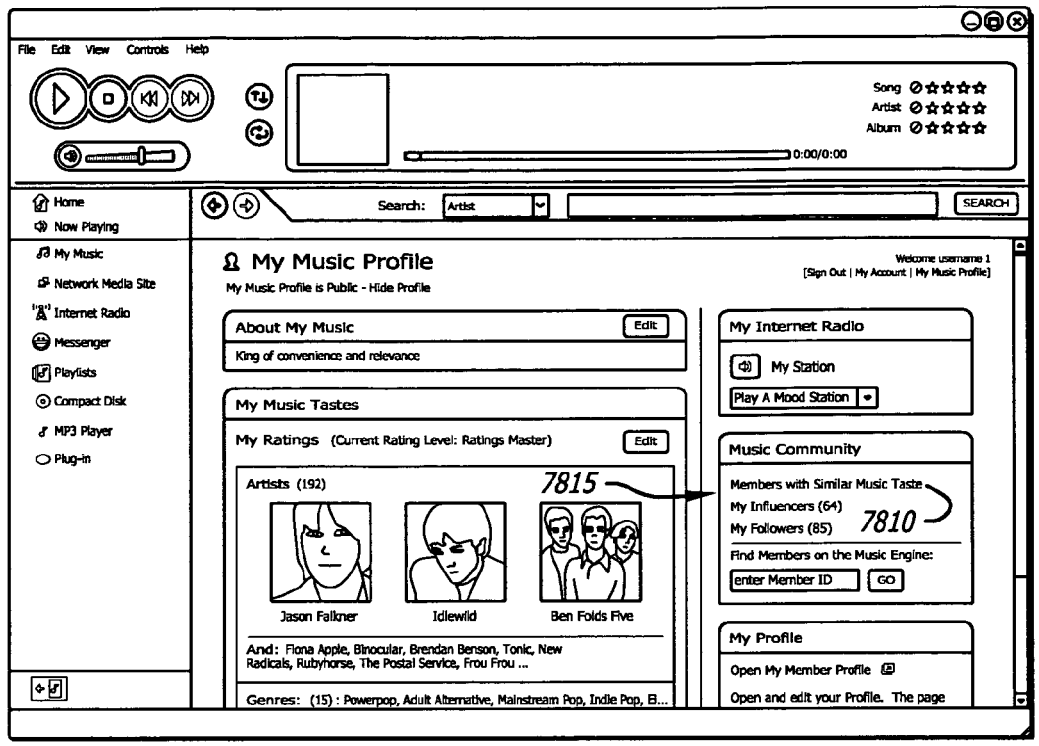
FIG. 78 is an exemplary user interface used in creating a similar users/members list with an exemplary according to one embodiment.
Figure 79:
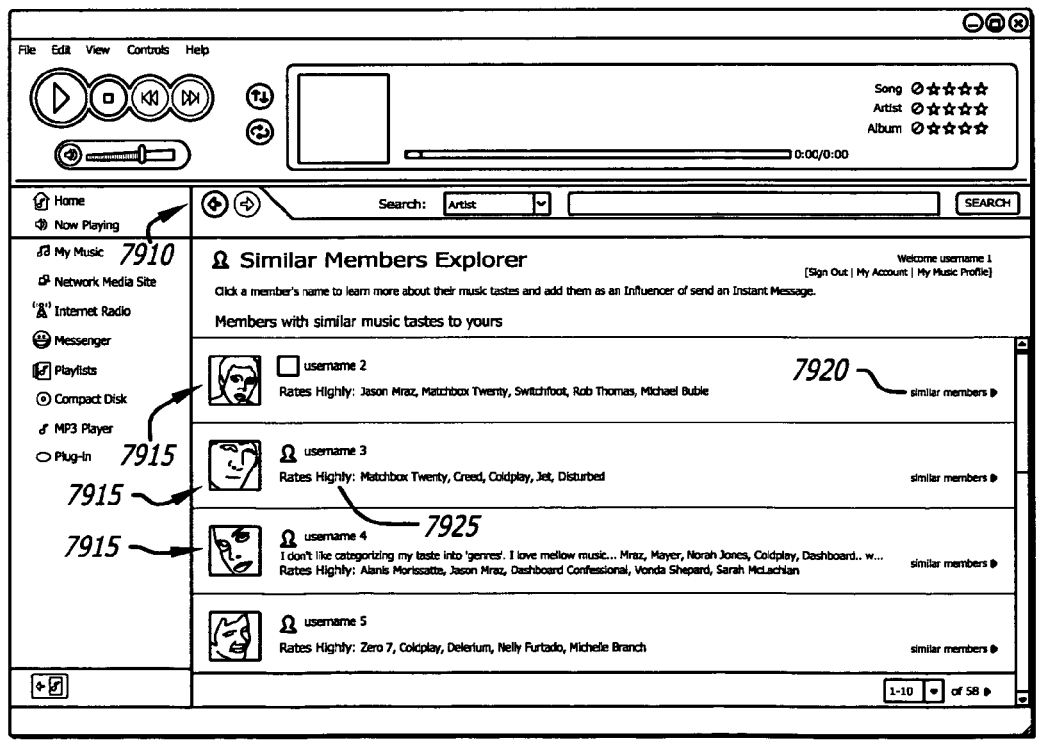
FIG. 79 is an exemplary user interface used in creating a similar users/members list according to one embodiment.

In one exemplary embodiment of using the similarity explorer function, the user can access a list of similar users or members in the network. The affinity engine preferably generates the similar members list based on the user's ratings, preferences, and/or play data. Furthermore, the affinity engine can apply a threshold when generating the similar members/users list. In one example, the threshold can be set to a predetermined number of items (genre/albums/artist/songs) a particular user has rated. For example, a user must have rated at least 20 items, and the selected as similar must have rated at least 100 items. Thus, members/users who do not meet this threshold number will not be included in the similar members/users list. As can be seen with reference to FIG. 78, the user interface allows the member to access and view a similar members list. First, the user clicks the link associated with the similar member's function 7810 located in particular pane 7815 of the user interface. Then, as depicted in FIG. 79, the user is presented with a pane 7910 listing the similar members 7915 generated by the affinity engine 350. The generation may occur at the time the list is requested by a user, or may be generated as a background function or batch function performed periodically by affinity engine 350. From this pane, the user can access information about each listed member 7915. For example, the user can access which artists a particular listed member rates highly 7925. In another example, a user can access which members 7920 a listed member 7915 is considered similar with. This allows the user to explore and expand to different degrees and branches of similar members. In a further example, the user can browse each listed member's 7915 avatar or other related information such as user name, which artists the particular member 7915 likes, etc.

Figure 80:
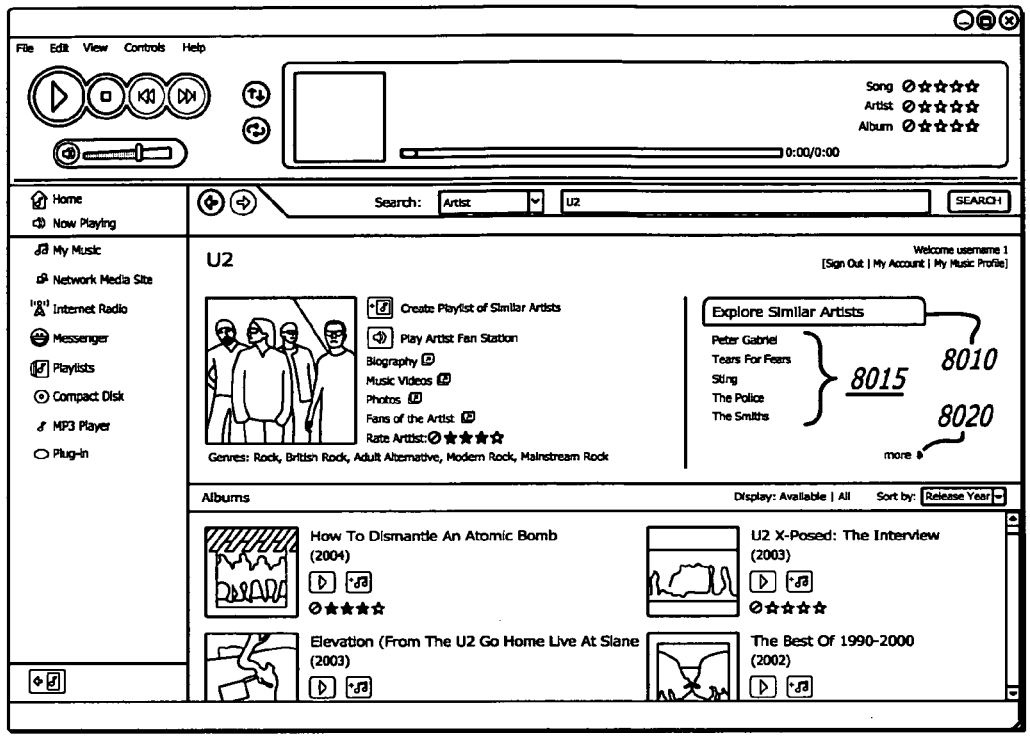
FIG. 80 is an exemplary user interface used in creating a similar users/members list with an exemplary according to one embodiment.
Figure 81:
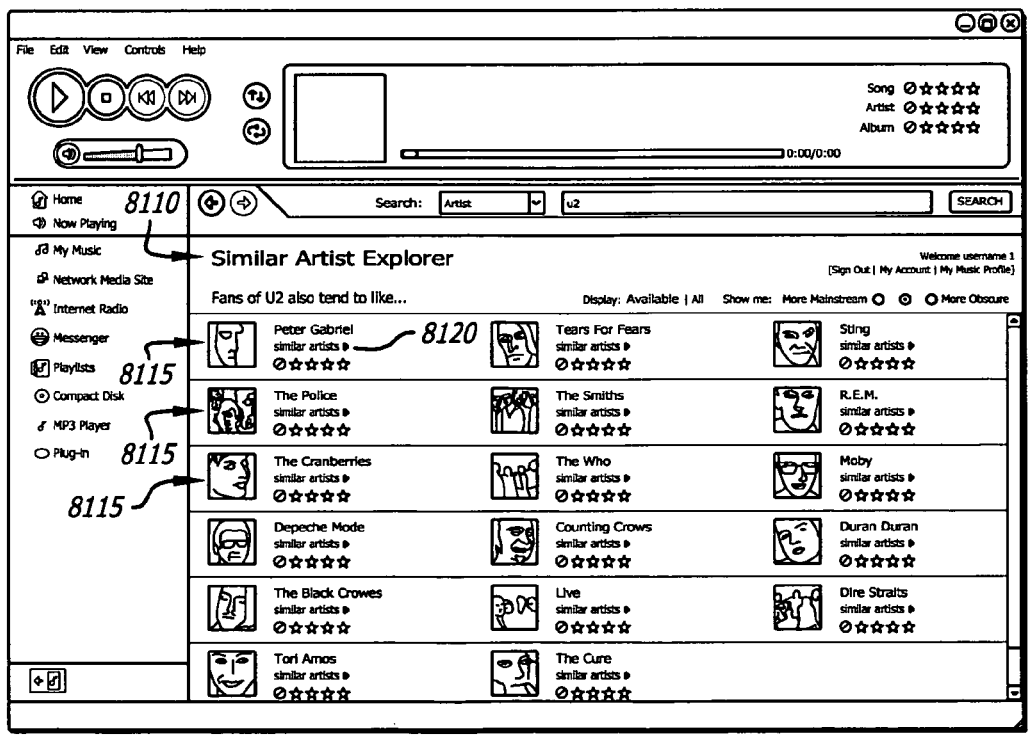
FIG. 81 is an exemplary user interface used in creating a similar artist list with an exemplary according to one embodiment.
Figure 82:
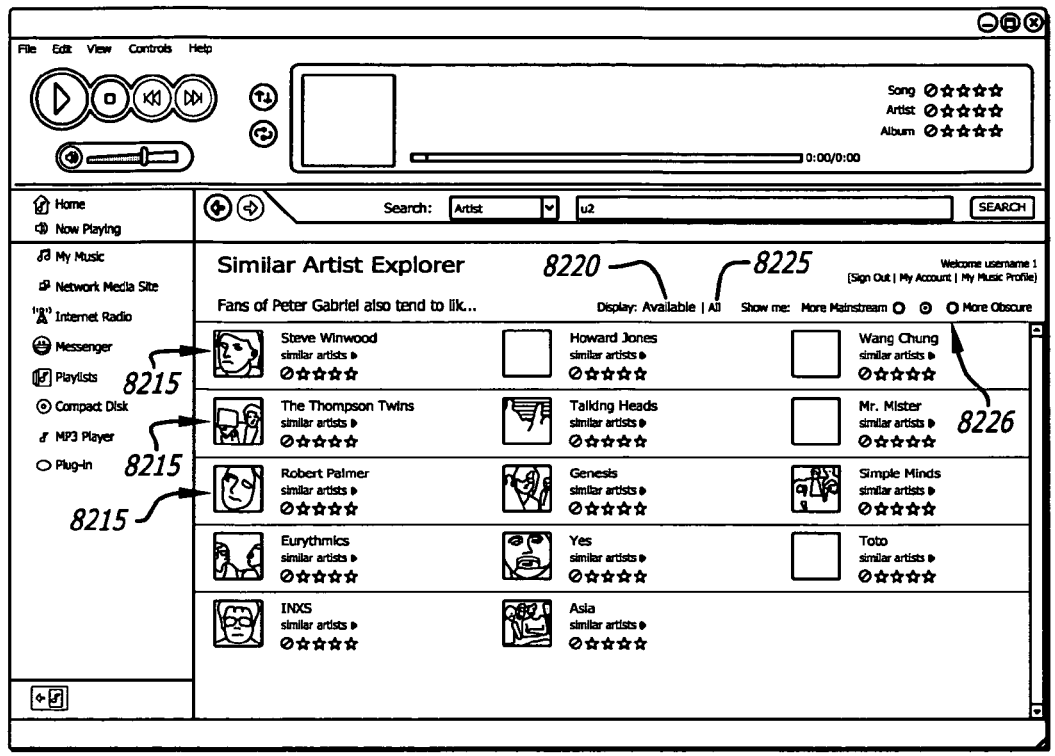
FIG. 82 is an exemplary user interface used in creating a similar artist list with an exemplary according to one embodiment.
Figure 83:
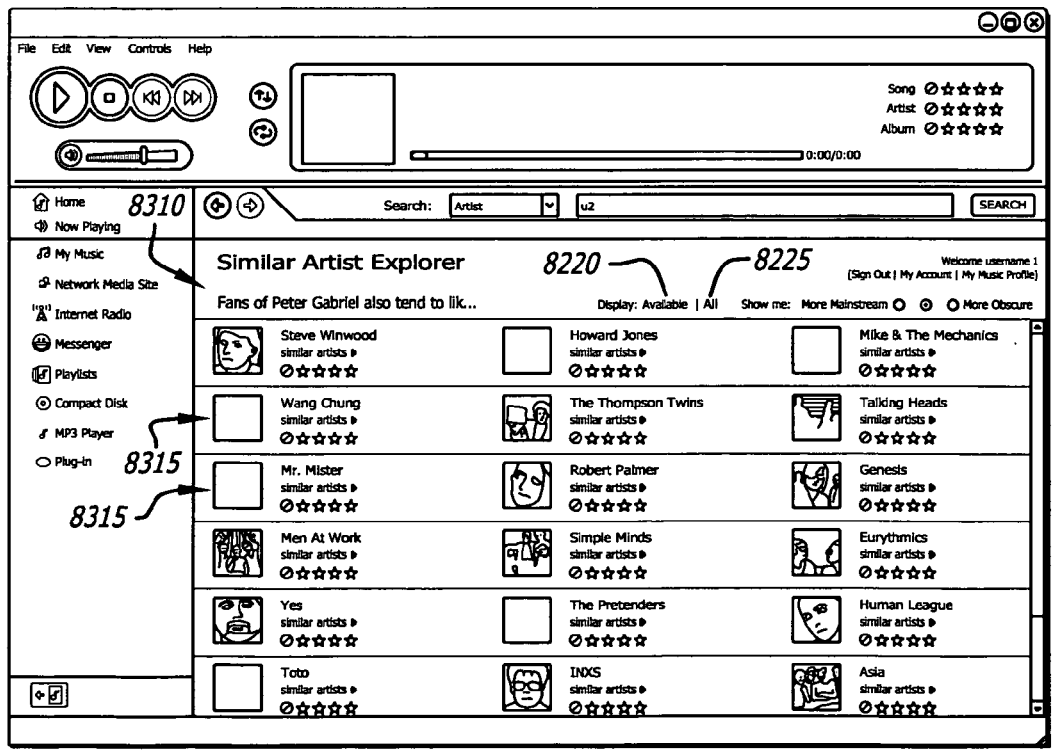
FIG. 83 is an exemplary user interface used in creating a similar artist list with an exemplary according to one embodiment.

In another exemplary embodiment of using the similarity explorer function, the user can access a list of similar artists. Thus, in like manner to the user similarity explorer, the affinity engine 350 generates a similar artist list based on aggregated implicit or explicit user information, or information provided by an operator of the system, but is preferably based at least in part upon the user's ratings, preferences, and/or play data. Furthermore, the affinity engine 350 can optionally apply a threshold parameter when generating the similar artists list. Thus, artists who do not meet this threshold will not be included in the similar artists list. Examples of threshold parameters are how many times a particular artist appears in a user's library or how many times an artist appears along with a particular artist(s) in a user's library. As can be seen with reference to FIG. 80, the user interface allows the member to access and view a similar artists list. First, the user clicks the link associated with the similar artist function 8010 located in the user interface. A truncated or abbreviated list of similar artists is displayed 8015 for the user. The user can then click the "more" 8020 link to access more similar artists and relevant detailed information. Then, as depicted in FIG. 81, the user is presented with a pane 8110 listing the similar artists 8115 generated by the affinity engine. From this pane, the user can access information about each listed artist 8115. For example, a user can access which artist 8120 a listed artist 8115 is considered similar to. Thus, if the user clicks the "similar artists" 8120 link, the user is presented with a pane 8210 of similar artists 8215 to one of the previously listed artists 8115 as depicted in FIG. 82. This allows the user to explore and expand to different degrees and branches of similar artists through a series of single clicks via a simple and intuitive user interface. The user can perform as many interactions of selecting similar artists as the user desires. At any time, the user is preferably further capable of filtering or narrowing the display of similar artists using a variety of parameters, for example, artists that are more mainstream or popular versus artists that are more obscure or less popular, in a manner described elsewhere herein, for example, via an interface element 8226. As depicted in FIGS. 82 and 83, the user can elect to display all the similarity results 8220 or only the similarity results that are available to the user 8225 through system 100/300, based on subscription level, authorization criteria, DRM adherence, or other limiting factor.

The explorer functionality described above may be applied to other criteria as well, beyond user and artist, to yield similar songs, albums, genres, or other criteria, utilizing a similar user interface and the affinity engine 350.

Those skilled in the art will recognize that the method and system of the present invention within the application may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

I claim:

1. A method comprising:

receiving via a media application and an instant messaging platform, from a first user having a group of messenger friends that said first user communicates with, a search request for a media item;

identifying a plurality of other users of said instant messaging platform to form a list of candidate users that comprises at least one user from said group of messenger friends, each user in said candidate list utilizing another instance of said application and said messaging platform at the time the identification takes place;

searching media items associated with each candidate user to develop a search result that fulfills said search request; and returning to said first user said search result comprising information identifying which candidate user is associated with a media item source that can act as a source of a media item identified in said search result and a location of said media item source on a network.

2. The method of claim 1 wherein said step of identifying further comprises identifying a second group of messenger friends that are messenger friends of said at least one user that are in turn also utilizing another instance of said application and said messaging platform at the time the identification takes place.

3. The method of claim 1 further comprising passing a communication to facilitate streaming said identified media item from a computing device associated with said candidate user to a local computing device associated with said first user so that said first user can experience said media item at said first user's local computing device.

4. The method of claim 3 further comprising making a determination as to whether said first user must have adequate rights to experience said identified media item.

5. The method of claim 4 wherein said adequate rights are based on said first user's permission level associated with a subscription to an online media service.

6. The method of claim 5 wherein said adequate rights are further based on said candidate user's permission level associated with said subscription to an online media service.

7. The method of claim 1 further comprising facilitating the communication of a copy of said identified media item from a computing device associated with said candidate user to a computing device associated with said first user so that said first user can experience said media item at said first user's local computing device.

8. The method of claim 7 wherein said first user must have adequate rights to experience said identified media item.

9. The method of claim 8 wherein said adequate rights are based on said first user's permission level associated with a subscription to an online media service.

10. The method of claim 1 further comprising determining, based upon at least said first user's rights, which one of said media item sources acts as a source from which said media item can be obtained or experienced.

11. The method of claim 10 wherein said media item can be obtained by streaming said media item from a computing device associated with said candidate user to a computing device associated with said first user.

12. The method of claim 10 wherein said media item can be obtained by copying said media item from a computing device associated with said candidate user to a computing device associated with said first user.

13. The method of claim 10 wherein said media item source comprises a media server that is in communication with said media management application and said instant messenger platform so that said media item is streamed from said media server to a computing device associated with said first user.

14. The method of claim 10 wherein said media item source comprises a computing device associated with said candidate user such that said media item is streamed from said candidate users computing device to a computing device associated with said first user.

15. The method of claim 1 wherein said instant messaging platform allows said first user and said candidate user to exchange messages to each other.

16. The method of claim 1 wherein said instant messenger platform allows said first user and said candidate user to exchange an id associated with said identified media item if a computing device associated with said first user and a computing device associated with said candidate user are not directly connected to each other.

17. The method of claim 16 wherein said id allows said first user to obtain said media item from a media service.

18. The method of claim 1 wherein said instant messenger platform allows said first user and said candidate user to exchange an id associated with said identified media item and a pointer associated with said media item if a computing device associated with said first user and a computing device associated with said candidate user are directly connected to each other.

19. The method of claim 1 wherein said first user and said candidate user must each be logged onto said messaging platform.

20. The method of claim 1 further comprising determining, based on communication criteria, which respective computing devices associated with respective candidate users would be a preferred source of said identified media item.

21. The method of claim 20 wherein said communication criteria comprises a connection speed associated with each respective computing device with respect to a computing device associated with said first user.

22. The method of claim 20 wherein said communication criteria comprises whether each respective computing device is available on said network.

23. The method of claim 1 wherein identifying a plurality of other users of said instant messaging platform to form a list of candidate users further comprises identifying a status associated with each user.

24. The method of claim 23 wherein said status comprises whether each user is connected to said network.

25. The method of claim 23 wherein said status comprises whether each user is actively receiving messages.

26. The method of claim 1 wherein each user is identified by a unique ID.

27. The method of claim 1 further comprising accessing profile information associated with said candidate user.

28. The method of claim 1 wherein said search request comprises search criteria.

29. The method of claim 28 wherein said search criteria comprises an artist related to a media item.

30. The method of claim 28 wherein said search criteria comprises an album related to a media item.

31. The method of claim 28 wherein said search criteria comprises a title related to a media item.

32. The method of claim 28 wherein said search criteria comprises a genre related to a media item.

33. A computer readable storage medium tangibly encoded with a set of instructions for performing a method, comprising:

receiving, via a media application and an instant messaging platform from a first user having a group of messenger friends that said first user communicates with, a search request for a media item;

identifying a plurality of other users of said instant messaging platform to form a list of candidate users that comprises at least one user from said group of messenger friends, each user in said candidate list utilizing another instance of said application and said messaging platform at the time the identification takes place;

searching media items associated with each candidate user to develop a search result that fulfills said search request; and returning to said first user, on a visible display, said search result comprising information identifying which candidate user is associated with a media item source that can act as a source of a media item identified in said search result and a location of said media item source on a network.

34. The computer readable storage medium of claim 33 wherein said step of identifying further comprises identifying a second group of messenger friends that are messenger friends of said at least one user that are in turn also utilizing another instance of said application and said messaging platform at the time the identification takes place.

35. The computer readable storage medium of claim 33 wherein said functions further comprise determining, based upon at least said first user's rights, which one of said media item sources acts as a source from which said media item can be obtained or experienced.

36. The computer readable storage medium of claim 35 wherein said media item can be obtained by streaming said media item from a computing device associated with said candidate user to a computing device associated with said first user.

37. The computer readable storage medium of claim 35 wherein said media item can be obtained by copying said media item from a computing device associated with said candidate user to a computing device associated with said first user.

38. The computer readable storage medium of claim 35 wherein said media item source comprises a media server that is in communication with said media management application and said instant messenger platform such that said media item is streamed from said media server to a computing device associated with said first user.

39. The computer readable storage medium of claim 35 wherein said media item source comprises a computing device associated with said candidate user such that said media item is streamed from said candidate user's computing device to a computing device associated with said first user.

40. The computer readable storage medium of claim 33 wherein said functions further comprise facilitating the communication of a copy of said identified media item from a computing device associated with said candidate user to a computing device associated with said first user so that said first user can experience said media item at said first user's local computing device.

41. The computer readable storage medium of claim 40 wherein said first user must have adequate rights to experience said identified media item.

42. The computer readable storage medium of claim 41 wherein said adequate rights are based on said first user's permission level associated with a subscription to an online media service.

43. The computer readable storage medium of claim 33 wherein said instant messenger platform allows said first user and said candidate user to exchange an id associated with said identified media item if a computing device associated with said first user and a computing device associated with said candidate user are not directly connected to each other.

44. The computer readable storage medium of claim 43 wherein said id allows said first user to obtain said media item from an online media service.

45. The computer readable storage medium of claim 33 wherein said instant messenger platform allows said first user and said candidate user to exchange an id associated with said identified media item and a pointer associated with said media item if a computing device associated with said first user and a computing device associated with said candidate user are directly connected to each other.

46. A system comprising:
a media management application and an instant messaging platform implemented on at least one processor for performing functions comprising:
receiving a search request for a media item from a first user having a group of messenger friends that said first user communicates with;
identifying a plurality of other users of said instant messaging platform to form a list of candidate users that comprises at least one user from said group of messenger friends, each user in said candidate list utilizing another instance of said application and said messaging platform at the time the identification takes place;
searching media items associated with each candidate user to develop a search result that fulfills said search request; and
returning to said first user said search result comprising information identifying which candidate user is associated with a media item source that can act as a source of a media item identified in said search result and a location of said media item source on a network.

47. The system of claim 46 wherein said function of identifying further comprises identifying a second group of messenger friends that are messenger friends of said at least one user that are in turn also utilizing another instance of said application and said messaging platform at the time the identification takes place.

48. The system of claim 46 wherein said functions further comprise passing a communication from a computing device associated with said candidate user to a local computing device associated with said first user to facilitate streaming said identified media item so that said first user can experience said media item at said first users local computing device.

49. The system of claim 48 wherein said functions further comprise making a determination as to whether said first user must have adequate rights to experience said identified media item.

50. The system of claim 49 wherein said adequate rights are based on said first user's permission level associated with a subscription to an online media service.

51. The system of claim 50 wherein said adequate rights are further based on said candidate user's permission level associated with said subscription to an online media service.

52. The system of claim 46 wherein said functions further comprise facilitating the communication of a copy of said identified media item from a computing device associated with said candidate user to a computing device associated with said first user so that said first user can experience said media item at said first user's local computing device.

53. The system of claim 52 wherein said first user must have adequate rights to experience said identified media item.

54. The system of claim 53 wherein said adequate rights are based on said first user's permission level associated with a subscription to an online media service.

55. The system of claim 46 wherein said functions further comprise determining, based upon at least said first user's rights, which one of said media item sources should act as a source from which said media item can be obtained or experienced.

56. The system of claim 55 wherein said media item can be obtained by streaming said media item from a computing device associated with said candidate user to a computing device associated with said first user.

57. The system of claim 55 wherein said media item can be obtained by copying said media item from a computing device associated with said candidate user to a computing device associated with said first user.

58. The system of claim 55 wherein said media item source comprises a media server that is in communication with said media management application and said instant messenger platform such that said media item is streamed from said media server to a computing device associated with said first user.

59. The system of claim 55 wherein said media item source comprises a computing device associated with said candidate user such that said media item is streamed from said candidate user's computing device to a computing device associated with said first user.

60. The system of claim 46 wherein said instant messaging platform allows said first user and said candidate user to exchange messages to each other.

61. The system of claim 46 wherein said instant messenger platform allows said first user and said candidate user to exchange an id associated with said identified media item if a computing device associated with said first user and a computing device associated with said candidate user are not directly connected to each other.

62. The system of claim 61 wherein said id allows said first user to obtain said media item from an online media service.

63. The system of claim 46 wherein said instant messenger platform allows said first user and said candidate user to exchange an id associated with said identified media item and a pointer associated with said media item if a computing device associated with said first user and a computing device associated with said candidate user are directly connected to each other.

64. The system of claim 46 wherein said first user and said candidate user must each be logged onto said messaging platform.

65. The system of claim 46 wherein said functions further comprise determining, based on communication criteria, which respective computing devices associated with respective candidate users would be a preferred source of said identified media item.

66. The system of claim 65 wherein said communication criteria comprises a connection speed associated with each respective computing device with respect to a computing device associated with said first user.

67. The system of claim 65 wherein said communication criteria comprises whether each respective computing device is available on said network.

68. The system of claim 46 wherein said function of identifying a plurality of other users of said instant messaging platform to form a list of candidate users further comprises identifying a status associated with each user.

69. The system of claim 68 wherein said status comprises whether each user is connected to said network.

70. The system of claim 68 wherein said status comprises whether each user is actively receiving messages.

71. A method comprising:
sending from a first user utilizing a media application and an instant messaging platform, a search request for a media item to a server; and
receiving a search result comprising information identifying at least one candidate user associated with a media item source that can act as a source of a media item identified in said search result and a location of said media item source on a network, wherein said candidate user is selected from a list of candidate users that comprises at least one user from a group of messenger friends that said first user communicates with, each user in said candidate list utilizing another instance of said application and said instant messaging platform at the time said at least one candidate user is identified.

72. The method of claim 71 further comprising receiving further information identifying a second group of messenger friends that are messenger friends of said at least one candidate user that are in turn also utilizing another instance of said application and said messaging platform at the time said at least one candidate user is identified.

73. The method of claim 71 further comprising receiving said identified media item, said media item being streamed from a computing device associated with said candidate user to a local computing device associated with said first user so that said first user can experience said media item at said first user's local computing device.

74. The method of claim 71 further comprising receiving said identified media item, said media item being copied from a computing device associated with said candidate user to a local computing device associated with said first user so that said first user can experience said media item at said first users local computing device.

75. The method of claim 71 wherein said media item source comprises a media server that is in communication with said media management application and said instant messenger platform so that said media item is streamed from said media server to a computing device associated with said first user.

76. The method of claim 71 wherein said media item source comprises a computing device associated with said candidate user wherein said media item is streamed from said candidate user's computing device to a computing device associated with said first user.

77. The method of claim 71 wherein said instant messaging platform allows said first user to send to and receive from messages with said candidate user.

78. The method of claim 71 further comprising receiving an id associated with said identified media item from a computing device associated with said candidate user if a computing device associated with said first user and said computing device associated with said candidate user are not directly connected to each other.

79. The method of claim 78 wherein said id allows said first user to obtain said media item from an online media service.

80. The method of claim 71 further comprising receiving an id associated with said identified media item and a pointer associated with said media item from a computing device associated with said candidate user if a computing device associated with said first user and said computing device associated with said candidate user are directly connected to each other.

81. The method of claim 71 wherein said first user and said candidate user must each be logged onto said messaging platform.

82. The method of claim 71 further comprising accessing profile information associated with said candidate user.

83. The method of claim 71 further comprising browsing a media item collection associated with said candidate user.

84. The method of claim 71 wherein said a search request comprises search criteria.

85. The method of claim 84 wherein said search criteria comprises an artist related to a media item.

86. The method of claim 84 wherein said search criteria comprises an album related to a media item.

87. The method of claim 84 wherein said search criteria comprises a title related to a media item.

88. The method of claim 84 wherein said search criteria comprises a genre related to a media item.

* * * * *